(12) United States Patent
Suzuki

(10) Patent No.: US 8,305,464 B2
(45) Date of Patent: Nov. 6, 2012

(54) IMAGING APPARATUS, IMAGE PROCESSING APPARATUS, ZOOM CONTROL METHOD, AND ZOOM CONTROL PROGRAM

(75) Inventor: Hiroyuki Suzuki, Tokyo (JP)

(73) Assignee: Sony Corporation (JP)

( * ) Notice: Subject to any disclaimer, the term of this patent is extended or adjusted under 35 U.S.C. 154(b) by 386 days.

(21) Appl. No.: 12/592,803

(22) Filed: Dec. 3, 2009

(65) Prior Publication Data

US 2010/0149378 A1 Jun. 17, 2010

(30) Foreign Application Priority Data

Dec. 17, 2008 (JP) ................ P2008-321545

(51) Int. Cl.
*H04N 5/76* (2006.01)
*H04N 5/222* (2006.01)
(52) U.S. Cl. .............. 348/231.99; 348/333.01
(58) Field of Classification Search ........ 348/207.1, 348/240.1–240.3, 231.99, 240.99, 333.01
See application file for complete search history.

(56) References Cited

U.S. PATENT DOCUMENTS

| | | | |
|---|---|---|---|
| 7,126,642 B2 | 10/2006 | Takechi et al. | |
| 7,420,617 B2 | 9/2008 | Takechi et al. | |
| 7,428,000 B2* | 9/2008 | Cutler et al. | 348/14.11 |
| 7,893,999 B2* | 2/2011 | Bennett | 348/578 |
| 2002/0027614 A1* | 3/2002 | Konuma | 348/558 |
| 2002/0158973 A1* | 10/2002 | Gomi | 348/240.2 |
| 2004/0002049 A1* | 1/2004 | Beavers et al. | 434/350 |
| 2005/0146631 A1* | 7/2005 | Shelton et al. | 348/333.12 |
| 2006/0093224 A1* | 5/2006 | Uchino | 382/232 |
| 2006/0115185 A1* | 6/2006 | Iida et al. | 382/305 |
| 2008/0018785 A1* | 1/2008 | Bennett | 348/439.1 |
| 2010/0302408 A1* | 12/2010 | Ito | 348/231.99 |

FOREIGN PATENT DOCUMENTS

| | | |
|---|---|---|
| JP | 08194246 A | 7/1996 |
| JP | 11234450 A | 8/1999 |
| JP | 2002-101393 A | 4/2002 |
| JP | 2005080043 A | 3/2005 |

OTHER PUBLICATIONS

Office Action from Japanese Application No. 2008-321545, dated Sep. 21, 2010.

* cited by examiner

*Primary Examiner* — Trung Diep
(74) *Attorney, Agent, or Firm* — Lerner, David, Littenberg, Krumholz & Mentlik, LLP

(57) ABSTRACT

An imaging apparatus is provided which includes an image recording range extraction unit for extracting, from a video of a subject to be imaged, an image corresponding to a first imaging region configured by a predetermined first aspect ratio and an image corresponding to a second imaging region configured by a predetermined second aspect ratio different from the first aspect ratio, a zoom control unit for magnifying or reducing the video of the subject to be imaged, and a zoom restriction setting unit for setting a zoom restriction on either one of or both of the first imaging region and the second imaging region. A predetermined process for preventing the predetermined subject from being image-defected from an imaging region set with the zoom restriction is executed according to a relationship of the predetermined subject magnified or reduced by the zoom process and the imaging region set with the zoom restriction.

12 Claims, 33 Drawing Sheets

FIG. 18
| No. | ASPECT RATIO OF DISPLAY UNIT 112 | ASPECT RATIO OF MAIN IMAGE | ASPECT RATIO OF SUB-IMAGE | FRAME MODE |
|---|---|---|---|---|
| 1 | 16:9 | 16:9 | 4:3 | 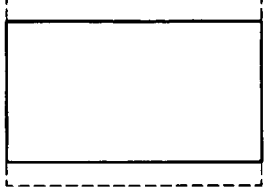 |
| 2 | 16:9 | 16:9 | 4:3 | 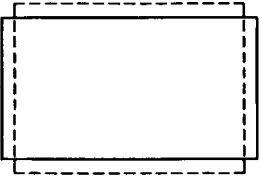 |
| 3 | 16:9 | 16:9 | 4:3 |  |
| 4 | 4:3 | 4:3 | 16:9 | 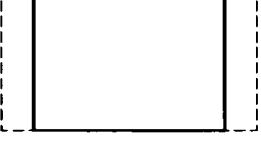 |
| 5 | 4:3 | 4:3 | 16:9 | 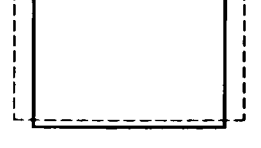 |
| 6 | 4:3 | 16:9 | 4:3 |  |
DISPLAY UNIT 112 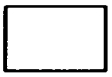   SUB-IMAGE PHOTOGRAPHING REGION 

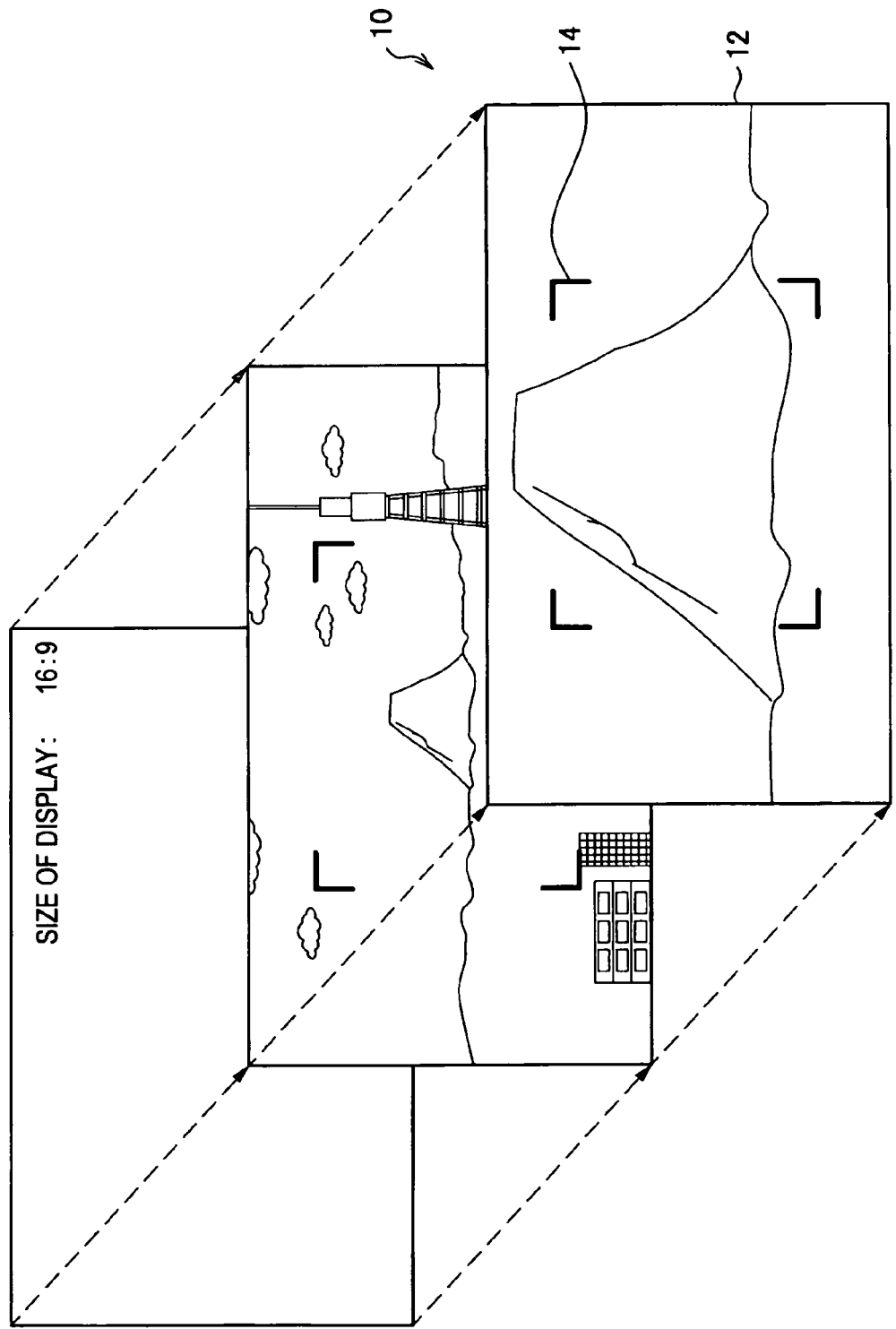

IMAGING APPARATUS, IMAGE PROCESSING APPARATUS, ZOOM CONTROL METHOD, AND ZOOM CONTROL PROGRAM

CROSS-REFERENCE TO RELATED APPLICATION

The present application claims priority from Japanese Patent Application No. JP 2008-321545 filed in the Japanese Patent Office on Dec. 17, 2008, the entire content of which is incorporated herein by reference.

BACKGROUND OF THE INVENTION

1. Field of the Invention

The present invention relates to an imaging apparatus, an image processing apparatus, a zoom control method, and a zoom control program.

2. Description of the Related Art

The recent imaging apparatus such as a digital video camera can photograph with an aspect ratio of the image to photograph switched to a plurality of aspect ratios such as 4:3 and 16:9. The imaging apparatus may have a function of simultaneously photographing a still image having an aspect ratio of 4:3 while photographing a moving image having an aspect ratio of 16:9. The user can display the image data recorded with the imaging apparatus not only on the display screen arranged in the imaging apparatus but also on an externally connected display.

The recent imaging apparatus, image reproducing apparatus, and the like have a function of not only photographing and reproducing image data, but also simultaneously photographing image data of a plurality of aspect ratios, or simultaneously reproducing the same image data on a plurality of displays.

The recent imaging apparatus such as digital video camera may also have a function of specifying a subject of photographing target, and automatically performing a zoom process such that the specified subject fits within a photographing region. Japanese Patent Application Laid-Open No. 2002-101393 discloses a technique of adjusting and displaying the image data such that a predetermined subject contained in the image data is not image-defected when displaying a certain image data on a display having an aspect ratio different from that of the image data.

Therefore, the recent imaging apparatus, image reproducing apparatus and the like have been given attention not on only photographing and reproducing image data, but on the function in which the subject specified by the user or automatically can be controlled so as not to be image-defected from the photographing region or the displaying region.

SUMMARY OF THE INVENTION

However, when simultaneously photographing the image data of a plurality of aspect ratios, the photographing region of each aspect ratio is to be presented to the user on the display screen. In such case, even if zooming is performed so that a predetermined subject in the photographing region is not image-defected from the photographing region of one aspect ratio, the relevant subject may be image-defected from the photographing region of another aspect ratio.

When simultaneously reproducing one image data on a plurality of displays having different aspect ratios, the displaying region of the image data displayed on each display differs. Therefore, even if the user zooms so that a predetermined subject in the displaying region is not image-defected from the displaying region while looking at one display, the relevant subject may be image-defected from the displaying region of another display.

In light of the foregoing, it is desirable to provide a novel and improved image processing apparatus, a zoom control method, and a zoom control program capable of, when simultaneously photographing a plurality of image data having different aspect ratios or when simultaneously reproducing the same image data on a plurality of displays having different aspect ratios, controlling the zoom function and the display function so that a predetermined subject is not image-defected from a photographing region or a reproduction displaying region of the set aspect ratio.

According to an embodiment of the present invention, there is provided an imaging apparatus, including an image recording range extraction unit for extracting, from a video of a subject to be imaged, an image corresponding to a first imaging region configured by a predetermined first aspect ratio and an image corresponding to a second imaging region configured by a predetermined second aspect ratio different from the first aspect ratio, a zoom control unit for magnifying or reducing the video of the subject to be imaged, and a zoom restriction setting unit for setting a zoom restriction on either one of or both of the first imaging region and the second imaging region to prevent a predetermined subject from being image-defected from an imaging region by a zoom process of the zoom control unit. A predetermined process for preventing the predetermined subject from being image-defected from an imaging region set with the zoom restriction may be executed according to a relationship of the predetermined subject magnified or reduced by the zoom process and the imaging region set with the zoom restriction.

According to such configuration, the image recording range extraction unit of the imaging apparatus can extract and record, from the video of a subject to be imaged, an image corresponding to a first imaging region configured by a predetermined first aspect ratio and an image corresponding to a second imaging region configured by a predetermined second aspect ratio different from the first aspect ratio. The zoom control unit can magnify or reduce the video of the subject to be imaged. The imaging apparatus can also execute a predetermined process for preventing a predetermined subject from being image-defected from the imaging region set with the zoom restriction according to the relationship of the predetermined subject magnified or reduced by the zoom process and the imaging region set with the zoom restriction.

The imaging apparatus may further include an image display range extraction unit for extracting a display image to display on a display from the video of the subject to be imaged, a notification image generation unit for generating a notification image including a zoom state notification icon showing a relationship of the predetermined subject and the imaging region set with the zoom restriction according to the zoom process, an image synthesizing unit for synthesizing the notification image generated by the notification image generation unit to the display image extracted by the image display range extraction unit to generate a synthesized image, and a display control unit for displaying the synthesized image generated by the image synthesizing unit on the display.

The notification image generation unit may generate a zoom warning icon indicating that the predetermined subject may be image-defected from the imaging region set with the zoom restriction as the zoom state notification icon when the predetermined subject is magnified by the zoom process and reaches a warning boundary set at a predetermined position in the imaging region set with the zoom restriction.

The notification image generation unit may generate a zoom limiting icon indicating that the predetermined subject may not be further magnified by the zoom process to prevent the predetermined subject from being image-defected from the imaging region set with the zoom restriction as the zoom state notification icon when the predetermined subject is further magnified by the zoom process and reaches a boundary of the imaging region set with the zoom restriction.

If the imaging region not set with the zoom restriction is smaller than the imaging region set with the zoom restriction, the notification image generation unit may generate the zoom warning icon indicating, in a cautioning manner, that the predetermined subject may be image-defected from the imaging region not set with the zoom restriction as the zoom state notification icon when the predetermined subject is magnified by the zoom process and reaches a warning boundary set at a predetermined position in the imaging region not set with the zoom restriction.

If the imaging region not set with the zoom restriction is smaller than the imaging region set with the zoom restriction, the notification image generation unit may generate an image-defect notification icon indicating, in a cautioning manner, that the predetermined subject is image-defected from the imaging region not set with the zoom restriction as the zoom state notification icon when the predetermined subject is magnified by the zoom process and goes beyond the boundary of the imaging region not set with the zoom restriction.

The image display range extraction unit may extract, from the video of the subject to be imaged, a display image configured by an aspect ratio of a displayable region of the display in a range the first imaging region is displayed to a maximum extent. The notification image generation unit may generate the notification image including a region notification icon indicating that the second imaging region exists outside the displayable region of the display when the second imaging region exists outside the displayable region of the display.

The notification image generation unit may generate the notification image including a guide frame indicating a boundary of the second imaging region when one part of the boundary of the second imaging region exists in the displayable region of the display.

The zoom restriction setting unit may automatically set the zoom restriction on either one of or both of the first imaging region and the second imaging region according to a combination of the first imaging region configured by the first aspect ratio and the second imaging region configure by the second aspect ratio.

The zoom restriction setting unit may prevent the predetermined subject from being image-defected from the first imaging region and the second imaging region by setting the zoom restriction on a common region of the first imaging region and the second imaging region.

If the second imaging region exists outside the displayable region of the display and the zoom restriction is set only on the second imaging region, when the predetermined subject is magnified by the zoom process and goes beyond a boundary of the first imaging region not set with the zoom restriction, the image display range extraction unit may extract, from the video of the subject to be imaged, the display image configured by an aspect ratio of the displayable region of the display in a range the second imaging region is displayed to a maximum extent.

The zoom control unit may disable a zoom function in a direction of magnifying the predetermined subject when the predetermined subject is further magnified by the zoom process and reaches the boundary of the imaging region set with the zoom restriction.

The imaging apparatus may further include a data storage unit for storing the image data extracted by the image recording range extraction unit as reproducing image data. When simultaneously reproducing and displaying one reproducing image data recorded in the data storage unit on a first display configured by a predetermined aspect ratio and a second display configured by a predetermined aspect ratio different from the aspect ratio of the first display, the image display range extraction unit may extract, from the reproducing image data, a first reproduction display image corresponding to a predetermined first reproduction display region to reproduce and display on the first display, and a second reproduction display image corresponding to a predetermined second reproduction display region to reproduce and display on the second display, the zoom control unit may magnify or reduce the reproducing image data by the zoom process, the zoom restriction setting unit may set the zoom restriction on either one of or both of the first reproduction display region and the second reproduction display region to prevent the predetermined subject contained in the reproducing image data from being image-defected from a reproduction displaying region by the zoom process of the zoom control unit, the notification image generation unit may generate the notification image including a zoom state notification icon indicating a relationship of the predetermined subject and the reproduction displaying region set with the zoom restriction according to the zoom process, the image synthesizing unit may synthesize the notification image generated by the notification image generation unit to each reproduction display image extracted by the image display range extraction unit to generate a first synthesized image and a second synthesized image, and the display control unit may cause the first display to display the first synthesized image generated by the image synthesizing unit, and cause the second display to display the second synthesized image generated by the image synthesizing unit.

The zoom control unit may disable a zoom function in a direction of magnifying the predetermined subject when the predetermined subject is further magnified by the zoom process and reaches a boundary of the reproduction displaying region set with the zoom restriction.

According to another embodiment of the present invention, there is provided an image reproducing device including a data storage unit for storing image data, an image display range extraction unit for extracting a first reproduction display image corresponding to a predetermined first reproduction display region to reproduce and display on the first display, and a second reproduction display image corresponding to a predetermined second reproduction display region to reproduce and display on the second display from the image data, a zoom control unit for magnifying or reducing the image data, and a zoom restriction setting unit for setting the zoom restriction on either one of or both of the first reproduction display region and the second reproduction display region to prevent a predetermined subject contained in the reproducing image data from being image-defected from a reproduction displaying region by the zoom process of the zoom control unit. A predetermined process for preventing the predetermined subject from being image-defected from a reproduction displaying region set with the zoom restriction may be executed according to a relationship of the predetermined subject magnified or reduced by the zoom process and the reproduction displaying region set with the zoom restriction.

According to another embodiment of the present invention, there is provided a zoom control method, including the steps of extracting, from a video of a subject to be imaged, an image corresponding to a first imaging region configured by a predetermined first aspect ratio and an image corresponding to a second imaging region configured by a predetermined second aspect ratio different from the first aspect ratio, setting a zoom restriction on either one of or both of the first imaging region and the second imaging region to prevent a predetermined subject from being image-defected from an imaging region, magnifying or reducing the video of the subject to be imaged, and executing a predetermined process for preventing the predetermined subject from being image-defected from an imaging region set with the zoom restriction according to a relationship of the predetermined subject magnified or reduced in the zoom process step and the imaging region set with the zoom restriction.

According to another embodiment of the present invention, there is provided a zoom control program for causing a computer to execute the processes of extracting, from a video of a subject to be imaged, an image corresponding to a first imaging region configured by a predetermined first aspect ratio and an image corresponding to a second imaging region configured by a predetermined second aspect ratio different from the first aspect ratio, setting a zoom restriction on either one of or both of the first imaging region and the second imaging region to prevent a predetermined subject from being image-defected from an imaging region, magnifying or reducing the video of the subject to be imaged, and executing a predetermined process for preventing the predetermined subject from being image-defected from an imaging region set with the zoom restriction according to a relationship of the predetermined subject magnified or reduced by the zoom process and the imaging region set with the zoom restriction.

According to another embodiment of the present invention, there is provided a zoom control method, including the steps of extracting, from one image data recorded in a data storage unit, an image corresponding to a first reproduction display region to reproduce and display on a first display of a predetermined first aspect ratio, and an image corresponding to a second reproduction display region to reproduce and display on a second display of a predetermined second aspect different from the first aspect ratio, setting a zoom restriction on either one of or both of the first reproduction display region and the second reproduction display region to prevent a predetermined subject contained in the image data from being image-defected from a reproduction displaying region, magnifying or reducing the image data, and executing a predetermined process for preventing the predetermined subject from being image-defected from a reproduction displaying region set with the zoom restriction according to a relationship of the predetermined subject magnified or reduced in the zoom process step and the reproduction displaying region set with the zoom restriction.

According to another embodiment of the present invention, there is provided a zoom control program for causing a computer to execute the processes of extracting, from one image data recorded in a data storage unit, an image corresponding to a first reproduction display region to reproduce and display on a first display of a predetermined first aspect ratio, and an image corresponding to a second reproduction display region to reproduce and display on a second display of a predetermined second aspect different from the first aspect ratio, setting a zoom restriction on either one of or both of the first reproduction display region and the second reproduction display region to prevent a predetermined subject contained in the image data from being image-defected from a reproduction displaying region, magnifying or reducing the image data, and executing a predetermined process for preventing the predetermined subject from being image-defected from a reproduction displaying region set with the zoom restriction according to a relationship of the predetermined subject magnified or reduced by the zoom process and the reproduction displaying region set with the zoom restriction.

According to the embodiments of the present invention described above, the zoom function and the display function can be controlled so that a predetermined subject is not image-defected from a photographing region or a reproduction displaying region of the set aspect ratio when simultaneously photographing a plurality of image data having different aspect ratios or when simultaneously reproducing the same image data on a plurality of displays having different aspect ratios.

BRIEF DESCRIPTION OF THE DRAWINGS

FIG. 17 is an explanatory view showing a concept of when using the imaging apparatus 400 according to the fourth embodiment in a fixed point observation, experimental photographing, and the like;

FIG. 18 is an explanatory view showing one example of a type of frame mode the user can arbitrarily select in the imaging apparatus 400 according to the fourth embodiment;

FIG. 33 is an explanatory view showing the concept of when the subject of interest is magnified through the zoom process in the display state of the display 10 shown in FIG. 32.

DETAILED DESCRIPTION OF THE EMBODIMENTS

Figure 1:
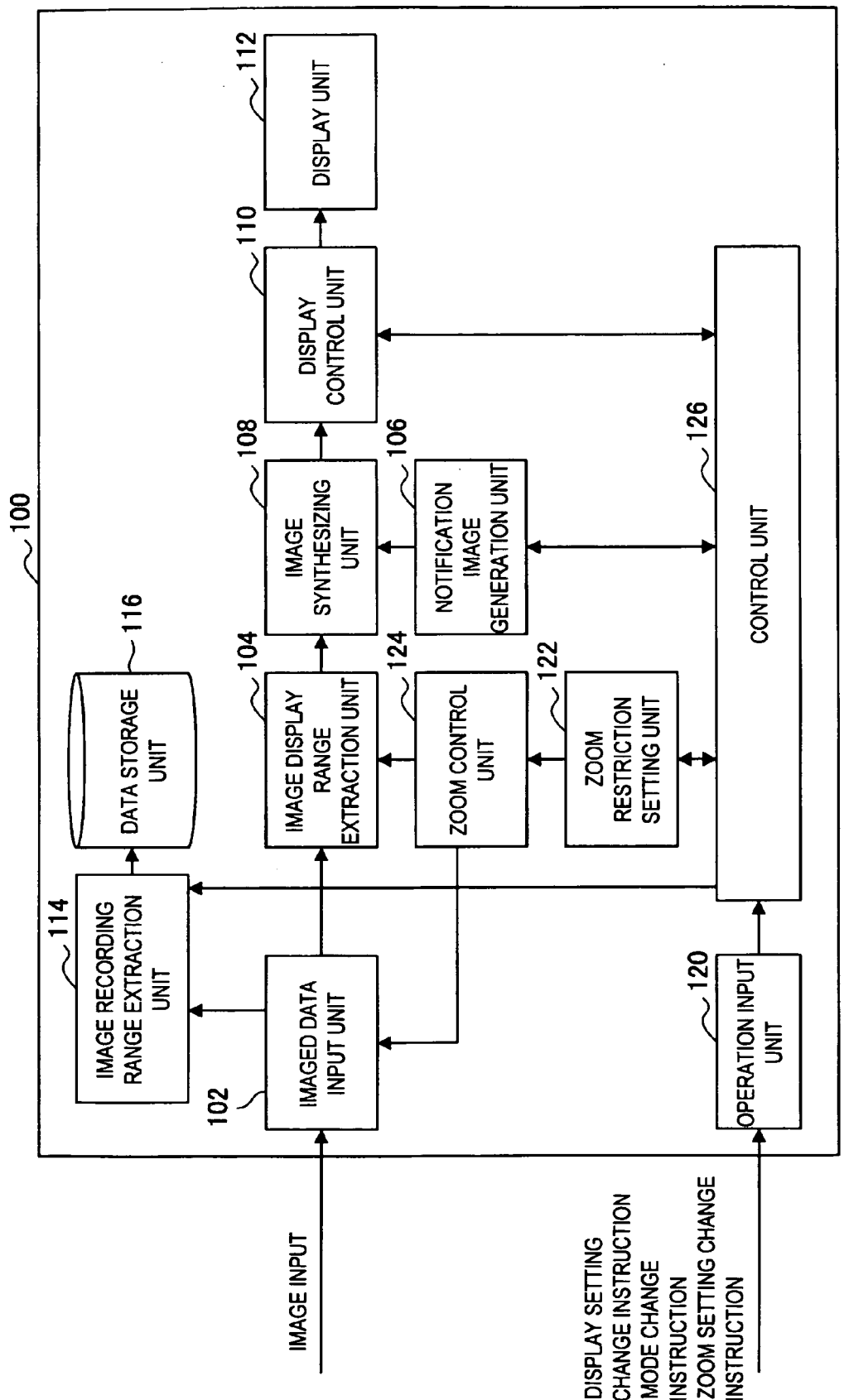
FIG. 1 is a block diagram showing one example of a function configuration related to the zoom process of an imaging apparatus 100 according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description will be made in the following order.

1. First embodiment (example of preventing image-defect from photographing region of all aspect ratios)
1-1. Outline of imaging apparatus 100 according to first embodiment
1-1. Function configuration of imaging apparatus 100
1-2. Processing flow related to zoom process of imaging apparatus 100
2. Second embodiment (example of preventing image-defect only from photographing region of preferential aspect ratio)
2-1. Outline of imaging apparatus 200 according to second embodiment
2-2. Processing flow related to zoom process of imaging apparatus 200
3. Third embodiment (example of when displaying photographed data on display having a plurality of aspect ratios)
3-1. Outline of imaging apparatus 300 according to third embodiment
3-2. Function configuration of imaging apparatus 300
4. Fourth embodiment (example of when displaying main photographing region on display to maximum extent)
4-1. Outline of imaging apparatus 400 according to fourth embodiment
4-2. Setting of frame mode
4-3. Processing flow related to zoom process of imaging apparatus 400
5. Fifth embodiment (example of switching displaying region according to zoom process)
6. Hardware configuration of imaging apparatus according to each embodiment
7. Summary <1. First Embodiment>
[1-1. Outline of Imaging Apparatus 100 According to First Embodiment]

First, the outline of an imaging apparatus 100 according to a first embodiment of the present invention will be described after clarifying the issues of the related art.

As described above, the imaging apparatus such as digital still camera and digital video camera of the related art sometimes has a function of simultaneously photographing the image of a plurality of aspect ratios such as 4:3 and 16:9.

When the function of simultaneously photographing the image of a plurality of aspect ratios is provided, an appropriate photographing region corresponding to a plurality of aspect ratios is to be indicated to the user through a display and the like.

Figure 30:
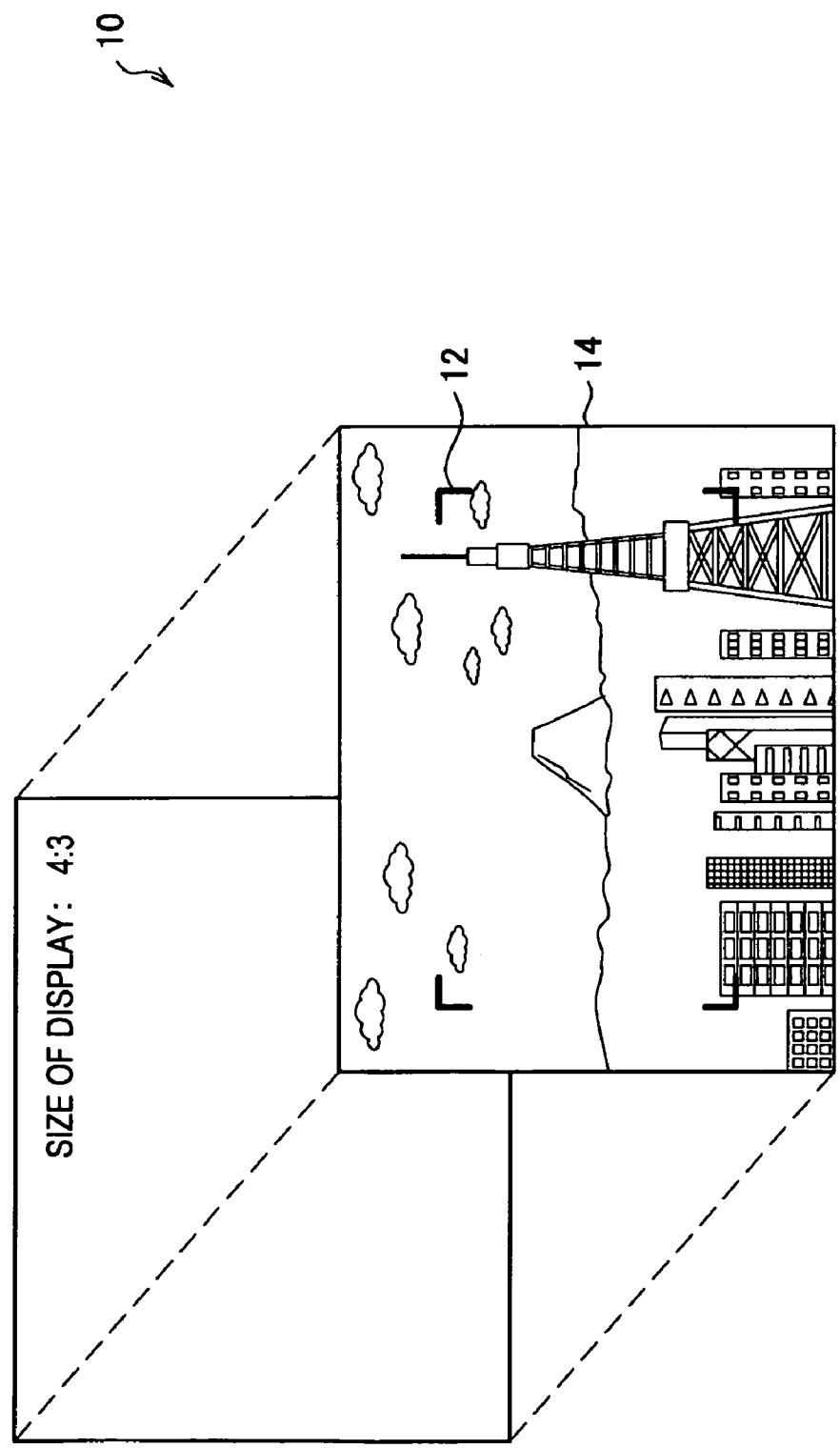
FIG. 30 is an explanatory view showing an example of causing a display 10 of 4:3 to display a photographing region corresponding to an image having aspect ratios 4:3 and 16:9 in an imaging apparatus of the related art.

FIG. 30 is an explanatory view showing a display example of showing a photographing region corresponding to an image having a plurality of aspect ratios to the user in the imaging apparatus of the related art. FIG. 30 is an example in which a photographing region 12 having the aspect ratio of 16:9 and a photographing region 14 having the aspect ratio of 4:3 are simultaneously displayed on a display 10 having the aspect ratio of 4:3. In the example shown in FIG. 30, the photographing region 14 having the aspect ratio 4:3 is displayed on the display 10 having the aspect ratio 4:3 to the maximum extent, and the frame corresponding to the photographing region 12 having the aspect ratio 16:9 is displayed. As a result, by looking at the frame displayed on the display 10, the user can perform a predetermined processes such as zooming, focusing, start of photographing, and the like while checking the photographing region 14 having the aspect ratio 4:3 and the photographing region 12 having the aspect ratio 16:9.

Figure 31:
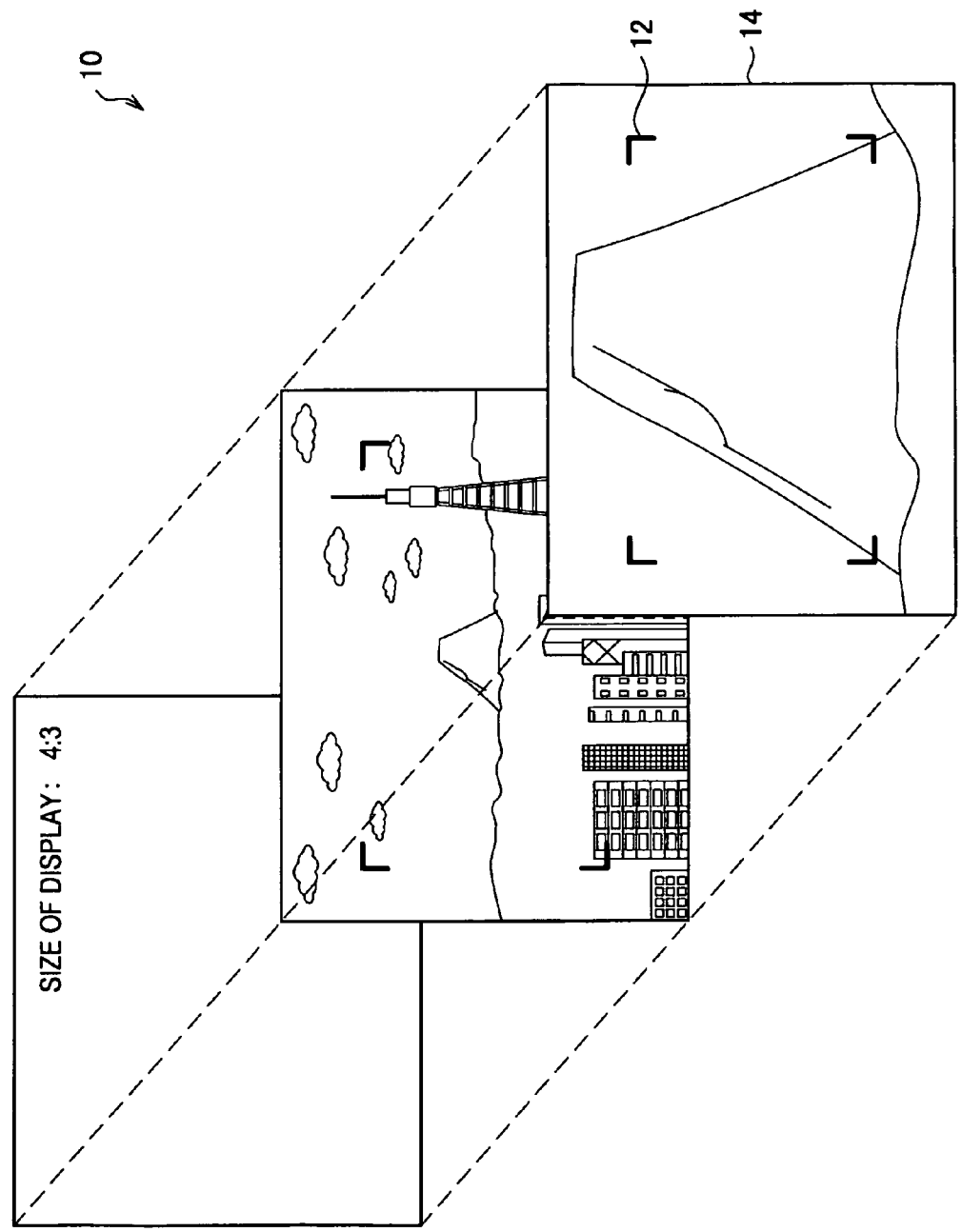
FIG. 31 is an explanatory view showing the concept of when a subject of interest is magnified through a zoom process in the display state of the display 10 shown in FIG. 30, an explanatory view showing a display example of a display screen before and after performing the zoom process when simultaneously photographing an image of a plurality of aspect ratios.

Assume that the user performs the zoom process to photograph a predetermined subject so that the relevant subject is in the photographing region. In the following description, an example of performing the zoom process with Mt. Fuji as the subject of interest will be described. FIG. 31 is an explanatory view showing the concept of when Mt. Fuji, which is the subject of interest, is magnified through the zoom process in the display state of the display 10 shown in FIG. 30.

With reference to FIG. 31, Mt. Fuji is within the photographing region 14 having the aspect ratio 4:3, but one part of Mt. Fuji runs off from the photographing region 12 having the aspect ratio 16:9. In other words, one part of Mt. Fuji is image-defected from the image data corresponding to the aspect ratio 16:9 even if the user performs the zoom process to have Mt. Fuji within the display 10.

Figure 32:
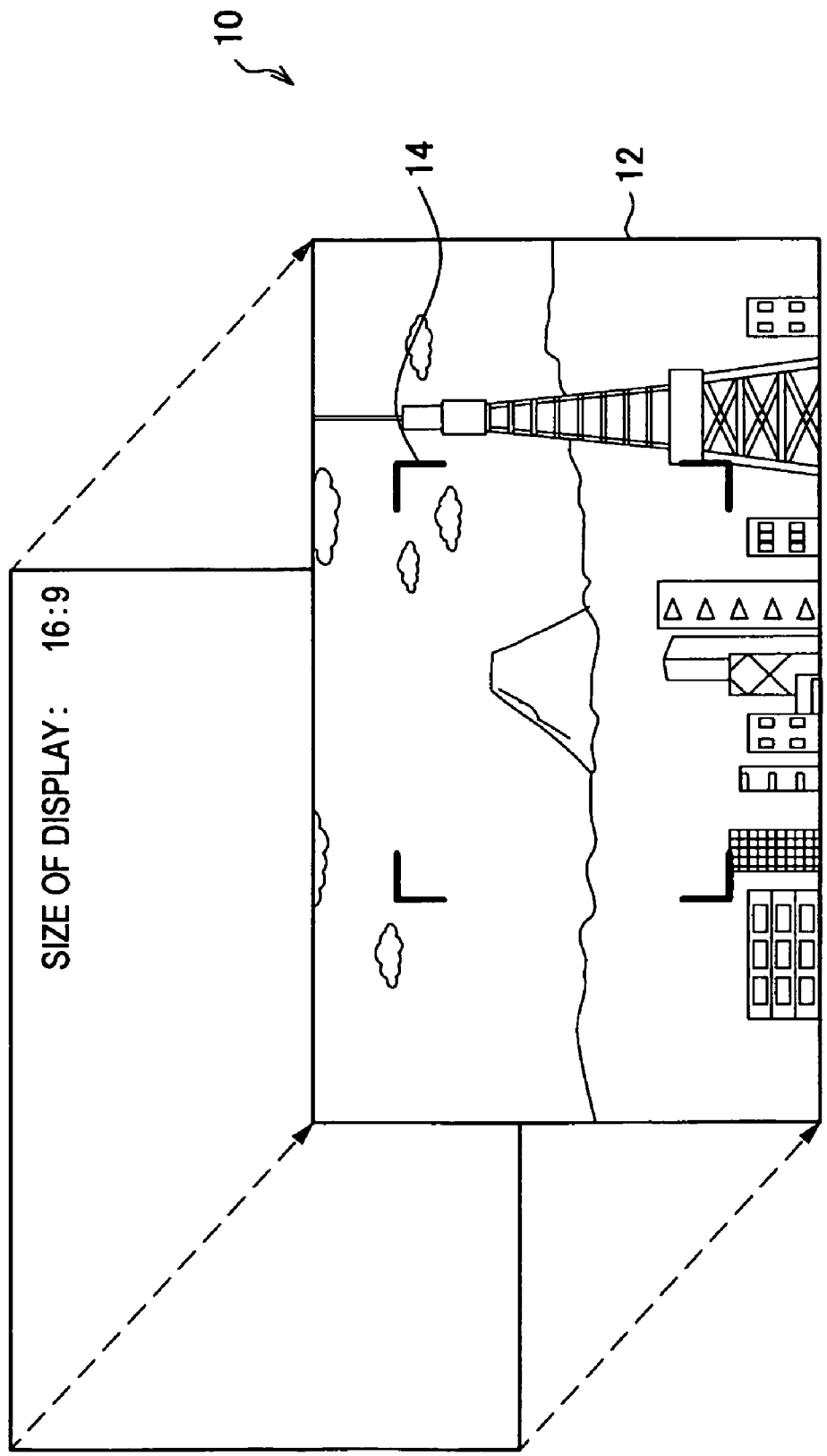
FIG. 32 is an explanatory view showing an example of causing the display 10 of 16:9 to display a photographing region corresponding to an image having aspect ratios 4:3 and 16:9 in the imaging apparatus of the related art.

Such issue arises irrespective of the aspect ratio of the display 10. FIG. 32 is an example in which the photographing region 12 having the aspect ratio 16:9 and the photographing region 14 having the aspect ratio 4:3 are simultaneously displayed on the display 10 having the aspect ratio 16:9 in the imaging apparatus of the related art. In the example shown in FIG. 32, the photographing region 12 having the aspect ratio 16:9 is displayed on the display 10 having the aspect ratio 16:9 to the maximum extent, and the frame corresponding to the photographing region 14 having the aspect ratio 4:3 is displayed. FIG. 33 is an explanatory view showing the concept of when Mt. Fuji, which is the subject of interest, is magnified through the zoom process in the display state of the display 10 shown in FIG. 32. With reference to FIG. 33, Mt. Fuji is within the photographing region 12 having the aspect ratio 16:9, but one part of Mt. Fuji runs off from the photographing region 14 having the aspect ratio 4:3. In other words, one part of Mt. Fuji is image-defected from the image data corresponding to the aspect ratio 4:3 even if the user performs the zoom process to have Mt. Fuji within the display 10.

Therefore, when simultaneously photographing the image of a plurality of aspect ratios, the subject may be image-defected from the image data of one aspect ratio even if the user performs the zoom process to have a predetermined subject within the display 10 of the imaging apparatus. In other words, when simultaneously photographing the image of a plurality of aspect ratios, the imaging apparatus of the related art has an issue in that a predetermined subject of interest is image-defected from the photographing region of one aspect ratio if the zoom process is performed with the display screen of the display 10 as the reference.

The imaging apparatus 100 according to the first embodiment of the present invention solves such issue of the imaging apparatus of the related art.

Specifically, when simultaneously photographing image data of a plurality of aspect ratios, the imaging apparatus 100 sets a zoom restriction on the photographing region of the aspect ratio of a small photographing region, and executes a predetermined process so that a predetermined subject is not image-defected from the image of the set aspect ratio. The imaging apparatus 100 may display a warning display on the display screen or may disable the zoom function before the predetermined subject is image-defected from the photographing region of the image of the aspect ratio set with zoom restriction. As a result, the user can perform the zoom process so that the predetermined subject is not image-defected from the image data of any aspect ratio, and simultaneously photograph the image data of a plurality of aspect ratios.

Thus, when simultaneously photographing the image data of a plurality of aspect ratio, the imaging apparatus 100 according to the first embodiment can control the display function and the zoom function so that the predetermined subject is not image-defected from the photographing region of the image data of all aspect ratios.

The details of the imaging apparatus 100 according to the first embodiment having such characteristic will be described below. In the following description, the act the user records a predetermined subject by the imaging apparatus 100 is expressed as "photograph" for the sake of convenience of the explanation, but also includes the meaning of "imaging" of recording the video of the subject as is.

[1-1. Function Configuration of Imaging Apparatus 100]

First, the function configuration of the imaging apparatus 100 according to the first embodiment will be described. FIG. 1 is a block diagram showing one example of a function configuration related to the zoom process of the imaging apparatus 100 according to the first embodiment.

As shown in FIG. 1, the imaging apparatus 100 is configured to mainly include an imaged data input unit 102, an image display range extraction unit 104, a notification image generation unit 106, an image synthesizing unit 108, a display control unit 110, a display unit 112, an image recording range extraction unit 114, a data storage unit 116, an operation input unit 120, a zoom restriction setting unit 122, and a zoom control unit 124. Each of such function configuration units configuring the imaging apparatus 100 executes various types of functions by being controlled by a control unit 126. The details of the function configurations configuring the imaging apparatus 100 according to the first embodiment will be described below.

(Imaged Data Input Unit 102)

The image data of a subject is continuously input to the imaged data input unit 102 through a photographing lens, an imaging element, and the like. The photographing lens images a subject, and is configured by a zoom lens for realizing the zoom function, a focus lens for focusing on the subject, and the like. The imaging element is configured by a CCD (Charge Coupled Device), CMOS (Complementary Metal Oxide Semiconductor) and the like. The imaging element converts the subject image imaged by the photographing lens to an electric signal, and generates analog image data. Thereafter, the image data output from the imaging element is subjected to gain adjustment and A/D (Analog/Digital) conversion.

The image data input to the imaged data input unit 102 in such manner is transferred to the image display range extraction unit 104 and the like and performed with a predetermined process, and then displayed on the display unit 112. When the user instructs recording of the image data, the image data input to the imaged data input unit 102 is transferred to the image recording range extraction unit 114, to be hereinafter described, and then recorded in the data storage unit 116 by a predetermined mode (image quality, aspect ratio, etc.).

(Image Display Range Extraction Unit 104)

The image display range extraction unit 104 extracts only the image of a region to display on the display unit 112 from the image data transferred from the imaged data input unit 102. The image display range extraction unit 104 can extract the image region according to the instruction from the control unit 126 based on the display performance of the display unit 112, the aspect ratio, the image size, the photographing mode, and the like set by the user. The image extracted by the image display range extraction unit 104 is transferred to the image synthesizing unit 108, to be hereinafter described, and synthesized with a notification image, and then displayed on the display unit 112.

(Notification Image Generation Unit 106)

The notification image generation unit 106 generates various notification images to display on the display unit 112. The notification image generated by the notification image generation unit 106 includes a guide frame 132 representing the region that can be photographed, a zoom state notification icon 134 warning the image-defect of a predetermined subject or notifying the user that the zoom function is limited, and the like.

The image displayed on the display unit 112 may not match the region that can be photographed depending on the image size or the aspect ratio with which the user desires to photograph. Therefore, the imaging apparatus 100 shows the region that can be photographed in the image of the display unit 112 viewed by the user to check the photographing region. The notification image generation unit 106 generates the guide frame 132 showing the photographing region to indicate to the user the region that can be recorded by photographing of the image displayed on the display unit 112. The notification image generation unit 106 can generate the notification image including the guide frame 132 according to the instruction from the control unit 126 based on the aspect ratio, the image size, the photographing mode, and the like set by the user.

Furthermore, when a predetermined subject approaches the boundary of the photographing region in accordance with the zoom process, the notification image generation unit 106 can generate a zoom warning icon 136 for notifying the user of the risk of image-defect as the zoom state notification icon 134. When a predetermined subject reaches the boundary of the photographing region in accordance with the zoom process, the notification image generation unit 106 may generate a zoom limiting icon 138 for notifying the user that the zoom process may not be performed any further in the magnifying direction as the zoom state notification icon 134. Thus, the notification image generation unit 106 can generate the notification image by appropriately changing the zoom state notification icon 134 in accordance with the zoom process.

The notification image generated by the notification image generation unit 106 is transferred to the image synthesizing unit 108, to be hereinafter described. The display example of the zoom state notification icon 134 (zoom warning icon 136 and zoom limiting icon 138) will be illustrated in the processing flow to be hereinafter described.

(Image Synthesizing Unit 108)

The image synthesizing unit 108 synthesizes the notification image generated by the notification image generation unit 106 to the image data extracted by the image display range extraction unit 104, and generates the image data to display on the display unit 112. The image data generated by the image synthesizing unit 108 is transferred to the display control unit 110, to be hereinafter described, and then displayed on the display unit 112.

(Display Control Unit 110)

The display control unit 110 controls the display of the display unit 112. The display control unit 110 controls various displays on the display unit 112 such as menu screen display, detailed setting screen display, image edit screen display, photographing screen display, message display, and the like. When the user instructs the display of the menu screen through the operation input unit 120, the display control unit 110 displays a predetermined menu screen on the display unit 112. As a result, the user can perform operations related to various settings such as initial setting, selection of photographing mode, image quality setting, image size setting, aspect ratio setting, display setting, and image editing while looking at the menu screen displayed on the display unit 112. The display control unit 110 can appropriately change the menu screen displayed on the display unit 112 according to such user operation.

When the user instructs the switching to the photographing mode of the image through the operation input unit 120, the display control unit 110 causes the display unit 112 to display the image data generated by the image synthesizing unit 108. As a result, the user can look at the guide frame 132, the zoom state notification icon 134, and the like displayed on the display unit 112, and perform the zoom process while checking the region that can be photographed to execute photographing.

The display control unit 110 can control the display on the display unit 112 according to the instruction of the user input from the operation input unit 120, or the instruction from the control unit 126 based on the setting information stored in the ROM (Read Only Memory) and the like. An example of the display control of the display unit 112 by the display control unit 110 in the image photographing mode will be described in the processing flow of hereinafter.

The display control unit 110 may additionally have various types of functions related to the display control of the display unit 112 other than the above. The display control unit 110 may obviously be able to compress the image data generated by the image synthesizing unit 108 to an image file that adapts to the display performance of the display unit 112, or convert the same to an image formant that adapts to the display format of the display unit 112.

(Display Unit 112)

The display unit 112 includes an LCD (Liquid Crystal Display), an organic EL (Electro Luminescence display), and the like, and is arranged on the imaging apparatus 100. The display unit 112 displays the image generated by the image synthesizing unit 108, that is, the image in which the notification image generated by the notification image generation unit 106 is synthesized to the image extracted by the image display range extraction unit 104. The display unit 112 may also display image data recorded in the data storage unit 116, notification message (e.g., photographing mode, available capacity notification, error notification) with respect to the user, detailed setting screen, and the like.

The display configuring the display unit 112 has a displayable region of an aspect ratio of 16:9, 4:3, and the like, but is not limited to a specific aspect ratio.

The display unit 112 may not be arranged on the imaging apparatus 100. If an external display is arranged in an external device connected (wired or wireless) to the imaging apparatus 100, the image generated by the image synthesizing unit 108 is transferred to the external device 128 by the display control unit 110. As a result, the user can execute various types of functions of the imaging apparatus 100 while looking at the image displayed on the external display.

(Image Recording Range Extraction Unit 114)

The image recording range extraction unit 114 extracts only the image of the region that can be recorded of the image data input to the imaged data input unit 102. For instance, if the user operates the operation button and instructs the start of photographing of the moving image, the image recording range extraction unit 114 continuously extracts the image data of the photographing region from the image data input to the imaged data input unit 102, and records the same in the data storage unit 116 as a moving image stream of a predetermined format. In this case, the image recording range extraction unit 114 can extract the image data based on the image size and the aspect ratio specified by the user, the image size and the aspect ratio automatically determined according to the photographing mode, or the like.

When the user instructs the photographing of the still image, the image recording range extraction unit 114 extracts only the image data of the photographing region from the image data worth one frame input to the imaged data input unit 102, and records in the data storage unit 116 as a still image file. In this case, the image recording range extraction unit 114 can extract the image data based on the image size and the aspect ratio specified by the user, the image size and the aspect ratio automatically determined according to the photographing mode, or the like.

As described above, the imaging apparatus 100 can simultaneously record the image of a plurality of aspect ratios. Therefore, when the user instructs the start of photographing of the image of a plurality of aspect ratios, the image recording range extraction unit 114 can extract the image data of the photographing region corresponding to the respective aspect ratio from the image data input to the imaged data input unit 102. For instance, assume a case where the user instructs the photographing of the still image corresponding to the aspect ratio 4:3 while photographing the moving image corresponding to the aspect ratio 16:9. In this case, the image recording range extraction unit 114 continuously extracts the image data of the photographing region of 16:9 from the image data generated by the imaged data input unit 102, and continuously records the same in the data storage unit 116 as the moving image stream of a predetermined format. Furthermore, the image recording range extraction unit 114 extracts the image data of the photographing region of 4:3 from the image data worth one frame generated by the imaged data input unit 102 in parallel to the recording of the moving image stream and records the same in the data storage unit 116 as the still image file of a predetermined format. As a result, the still image data corresponding to the aspect ratio 4:3 can be recorded while recording the moving image data corresponding to the aspect ratio 16:9 with respect to the image data input to the imaged data input unit 102.

Thus, when the user instructs the start of photographing, the image recording range extraction unit 114 extracts only the image data of the photographing region from the image data input to the imaged data input unit 102, and stores the same in the data storage unit 116. The image recording range extraction unit 114 can extract the image data according to the instruction from the control unit 126 based on the aspect ratio, the image size, the photographing mode, and the like set by the user. The image the image recording range extraction unit 114 can extract is not limited to a specific image size or aspect ratio.

(Data Storage Unit 116)

The data storage unit 116 functions as a non-volatile storage region for storing the image data recorded by the image recording range extraction unit 114. The data storage unit 116 is configured by a magnetic storage device such as HDD, a semiconductor storage device, an optical storage device, a magneto-optical storage device, or the like, and is not limited to a specific configuration as long as it is a non-volatile storage device capable of saving plural image data. The data storage unit 116 may not be built in the imaging apparatus 100. The data storage unit 116 may be arranged on a recording medium such as memory stick (registered trademark) or SD memory card inserted to a recording medium insertion unit (not shown) and the like provided in the imaging apparatus 100.

(Operation Input Unit 120)

The operation input unit 120 is configured to include an operation unit such as touch panel, button, switch, lever, and dial. The user operates such operation unit to instruct the processing operation (zoom restriction setting, mode change, aspect ratio setting, image quality adjustment, photographing operation, zoom/focus/aperture/shutter speed change, reproducing operation, etc.) on the imaging apparatus 100. The operation input unit 120 transmits the instruction information accepted from the user through the operation unit to the control unit 126. In response thereto, the control unit 126 controls each function configuration unit of the imaging apparatus 100 based on the instruction information transmitted from the operation input unit 120 to execute various types of functions desired by the user.

(Zoom Restriction Setting Unit 122)

When simultaneously photographing the image data of a plurality of aspect ratios, the zoom restriction setting unit 122 sets a zoom restriction on the photographing regions of one or all aspect ratios. The zoom restriction means controlling the display function and the zoom function of the imaging apparatus 100 so that the predetermined subject set by the user or automatically is not image-defected from the photographing region. In other words, the imaging apparatus 100 displays the zoom state notification icon 134 on the display unit 112 and the like or restricts the zoom function so that the predetermined subject is not image-defected from the photographing region of the aspect ratio set with the zoom restriction. Therefore, the imaging apparatus 100 according to the first embodiment has a characteristic of controlling the display function and the zoom function so that the predetermined subject is not image-defected from the photographing region of set aspect ratio when simultaneously photographing the image data of a plurality of aspect ratios.

The zoom restriction setting unit 122 determines to which aspect ratio to set the zoom restriction according to the instruction of the user input from the operation input unit 120 and the instruction from the control unit 126 based on the setting information and the like stored in the ROM and the like. For instance, when the user instructs the zoom restriction on the predetermined aspect ratio through the operation button and the like, the zoom restriction setting unit 122 sets the zoom restriction on the aspect ratio that accepted the instruction from the user according to the instruction from the control unit 126.

As described above, the imaging apparatus 100 according to the first embodiment has a characteristic of enabling the user to perform the zoom process based on the image displayed on the display unit 112 by setting the zoom restriction on the aspect ratio of a small photographing region. By way of example, a case of displaying the photographing region of 4:3 to a maximum extent on the display unit 112 of 4:3, and displaying the photographing region of aspect ratio 16:9 in a range smaller than the displaying region of the display unit 112 when simultaneously photographing the image data of 16:9 and the image data of 4:3 is assumed. In this case, the user can instruct the zoom restriction on the aspect ratio 16:9 through the operation button and the like. In response thereto, the zoom restriction setting unit 122 sets the zoom restriction on the aspect ratio 16:9, and transfers such setting information to the zoom control unit 124 and the like to be hereinafter described. The zoom control unit 124 then controls the zoom function so that the predetermined subject is not image-defected from the photographing region of 16:9 based on the transferred setting information of the zoom restriction, and instructs the notification image generation unit 106 of the generation of the zoom state notification icon 134. The zoom restriction setting unit 122 thus can automatically set the zoom restriction on the aspect ratio of smaller photographing region of the photographing regions of a plurality of aspect ratios even if an instruction from the user is not made.

(Zoom Control Unit 124)

The zoom control unit 124 performs the zooming control according to the instruction of the user input from the operation input unit 120, and the instruction from the control unit 126 based on the setting information and the like stored in the ROM and the like. For instance, when the user instructs a so-called optical zoom through the operation button and the like, the zoom control unit 124 instructs the execution of the zoom process on the imaged data input unit 102. In response thereto, the imaged data input unit 102 can change the image region imaged by driving the zoom lens and the like. The zoom control unit 124 may detect the predetermined subject contained in the photographing region according to the instruction from the control unit 126, and automatically perform the zooming control so that the subject is within the photographing region.

For instance, when the user instructs the so-called digital zoom through the operation button and the like, the zoom control unit 124 instructs the execution of the zoom process on the image display range extraction unit 104. In response thereto, the image display range extraction unit 104 can change the region to extract from the image data transferred from the imaged data input unit 102.

As described above, when simultaneously photographing the image data of a plurality of aspect ratios, the zoom restriction is sometimes set with respect to the image data of one of the aspect ratios by the zoom restriction setting unit 122. In this case, the zoom control unit 124 performs the zooming control so that the predetermined subject is not image-defected from the photographing region of the image data of the aspect ratio set with the zoom restriction based on the information transferred from the zoom restriction setting unit 122. For instance, the zoom control unit 124 limits the zoom function before the predetermined subject is image-defected from the photographing region of the aspect ratio set with the zoom restriction so that the subject falls within the photographing region of the set aspect ratio. The zoom control unit 124 can instruct the generation of the zoom warning icon 136 to the notification image generation unit 106 before the predetermined subject reaches the boundary of the photographing region of the aspect ratio set with the zoom restriction.

The zoom control unit 124 thus can execute a predetermined process so that the predetermined subject is not image-defected from the photographing region of the aspect ratio set with the zoom restriction when simultaneously photographing the image data of a plurality of aspect ratios. As a result, the user can photograph the image data so that the predetermined subject is not image-defected from the image data of each aspect ratio even when simultaneously photographing the image data of a plurality of aspect ratios.

The predetermined subject prevented from being image-defected from the photographing region of the aspect ratio set with the zoom restriction can be determined through various methods. For instance, when the user specifies a predetermined subject by operating the operation button and the like, the zoom control unit 124 can control various types of functions so that the subject specified by the user is not image-defected from the photographing region of the aspect ratio set with the zoom restriction. For instance, when having a function of automatically detecting the predetermined subject such as a face detection function, the zoom control unit 124 can control various types of controls so that the automatically detected predetermined subject is not image-defected from the photographing region of the aspect ratio set with the zoom restriction. Thus, the type and the determination method of the subject for preventing image-defect are not specifically limited.

(Control Unit 126)

The control unit 126 is a calculation processing device and a control device for controlling the entire imaging apparatus 100, and may be a CPU (Central Processing Unit). The control unit 126 instructs the execution of a predetermined process on each function configuration unit of the imaging apparatus according to the instruction from the operation input unit 120. The flow of process each function configuration unit executes by the control unit 126 will be described below.

One example of the function configuration of the imaging apparatus 100 according to the first embodiment has been described above. The function configuration shown in FIG. 1 centrally shows the function for realizing the control of the zoom function and the display function, which is a characteristic of first embodiment, but is not limited thereto. In addition to the function configuration unit shown in FIG. 1, the imaging apparatus 100 may additional include various types of functions of the usual imaging apparatus such as recording function, audio input/output function, communication function, and image editing function.

[1-2. Processing Flow Related to Zoom Process of Imaging Apparatus 100]

Figure 2:
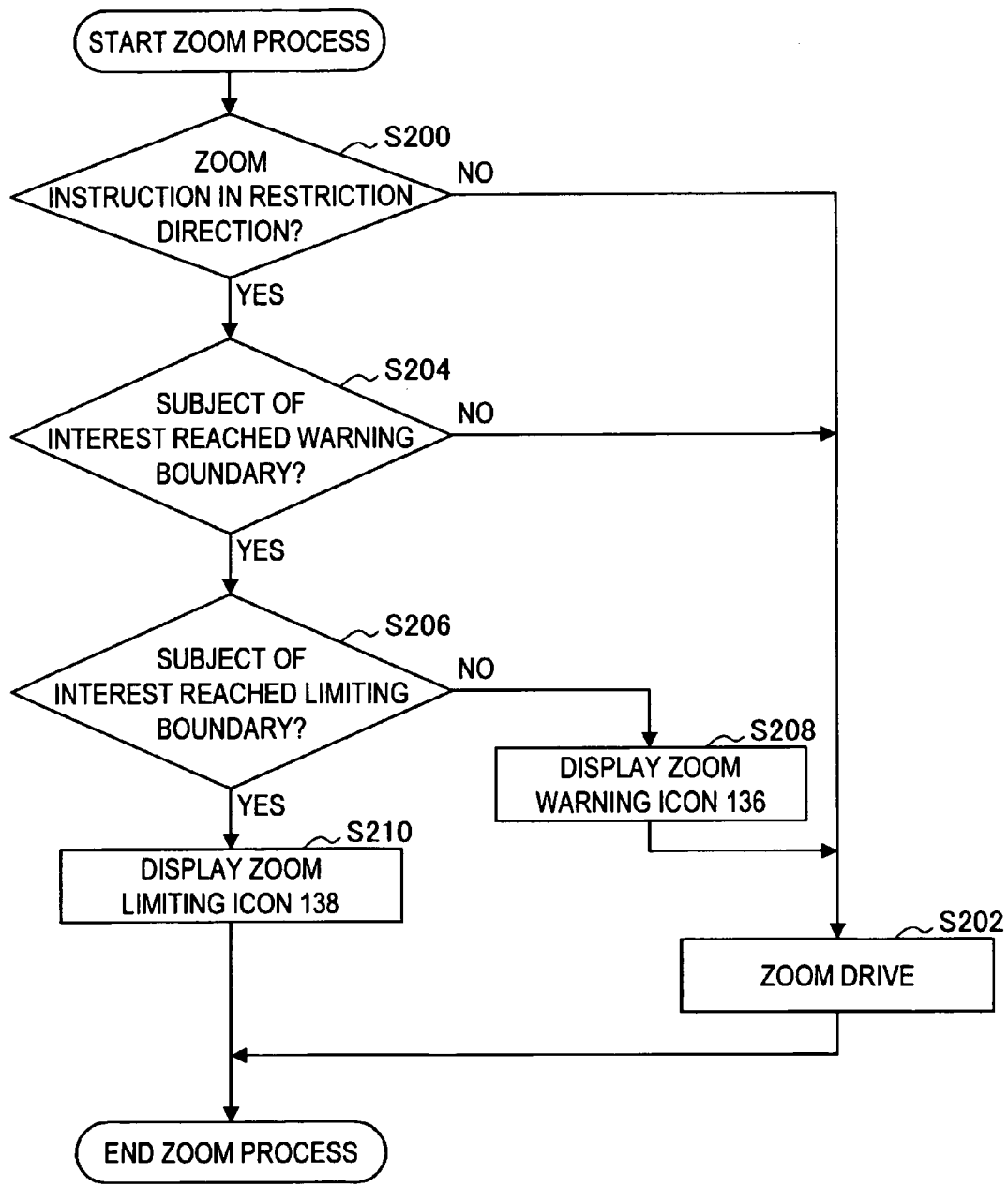
FIG. 2 is a flowchart showing one example of the flow of process when a zoom instruction is made from the user in the imaging apparatus 100 according to the first embodiment.
Figure 3:
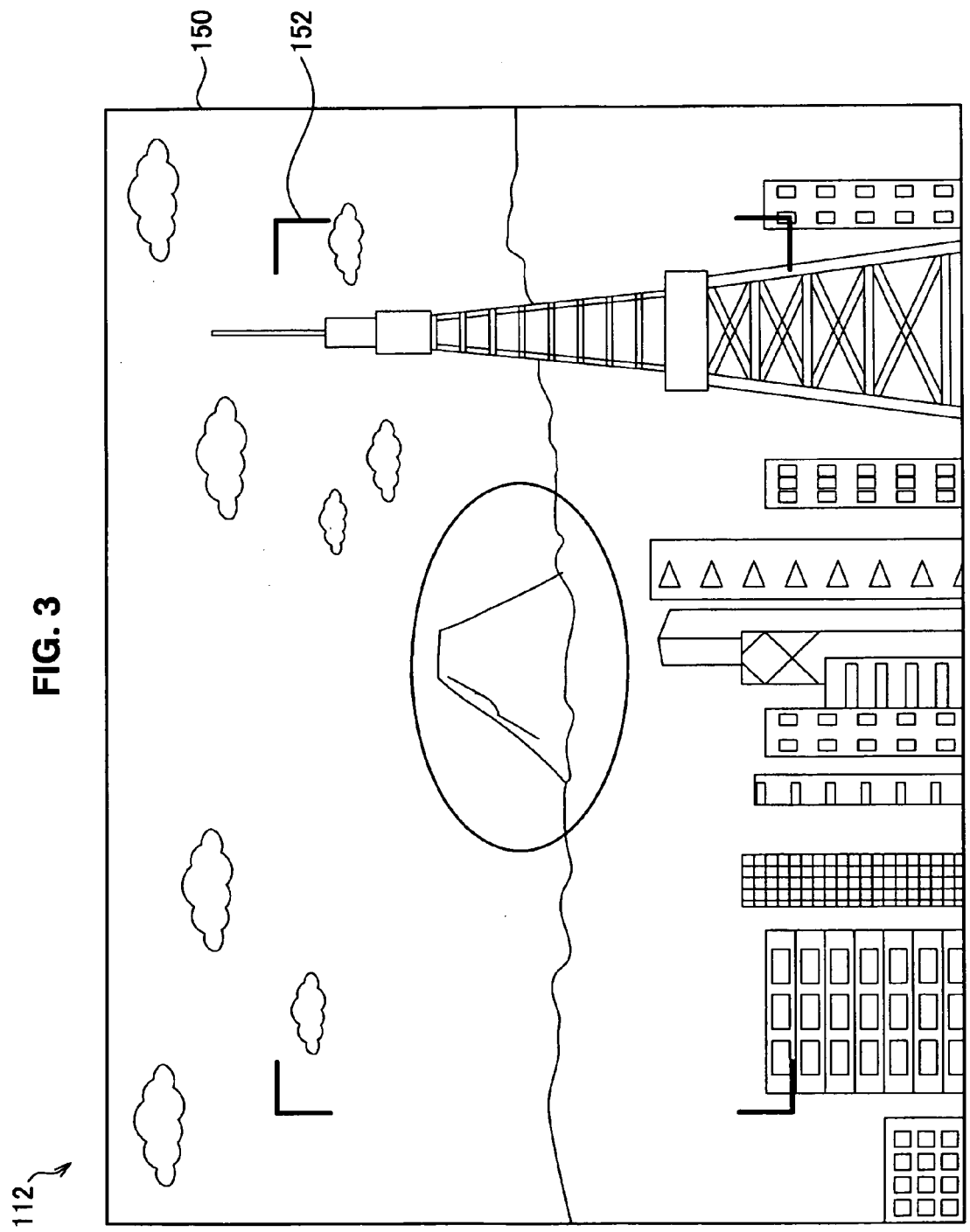
FIG. 3 is an explanatory view showing a display example of the display unit 112 before zooming in the imaging apparatus 100 according to the first embodiment.

The flow of zoom process by the imaging apparatus 100 having the above-described function configuration will be described with reference to the flowchart. FIG. 2 is a flowchart showing one example of the flow of process when a zoom instruction is made from the user in the imaging apparatus 100 according to the first embodiment. The process flow shown in FIG. 2 shows an example of the flow of process performed when the zoom restriction is set on the aspect ratio of smaller photographing region when simultaneously photographing the image data of a plurality of aspect ratios. For instance, FIG. 3 is an explanatory view showing a display example of the display unit 112 before accepting the zoom instruction from the user. In the example shown in FIG. 3, a photographing region 150 of aspect ratio 4:3 is displayed to a maximum extent on the display unit 112 having a displayable region of aspect ratio 4:3, and a photographing region 152 of aspect ratio 16:9 is displayed at one part of the displayable region of the display unit 112. The process flow of FIG. 2 will be described using a case in which the zoom restriction is set with respect to the smaller photographing region 152 of aspect ratio 16:9, and "Mt. Fuji" is set as the predetermined subject of interest, by way of example.

First, in step 200, the imaging apparatus 100 determines whether or not the zoom instruction by the user is the zoom instruction in the direction set with the zoom restriction, that is, the direction of magnifying the subject. The control unit 126 determines whether or not the zoom instruction in the direction of magnifying the subject based on the information related to the user operation transmitted from the operation input unit 120, and transfers the determination result to the zoom control unit 124.

If determined that the zoom instruction by the user is the zoom instruction in the direction of reducing the subject in step 200, the zoom control unit 124 performs the drive control etc. of the zoom lens in step 202. Thus, Mt. Fuji of the image smaller than the example shown in FIG. 3 is displayed on the display unit 112.

If determined that the zoom instruction by the user is the zoom instruction in the direction of magnifying the subject in step 200, the imaging apparatus 100 performs a determination process of step 204. In other words, the zoom control unit 124 determines whether or not Mt. Fuji, which is a subject of interest, has reached a warning boundary of the photographing region 152 of aspect ratio 16:9 set with the zoom restriction. The "warning boundary 154" is the boundary for notifying the user that image-defect occurs when the subject of interest is further continuously enlarged, and is set to a predetermined position in the photographing region of the aspect ratio set with the zoom restriction. The imaging apparatus 100 can set the boundary of the region having the size of 80% of the photographing region of the aspect ratio set with the zoom restriction as the warning boundary 154. The position of the warning boundary 154 obviously can be arbitrarily set/changed, and is not limited to a specific position. The position of the warning boundary 154 can be appropriately changed by the user, or may be automatically changed according to the photographing mode, and the like.

If determined that Mt. Fuji has not reached the warning boundary 154 of the photographing region 152 of aspect ratio 16:9, the risk Mt. Fuji is image-defected from the photographing region 152 of aspect ratio 16:9 does not arise even if the zoom process is performed in the direction of magnifying the subject. Therefore, the zoom control unit 124 performs the drive control of the zoom lens and the like in step 202. Mt. Fuji of the image displayed on the display unit 112 is contained in the photographing region 152 of aspect ratio 16:9, and becomes larger than the example shown in FIG. 3.

If determined that Mt. Fuji has reached the warning boundary 154 of the photographing region 152 of aspect ratio 16:9, Mt. Fuji may be image-defected from the photographed data of 16:9 if the zoom process is further continued. However, if the warning boundary 154 is set with a margin, Mt. Fuji is not image-defected from the photographing region 152 of aspect ratio 16:9 even if the zoom process is still performed in the direction magnifying the subject, and thus the imaging apparatus 100 performs the determination process of step 206. In other words, the zoom control unit 124 determines whether or not Mt. Fuji, which is the subject of interest, has reached the limiting boundary of the photographing region 152 of aspect ratio 16:9 set with the zoom restriction. The "limiting boundary" is the boundary for limiting so that the subject of interest is not further magnified, and is set in the photographing region of the aspect ratio set with the zoom restriction. The imaging apparatus 100 can set the boundary of the photographing region set with the zoom restriction as the limiting boundary. The imaging apparatus 100 may set the boundary of the region having a size of 95% of the photographing region 152 of aspect ratio 16:9 set with the zoom restriction as the limiting boundary in view of a margin of certain extent. The position of the limiting boundary obviously can be arbitrarily set/changed, and is not limited to a specific position. The position of the limiting boundary can be appropriately changed by the user, or may be automatically changed according to the photographing mode, and the like.

If determined that Mr. Fuji has not reached the limiting boundary of the photographing region 152 of aspect ratio 16:9 in step 206, the risk Mt. Fuji is image-defected from the photographing region 152 of aspect ratio 16:9 does not arise even if the zoom process is performed in the direction of magnifying the subject. However, notification is to be made to the user that Mt. Fuji may be image-defected from the photographing region 152 of aspect ratio 16:9 if the zoom process in the direction of magnifying the subject is further continued. Therefore, the imaging apparatus 100 displays a zoom warning icon 136 on the display unit 112 in step 208. In other words, the notification image generation unit 106 generates a notification image including the zoom warning icon 136 indicating that Mt. Fuji has reached the warning boundary 154 of the photographing region 152 of aspect ratio 16:9, and transfers the same to the image synthesizing unit 108. In response thereto, the image synthesizing unit 108 synthesizes the image extracted by the image display range extraction unit 104 and the notification image including the zoom warning icon 136, and transfers the same to the display control unit 110. The zoom warning icon 136 is thus displayed on the display unit 112 as the zoom state notification icon 134.

Thereafter, in step 202, the zoom control unit 124 performs the drive control of the zoom lens, and the like, so that Mt. Fuji of the image displayed on the display unit 112 is magnified.

Figure 4:
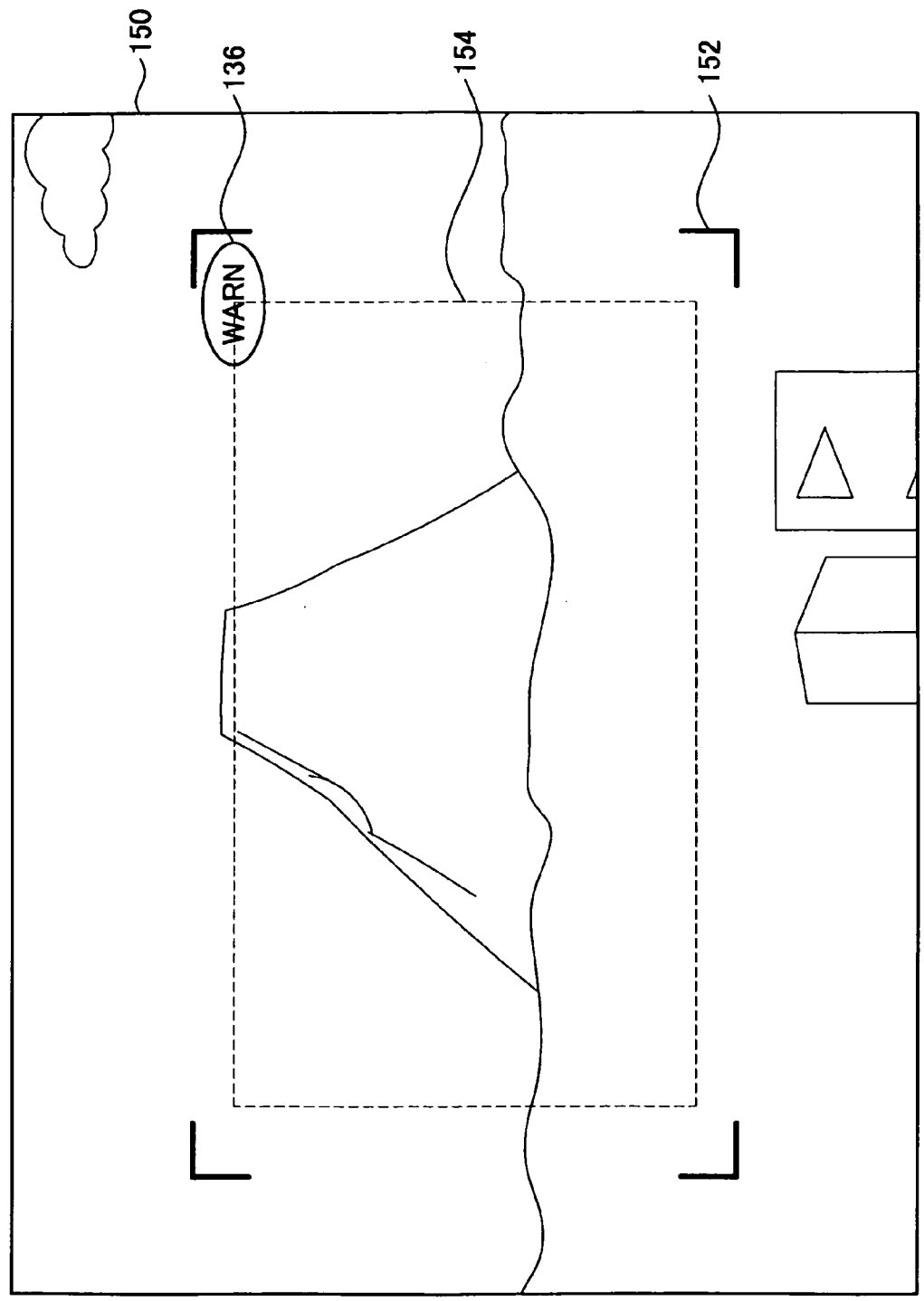
FIG. 4 is an explanatory view showing a display example of a zoom warning icon 134 in the imaging apparatus 100 according to the first embodiment.

FIG. 4 is an explanatory view showing a display example of the display unit 112 displaying the zoom warning icon 136 in step 208. As shown in FIG. 4, Mt. Fuji exists in a range beyond the warning boundary 154, but has not reached the limiting boundary (set to the boundary of the photographing region 152 of aspect ratio 16:9). Therefore, the zoom warning icon 136 of the character "WARN" is displayed on the display unit 112. The user thus can easily recognize that Mt. Fuji may be image-defected from the image data of 16:9 if the zoom process in the magnifying direction is further performed.

If determined that Mt. Fuji has reached the limiting boundary of the photographing region 152 of aspect ratio 16:9 in step 206, Mt. Fuji may be image-defected from the image data of 16:9 if the zoom process is further performed in the direction of magnifying the subject. Therefore, the zoom control unit 124 disables the zoom function and does not perform the zoom process on the zoom instruction from the user. Furthermore, the imaging apparatus 100 causes the display unit 112 to display the zoom limiting icon 138 in step 210. In other words, the notification image generation unit 106 generates a notification image including the zoom limiting icon 138 indicating that Mt. Fuji has reached the limiting boundary of the photographing region 152 of aspect ratio 16:9, and transfers the same to the image synthesizing unit 108. In response thereto, the image synthesizing unit 108 synthesizes the image extracted by the image display range extraction unit 104 and the notification image including the zoom limiting icon 138, and transfers the same to the display control unit 110. The zoom limiting icon 138 notifying the user that the zoom process of magnifying the subject may not be further performed is thus displayed on the display unit 112 as the zoom state notification icon 134.

Figure 5:
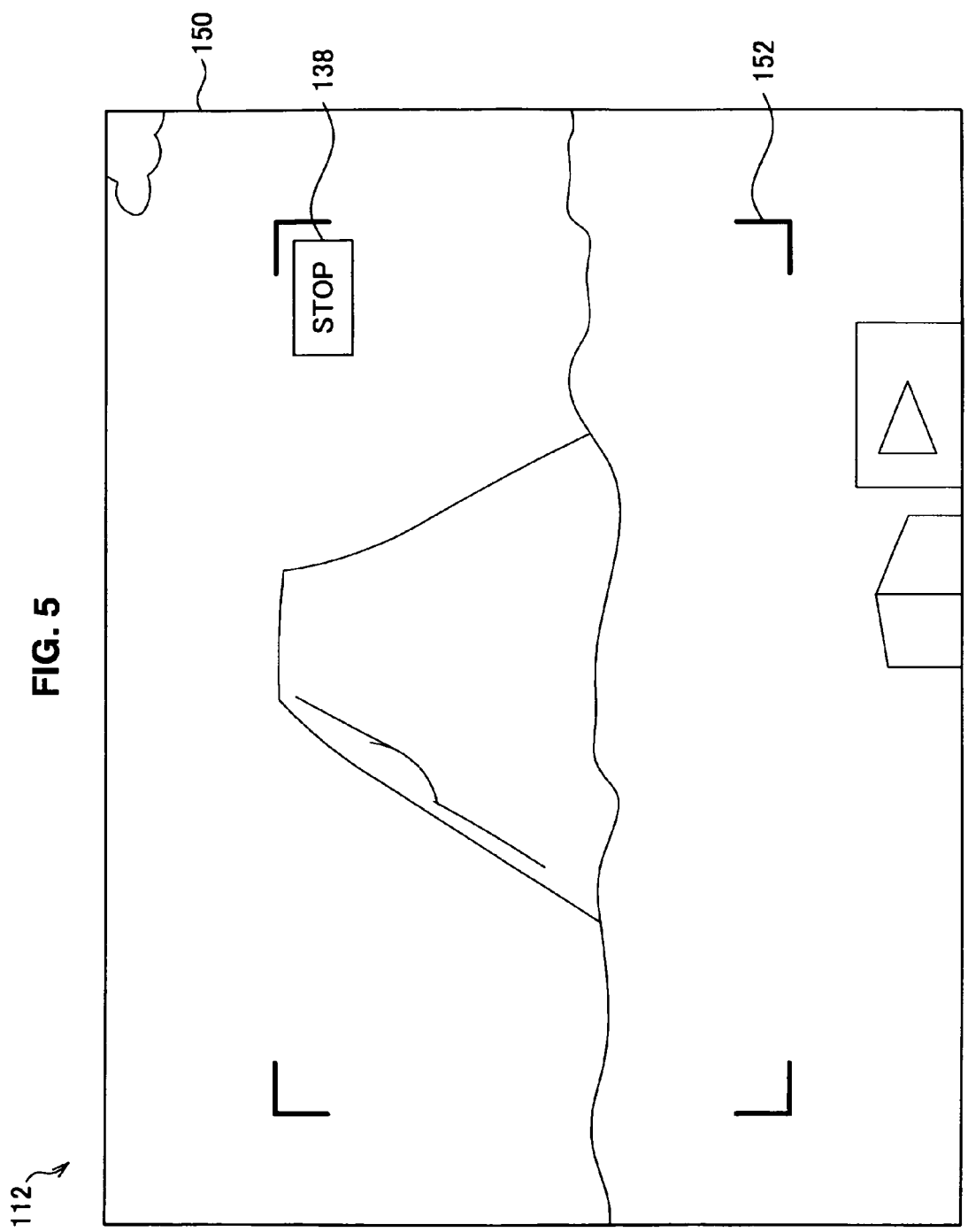
FIG. 5 is an explanatory view showing a display example of a zoom limiting icon 136 in the imaging apparatus 100 according to the first embodiment.

FIG. 5 is an explanatory view showing a display example of the display unit 112 displaying the zoom limiting icon 138 in step 210. As shown in FIG. 5, Mt. Fuji has reached the limiting boundary (set to the boundary of the photographing region 152 of aspect ratio 16:9). Therefore, the zoom limiting icon 138 of the character "STOP" is displayed on the display unit 112. The user thus can easily recognize that the zoom process may not be further performed in the magnifying direction.

Therefore, the imaging apparatus 100 according to the first embodiment can control the display function and the zoom function so that a predetermined subject of interest is not image-defected from the image data of each aspect ratio when simultaneously photographing the image data of a plurality of aspect ratios. In other words, the imaging apparatus 100 sets the zoom restriction on the photographing region of smaller aspect ratio of the photographing regions of a plurality of aspect ratios. Thus, when the predetermined subject of interest approaches the boundary of the photographing region of the aspect ratio set with the zoom restriction, the imaging apparatus 100 can display a warning display (zoom warning icon 136) on the display unit 112. When the predetermined subject of interest has reached the boundary of the photographing region of the aspect ratio set with the zoom restriction, the imaging apparatus 100 can prevent the subject of interest from being image-defected from the image data by disabling the zoom function. Moreover, the imaging apparatus 100 can cause the display unit 112 to display a notification icon (zoom limiting icon 138) notifying the user that the zoom function is limited and that the zoom process may not be further performed in the magnifying direction. In other words, when simultaneously photographing the image data of a plurality of aspect ratios, the imaging apparatus 100 according to the first embodiment can control the display function and the zoom function so that the predetermined subject is not image-defected from the photographing region of the image data of the respective aspect ratio.

In the above description, a case where the display unit 112 has a displayable region of aspect ratio 4:3, and the image data of aspect ratio 16:9 and the image data of aspect ratio 4:3 are simultaneously photographed has been described by way of example, but the present invention is not limited thereto. The display unit 112 may have a displayable region of aspect ratio 16:9 and the image data of other aspect ratios may be simultaneously photographed.

The character, color, size, display position and the like of the zoom warning icon 136 and the zoom limiting icon 138 are not limited to the examples shown in FIGS. 4 and 5. The character, color, size, display position and the like of the zoom warning icon 136 and the zoom limiting icon 138 can be arbitrarily set and changed. In the display example shown in FIG. 4, the warning boundary 154 is shown with a broken line for the sake of convenience of explanation, but actually, the warning boundary 154 may not be displayed on the display unit 112.

<2. Second Embodiment>

[2-1. Outline of Imaging Apparatus 200 According to Second Embodiment]

Now, the outline of an imaging apparatus 200 according to a second embodiment of the present invention having the function of the imaging apparatus 100 according to the first embodiment and capable of enhancing the degree of freedom of setting of the zoom restriction will be described.

The imaging apparatus 100 according to the first embodiment can prevent a predetermined subject from being image-defected from the photographed data each aspect ratio by setting the zoom restriction on the aspect ratio of smaller photographing region of the photographing regions of a plurality of aspect ratios. However, the image-defect may not be prevented from the photographed data of all aspect ratios depending on the user, the photographing situation and the like, and a case of preferentially preventing the image-defect only from the photographed data of a specific aspect ratio will be assumed. When preferentially preventing the image-defect from the photographed data of an aspect ratio of smaller photographing regions of the photographing regions of a plurality of aspect ratios, this can be realized by the imaging apparatus 100 according to the first embodiment. The imaging apparatus 200 according to the second embodiment has a characteristic in controlling the display function and the zoom function when preferentially preventing the image-defect from the photographed data of an aspect ratio of larger photographing region of the photographing regions of a plurality of aspect ratios.

For instance, describing FIG. 3 by way of example, when the user mainly photographs the data of aspect ratio 4:3, and secondarily photographing the data of aspect ratio 16:9, a case of preventing the image-defect only from the photographed data of aspect ratio 4:3 is assumed. In such case as well, the imaging apparatus 200 according to the second embodiment can prevent a predetermined subject of interest from being image-defected from the photographed data of aspect ratio 4:3 by setting the zoom restriction on the larger photographing region 150 of aspect ratio 4:3. In other words, the imaging apparatus 200 according to the second embodiment does to limit the zoom function until the subject reaches the limiting boundary of the photographing region 150 of aspect ratio 4:3 even if the predetermined subject of interest is image-defected from the photographing region 152 of aspect ratio 16:9 secondarily photographed according to the zoom process. Furthermore, the imaging apparatus 200 according to the second embodiment can display the zoom state notification icon 134 for cautioning and warning that image-defect has occurred from the photographed data of 16:9.

When simultaneously photographing the image data of a plurality of aspect ratios, to which photographing region of which aspect ratio to set the zoom restriction is arbitrarily set by the user or automatically set according to the photographing mode, and the like. In other words, if the zoom restriction is set on the photographing region 152 of aspect ratio 16:9 of smaller photographing region in the example shown in FIG. 3, the zooming control by the imaging apparatus 100 of the first embodiment is performed. If the zoom restriction is set on the photographing region 150 of aspect ratio 4:3 of larger photographing region, the zooming control by the imaging apparatus 200 of the second embodiment described below is performed.

[2-2. Processing Flow Related to Zoom Process of Imaging Apparatus 200]

Figure 6:
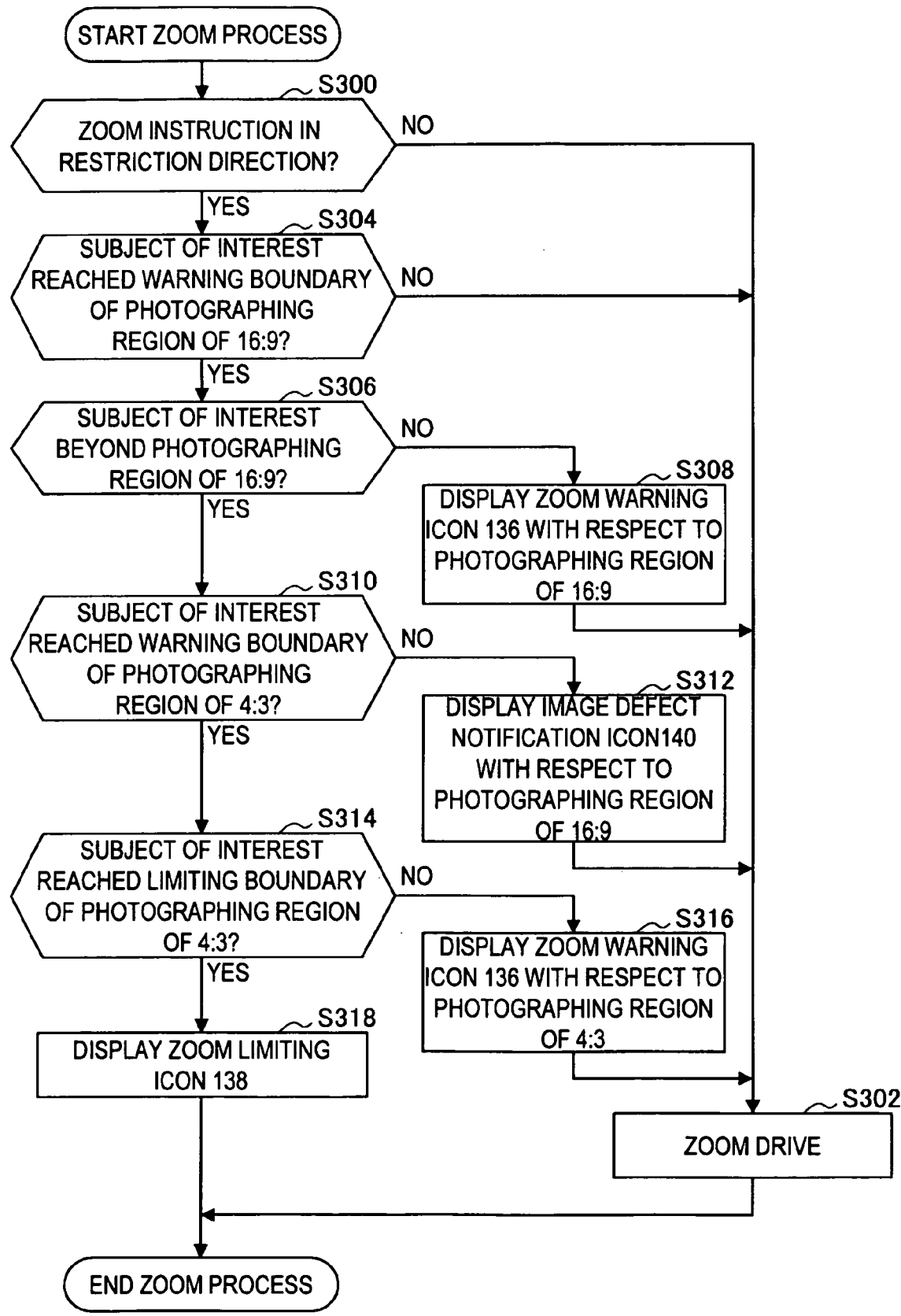
FIG. 6 is a flowchart showing one example of the flow of process when a zoom instruction is made from the user in an imaging apparatus 200 according to a second embodiment of the present invention.

The flow of zoom process by the imaging apparatus 200 according to the second embodiment will be described with reference to the flowchart. FIG. 6 is a flowchart showing one example of the flow of process when a zoom instruction is made from the user in the imaging apparatus 200 according to the second embodiment. The process flow shown in FIG. 6 shows an example of the flow of process performed when the zoom restriction is set on the aspect ratio of larger photographing region when simultaneously photographing the image data of a plurality of aspect ratios. The process flow of FIG. 6 will be described using a case in which the zoom restriction is set with respect to the larger photographing region 150 of aspect ratio 4:3, and "Mt. Fuji" is set as the predetermined subject of interest, by way of example.

First, in step 300, the imaging apparatus 200 determines whether or not the zoom instruction by the user is the zoom instruction in the direction set with the zoom restriction, that is, the direction of magnifying the subject.

If determined that the zoom instruction by the user is the zoom instruction in the direction of reducing the subject in step 300, the zoom control unit 124 performs the drive control etc. of the zoom lens in step 302. Thus, Mt. Fuji smaller than the example shown in FIG. 3 is displayed on the display unit 112.

If determined that the zoom instruction by the user is the zoom instruction in the direction of magnifying the subject in step 300, the imaging apparatus 100 performs a determination process of step 304. In other words, the zoom control unit 124 determines whether or not Mt. Fuji, which is a subject of interest, has reached a warning boundary 154 of the photographing region 152 of aspect ratio 16:9 set with the zoom restriction. The imaging apparatus 200 according to the second embodiment can set the warning boundary 154 not only on the photographing region 150 of aspect ratio 4:3 set with the zoom restriction, but also on the photographing region 152 of aspect ratio 16:9 not set with the zoom restriction. The imaging apparatus 200 thus can notify the user in a cautioning manner that there is a possibility image-defect may occur from the image data of 16:9 not set with the zoom restriction.

If determined that Mt. Fuji has not reached the warning boundary 154 of the photographing region 152 of aspect ratio 16:9 in step 304, the zoom control unit 124 does not perform the drive control of the zoom lens and the like in step 302.

If determined that Mt. Fuji has reached the warning boundary 154 in step 304, the imaging apparatus 200 performs the determination process of step 306 since the zoom restriction is set on the photographing region 150 of aspect ratio 4:3. In other words, the zoom control unit 124 determines whether or not Mt. Fuji exists in a region beyond the photographing region 152 of aspect ratio 16:9 not set with the zoom restriction.

If determined that Mt. Fuji does not exist in the region beyond the photographing region 152 of aspect ratio 16:9 not set with the zoom restriction in step 306, the imaging apparatus 200 displays the zoom warning icon 136 on the display unit 112 in step 308. Therefore, the zoom warning icon 136 same as in the example shown in FIG. 4 is displayed as the zoom state notification icon 134. As a result, the imaging apparatus 200 can notify in a cautioning manner that the predetermined subject of interest may be image-defected for the photographing region of aspect ratio not set with the zoom restriction, that is, for the image data the user desires to secondarily photograph. The user then can easily stop the zoom process in the direction of magnifying the subject according to importance of the secondarily photographed data, change of photographing situation, and the like.

Thereafter, in step 302, the zoom control unit 124 performs the drive control of the zoom lens, and the like, so that Mt. Fuji of the image displayed on the display unit 112 is magnified.

Here, the zoom restriction is set on the photographing region 150 of aspect ratio 4:3. Therefore, the imaging apparatus 200 performs the determination process of step 310 even if determined that Mt. Fuji exists in the region beyond the photographing region 152 of aspect ratio 16:9 in step 306. That is, the zoom control unit 124 determines whether or not Mt. Fuji, which is the subject of interest, has reached the warning boundary 154 of the photographing region 150 of aspect ratio 4:3 set with the zoom restriction.

If determined that Mt. Fuji has not reached the warning boundary 154 of the photographing region 150 of aspect ratio 4:3 in step 310, the risk Mt. Fuji is image-defected from the photographing region 150 of aspect ratio 4:3 does not arise even if the zoom process in the direction of magnifying the subject is performed. However, Mt. Fuji is already image-defected from the photographing region 152 of aspect ratio 16:9 set with the zoom restriction. In such case, the imaging apparatus 200 according to the second embodiment can notify the user, in a cautioning manner, that image-defect has occurred from the image data of 16:9 not set with the zoom restriction.

In other words, in step 312, the imaging apparatus 200 displays on the display unit 112 an image-defect notification icon 140 notifying, in a cautioning manner, that the subject of interest is image-defected from the photographing region of aspect ratio not set with the zoom restriction. That is, the notification image generation unit 106 generates a notification image containing generates a notification image including the image-defect notification icon 140 indicating that Mt. Fuji is image-defected from the photographing region 152 of aspect ratio 16:9, and transfers the same to the image synthesizing unit 108. In response thereto, the image synthesizing unit 108 synthesizes the image extracted by the image display range extraction unit 104 and the notification image including the image-defect notification icon 140, and transfers the same to the display control unit 110. The image-defect notification icon 140 is thus displayed on the display unit 112 as the zoom state notification icon 134.

Thereafter, in step 302, the zoom control unit 124 performs the drive control of the zoom lens, and the like, so that Mt. Fuji of the image displayed on the display unit 112 is magnified.

Figure 7:
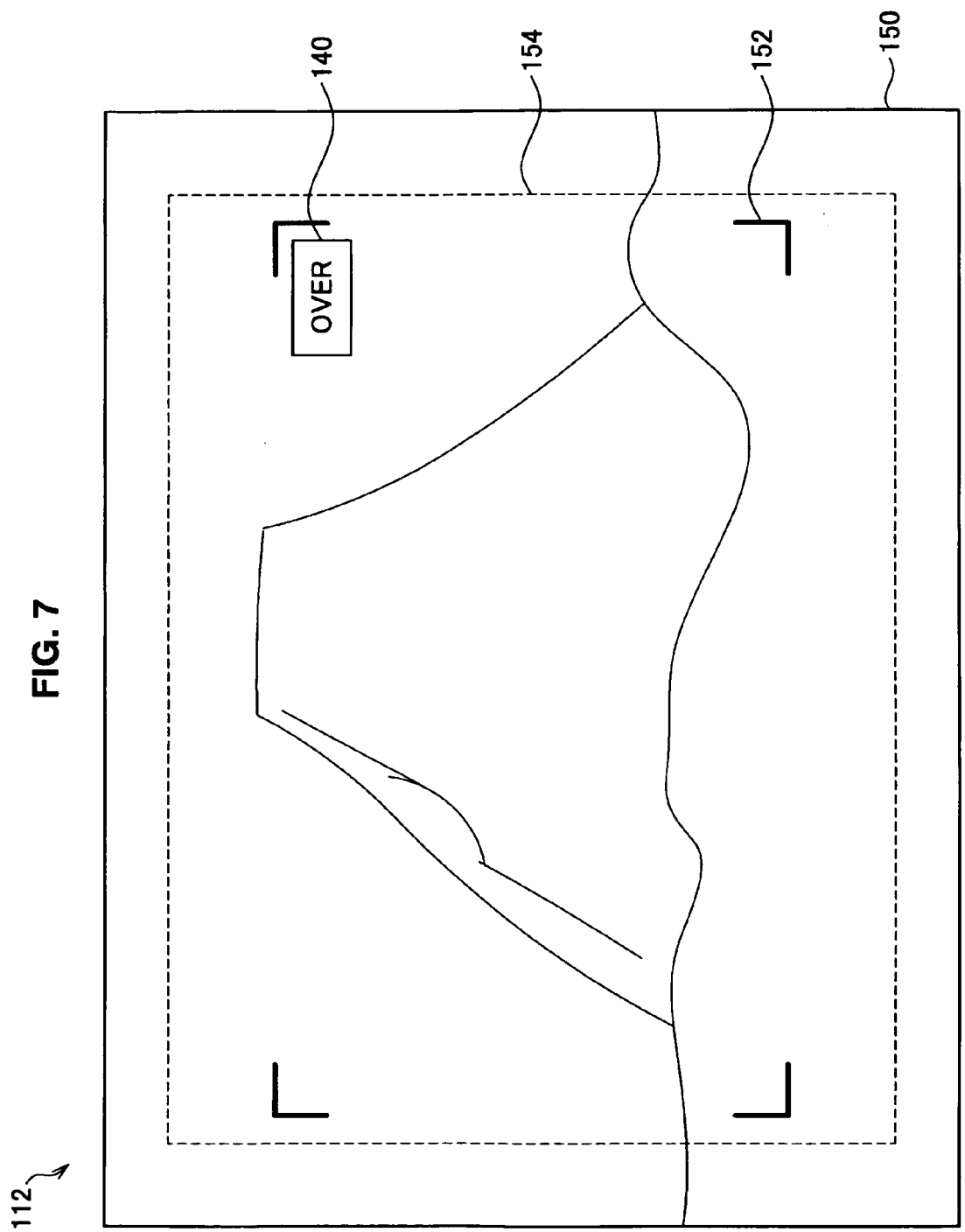
FIG. 7 is an explanatory view showing a display example of an image-defect notification icon 140 in the imaging apparatus 200 according to the second embodiment.

FIG. 7 is an explanatory view showing a display example of the display unit 112 displaying the image-defect notification icon 140 in step 312. As shown in FIG. 7, Mt. Fuji exists in a region beyond the photographing region 152 of aspect ratio 16:9, but has not reached the warning boundary 154 of the photographing region 150 of aspect ratio 4:3. Therefore, the image-defect notification icon 140 of the character "OVER" is displayed on the display unit 112. As a result, the imaging apparatus 200 can notify, in a cautioning manner, that the predetermined subject of interest is image-defected for the photographing region of aspect ratio not set with the zoom restriction, that is the image data the user desires to secondarily photograph. The user thus performs the zoom process in the direction of reducing the subject, and avoids image-defect from the secondarily photographed data according to the importance of the secondary photographed data, change of photographing situation, and the like.

If determined that Mt. Fuji has reached the warning boundary 154 of the photographing region 150 of aspect ratio 4:3 in step 310, Mt. Fuji may be image-defected from the photographed data of 4:4 if the zoom process is further continued. However, if the warning boundary 154 is set with a margin, Mt. Fuji is not image-defected from the photographing region 150 of aspect ratio 4:3 even the zoom process is performed in the direction of magnifying the subject, and thus the imaging apparatus 200 performs the determination process of step 314. In other words, the zoom control unit 124 determines whether or not Mt. Fuji, which is the subject of interest, has reached the limiting boundary of the photographing region 150 of aspect ratio 4:3 set with the zoom restriction.

If determined that Mr. Fuji has not reached the limiting boundary of the photographing region 150 of aspect ratio 4:3 in step 314, the risk Mt. Fuji is image-defected from the photographing region 150 of aspect ratio 4:3 does not arise even if the zoom process is performed in the direction of magnifying the subject. However, notification is to be made to the user that Mt. Fuji may be image-defected from the photographing region 150 of aspect ratio 4:3 if the zoom process in the direction of magnifying the subject is further continued. Therefore, the imaging apparatus 100 displays the zoom warning icon 136 on the display unit 112 as the zoom state notification icon 134 in step 316.

Thereafter, in step 302, the zoom control unit 124 performs the drive control of the zoom lens, and the like, so that Mt. Fuji of the image displayed on the display unit 112 is magnified.

Figure 8:
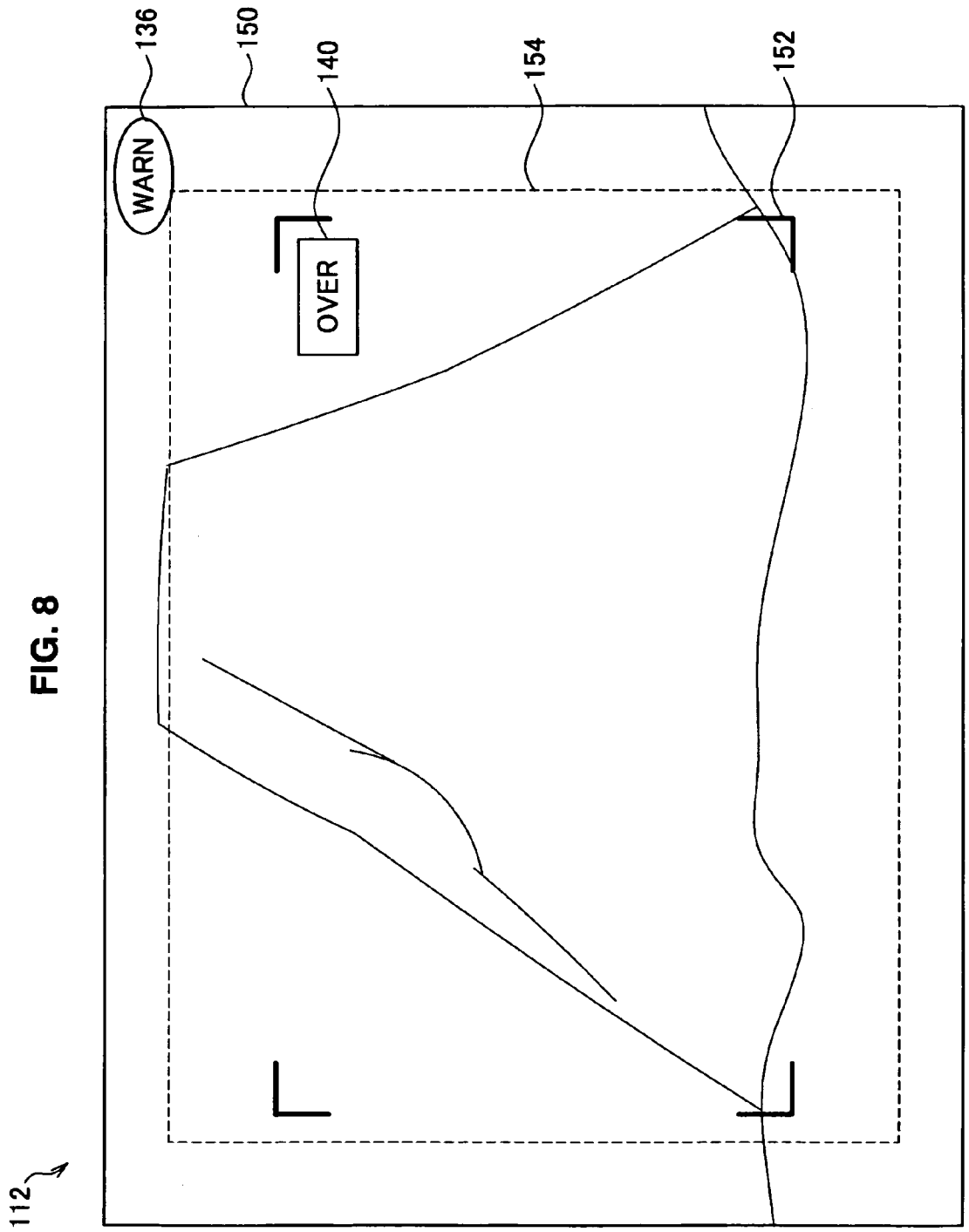
FIG. 8 is an explanatory view showing a display example of the zoom warning icon 134 in the imaging apparatus 200 according to the second embodiment.

FIG. 8 is an explanatory view showing a display example of the display unit 112 displaying the zoom warning icon 136 in step 316. As shown in FIG. 8, Mt. Fuji exists in a range beyond the warning boundary 154 of the photographing region 150 of aspect ratio 4:3, but has not reached the limiting boundary (set to the boundary of the photographing region 150 of aspect ratio 4:3). Therefore, the zoom warning icon 136 of the character "WARN" is displayed on the display unit 112. The user thus can easily recognize that Mt. Fuji may be image-defected from the image data of 4:4 if the zoom process in the magnifying direction is further performed.

If determined that Mt. Fuji has reached the limiting boundary of the photographing region 150 of aspect ratio 4:3 in step 314, Mt. Fuji may be image-defected from the image data of 4:3 if the zoom process is further performed in the direction of magnifying the subject. Therefore, the zoom control unit 124 disables the zoom function and does not perform the zoom process on the zoom instruction from the user. Furthermore, the imaging apparatus 200 causes the display unit 112 to display the zoom limiting icon 138 as the zoom state notification icon 134 in step 318.

Figure 9:
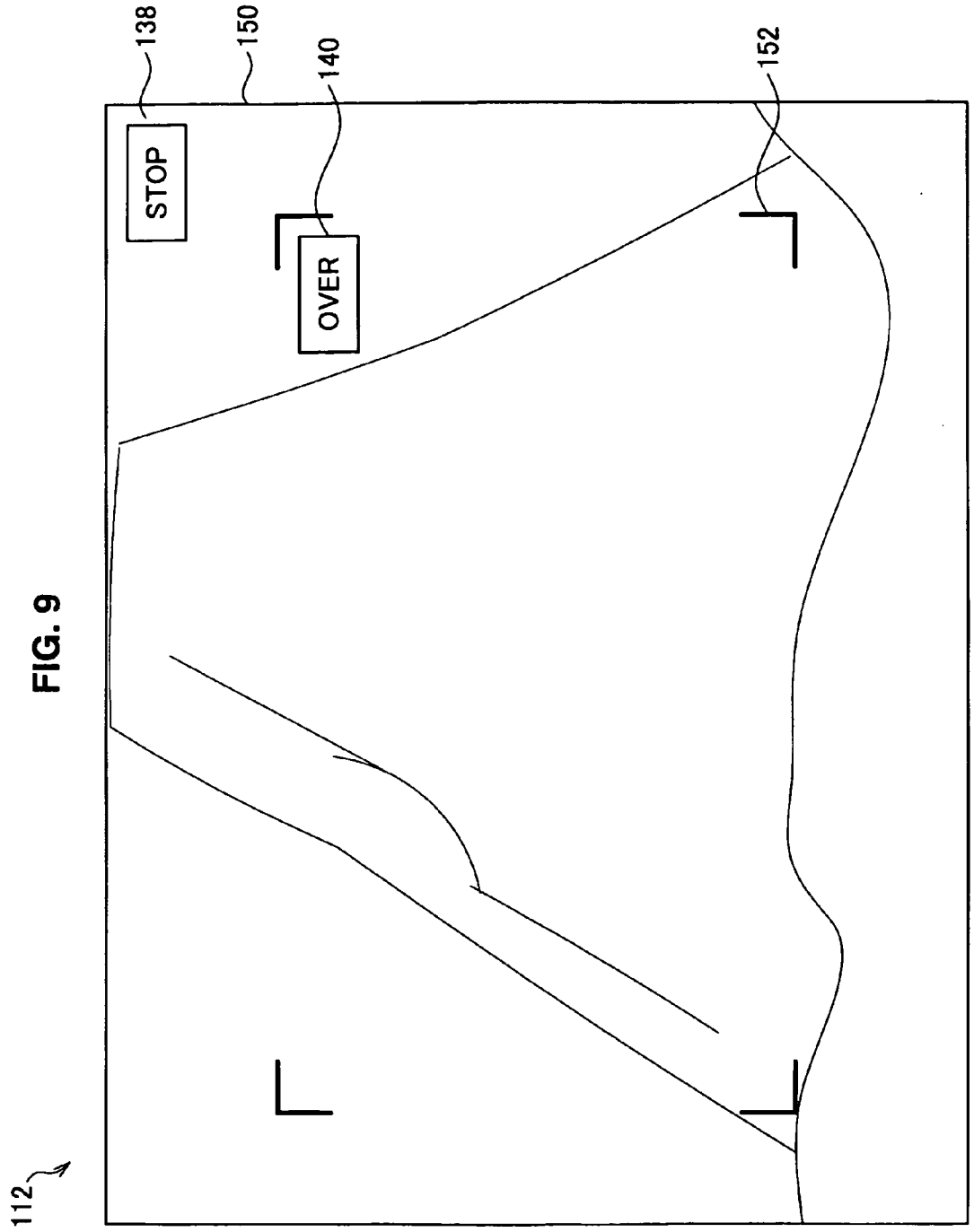
FIG. 9 is an explanatory view showing a display example of the zoom limiting icon 136 in the imaging apparatus 200 according to the second embodiment.

FIG. 9 is an explanatory view showing a display example of the display unit 112 displaying the zoom limiting icon 138 in step 318. As shown in FIG. 9, Mt. Fuji has reached the limiting boundary of aspect ratio 4:3 (set to the boundary of the photographing region 150 of aspect ratio 4:3). Therefore, the zoom limiting icon 138 of the character "STOP" is displayed on the display unit 112. The user thus can easily recognize that the zoom process may not be further performed in the magnifying direction.

Therefore, the imaging apparatus 200 according to the second embodiment can control the display function and the zoom function so that a predetermined subject of interest is not image-defected only from the photographing region of larger aspect ratio when simultaneously photographing the image data of a plurality of aspect ratios. In other words, the imaging apparatus 200 sets the zoom restriction on the photographing region of larger aspect ratio of the photographing regions of a plurality of aspect ratios. Thus, the imaging apparatus 200 can magnify the subject without disabling the zoom function until the predetermined subject of interest reaches the boundary of the photographing region of the aspect ratio set with the zoom restriction. The imaging apparatus can display the zoom state notification icon 134 on the display unit 112 while appropriately changing the same according to the situation of the zoom process even with respect to the state related to image-defect of the image data of the aspect ratio not set with the zoom restriction. Therefore, the imaging apparatus 200 can notify the user, in a cautioning manner, of the image-defect state according to the zoom process even with respect to the image data of the aspect ratio not set with the zoom restriction. The user thus can easily prevent and avoid image-defect of the image data of the aspect ratio not set with the zoom restriction according to the importance of the secondary photographed data, the change of the photographing situation, and the like. Thus, when simultaneously photographing the image data of a plurality of aspect ratios, the imaging apparatus 200 according to the second embodiment can control the display function and the zoom function so that the predetermined subject is not image-defected only from the photographing region of the image data of larger aspect ratio.

In the above description, a case where the display unit 112 displays the zoom state notification icon 134, in a cautioning manner, even with respect to the image-defect from the image data of aspect ratio 16:9 not set with the zoom restriction has been described by way of example, but the present invention is not limited thereto. For instance, when the user desires to photograph mainly only the image data of aspect ratio 4:3, the zoom state notification icon 134 warning image-defect, and the like may not be displayed for the image data of the aspect ratio not set with the zoom restriction. The presence of display of the zoom state notification icon 134 related to the image data of the aspect ratio not set with the zoom restriction may be arbitrarily set by the product specification, setting change by the user, and the like.

<3. Third Embodiment>

[3-1. Outline of Imaging Apparatus 300 According to Third Embodiment]

In the first and second embodiments, the characteristic of the display function and the zoom function when simultaneously photographing the image data of a plurality of aspect ratios has been centrally described. The control of the display function and the zoom function when simultaneously reproducing the imaged data on a plurality of displays having different aspect ratios is one characteristic. The outline of the imaging apparatus 300 according to the third embodiment will be described below.

In a normal imaging apparatus, the user can display the photographed image data on a display arranged in the imaging apparatus, and browse through. The user can also display the image data not only on the display arranged in the imaging apparatus, but also on an external display externally connected to the imaging apparatus, and browse through. Furthermore, the user can make a zoom instruction to the imaging apparatus to display, in a magnified manner, the predetermined subject of interest while browsing the image data displayed on either display. However, if the aspect ratio of the display arranged in the imaging apparatus and the aspect ratio of the externally connected display differ, the range of image data display on both displays may differ. In such case, when the user displays, in a magnified manner, the subject of interest based on the image displayed on one display, the subject of interest may run out from the display screen in another display.

Figure 10:
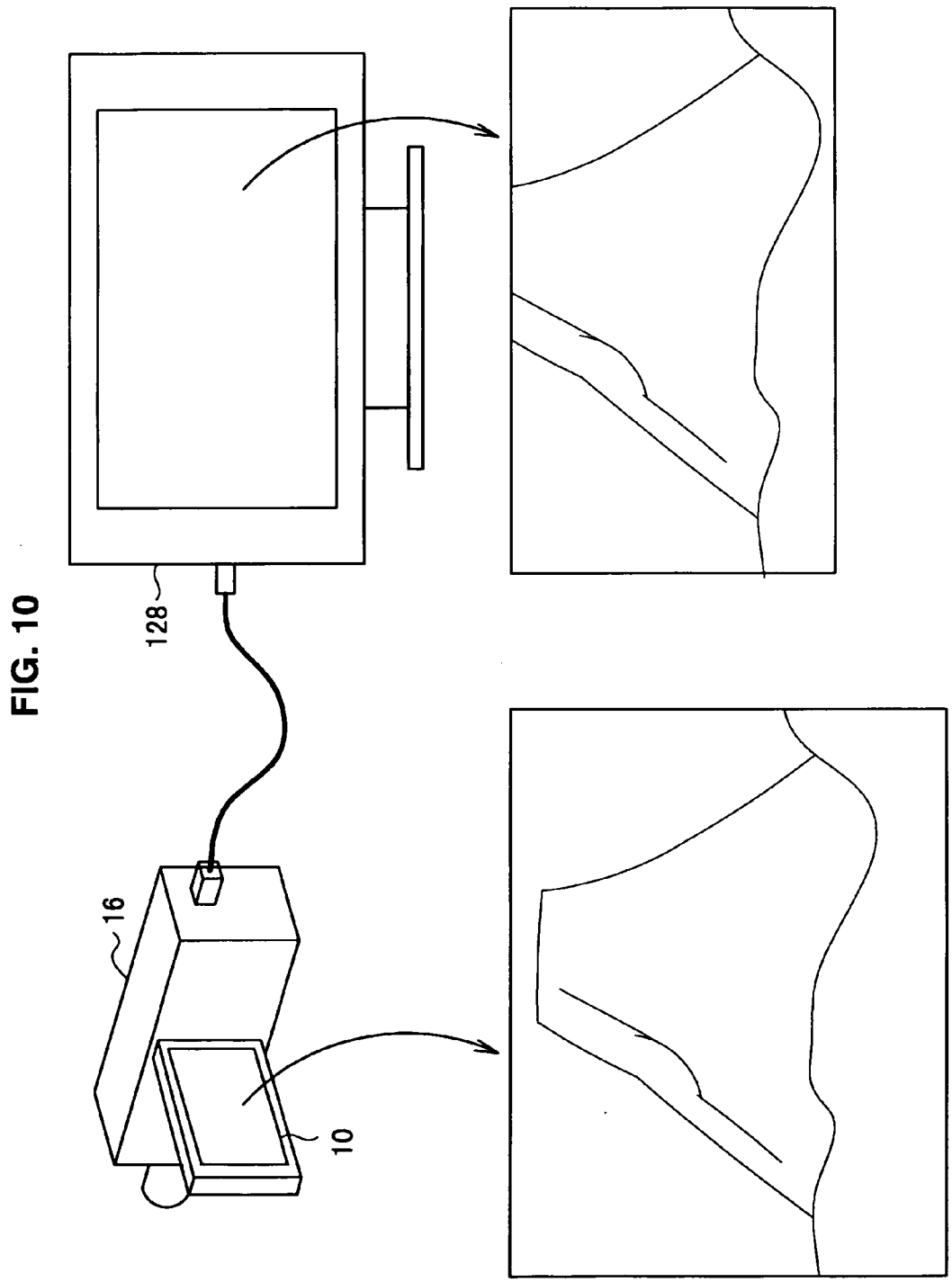
FIG. 10 is an explanatory view showing an issue of when simultaneously reproducing image data on a plurality of display devices having different aspect ratios in the imaging apparatus of the related art.

FIG. 10 is an explanatory view conceptually showing such issue. In the example shown in FIG. 10, an imaging apparatus 16 and an external display device 128 are connected, and predetermined image data stored in the imaging apparatus 16 is simultaneously reproduced on the display 10 arranged in the imaging apparatus 16 and the external display device 128. The aspect ratio of the display 10 arranged in the imaging apparatus 16 is 4:3, and the aspect ratio of the external display device 128 is 16:9. Assuming the subject of interest is Mt. Fuji, when the user zooms in a direction of magnifying Mt. Fuji while looking at the image of the display 10 of the imaging apparatus 16, the issue similar to the example described in FIG. 31 arises. That is, a phenomenon in which Mt. Fuji is displayed without image-defect in the display 10 of the imaging apparatus 16, but Mt. Fuji is image-defected in the external display device 128 may occur.

An imaging apparatus 300 according to the third embodiment of the present invention resolves such issue. Specifically, the imaging apparatus 300 according to the third embodiment can use the characteristics of the first and second embodiments when simultaneously reproducing one image data on a plurality of displays having different aspect ratios. In other words, the imaging apparatus 300 according to the third embodiment controls the display function and the zoom function using the characteristic of the first embodiment so that the subject of interest is not displayed image-defected from the displayable region of each display. The imaging apparatus 300 may also control the display function and the zoom function using the characteristic of the second embodiment so that the subject of interest is not displayed image-defected only from the displayable region of the display of either one of the aspect ratios with preference.

[3-2. Function Configuration of Imaging Apparatus 300]

Figure 11:
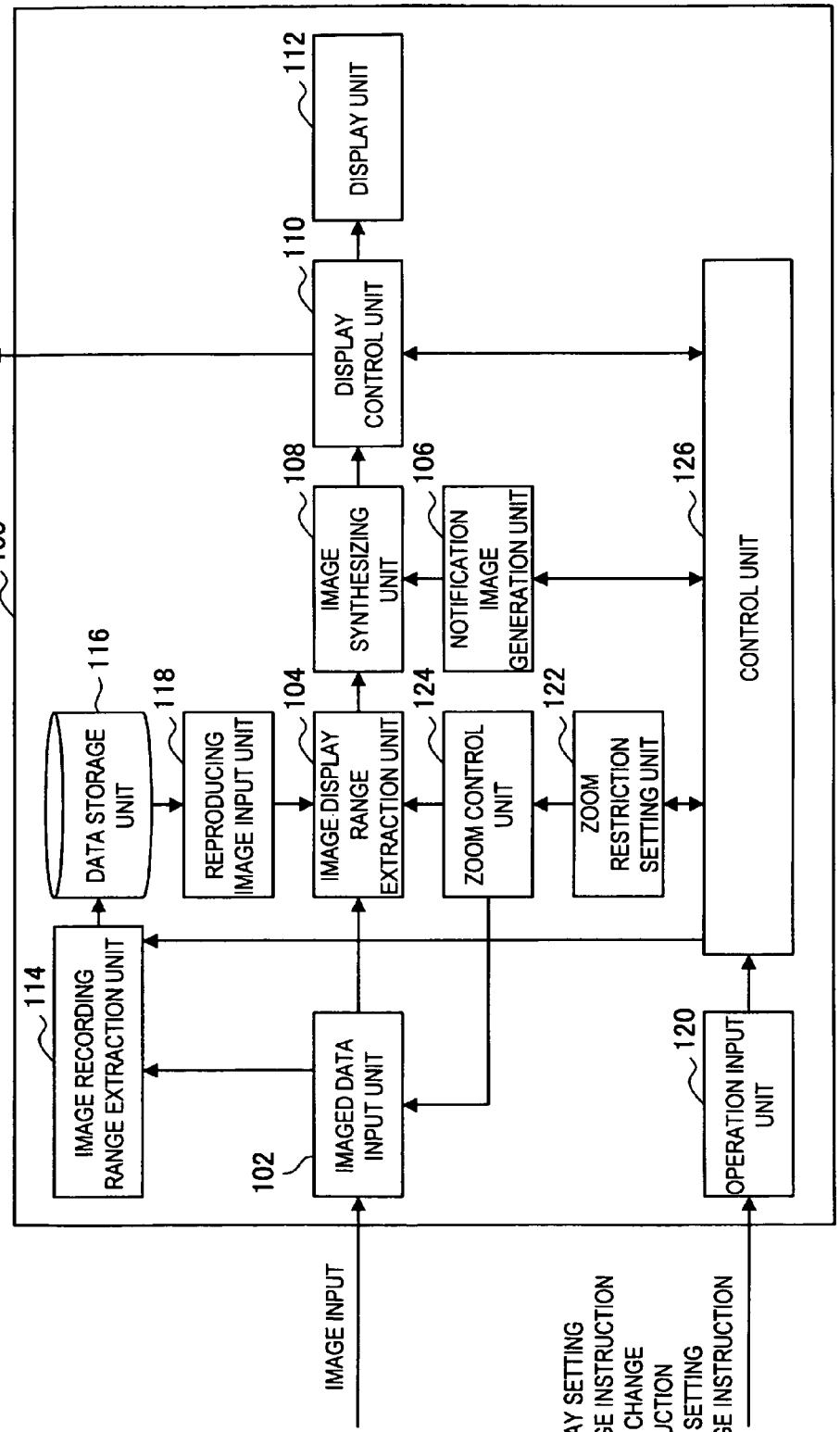
FIG. 11 is a block diagram showing one example of a function configuration related to the zoom process of an imaging apparatus 300 according to a third embodiment of the present invention.

FIG. 11 is a block diagram showing one example of a function configuration of the imaging apparatus 300 according to the third embodiment. As shown in FIG. 11, the imaging apparatus 300 further includes a reproducing image input unit 118 in addition to the function configuration of the imaging apparatus 100 according to the first embodiment illustrated in FIG. 11. The display control unit 110 transfers the image data synthesized by the image synthesizing unit 108 not only to the display unit 112 of the imaging apparatus 300, but also to the external display device 128.

(Reproducing Image Input Unit 118)

The reproducing image input unit 118 extracts the image data recorded in the data storage unit 116 as reproducing image, and transfers to the image display range extraction unit 104. The reproducing image input unit 118 can extract the image data to reproduce from the image data recorded in the data storage unit 116 based on the instruction of the user input from the operation input unit 120, the setting information stored in the ROM etc., and the like. For instance, when the user instructs the reproduction of predetermined image data through the operation button and the like, the reproducing image input unit 118 extracts the relevant image data from the data storage unit 116 according to the instruction from the control unit 126, and transfers the same to the image display range extraction unit 104.

In response thereto, the image display range extraction unit 104 extracts only the image of the region to display on the display unit 112 and the external display device 128 from the image data transferred from the reproducing image input unit 118. The image display range extraction unit 104 can extract the image region according to the instruction from the control unit 126 based on the display performance of the display unit 112 and the external display device 128, the aspect ratio, the image size, the photographing mode etc. set by the user, and the like. For instance, when displaying the image data on both the display unit 112 and the external display device 128, the image display range extraction unit 104 can extract the image corresponding to the aspect ratio of the display unit 112 and the image corresponding to the aspect ratio of the external display device 128. The image extracted by the image display range extraction unit 104 is transferred to the image synthesizing unit 108 and synthesized with the notification image, and then reproduced on the display unit 112 and the external display device 128.

When the user instructs a so-called digital zoom through the operation button and the like in the reproduction mode of the image data, the zoom control unit 124 instructs the execution of the zoom process to the image display range extraction unit 104. In response thereto, the image display range extraction unit 104 can change the region to be extracted from the image data transferred from the reproducing image input unit 118.

Figure 12:
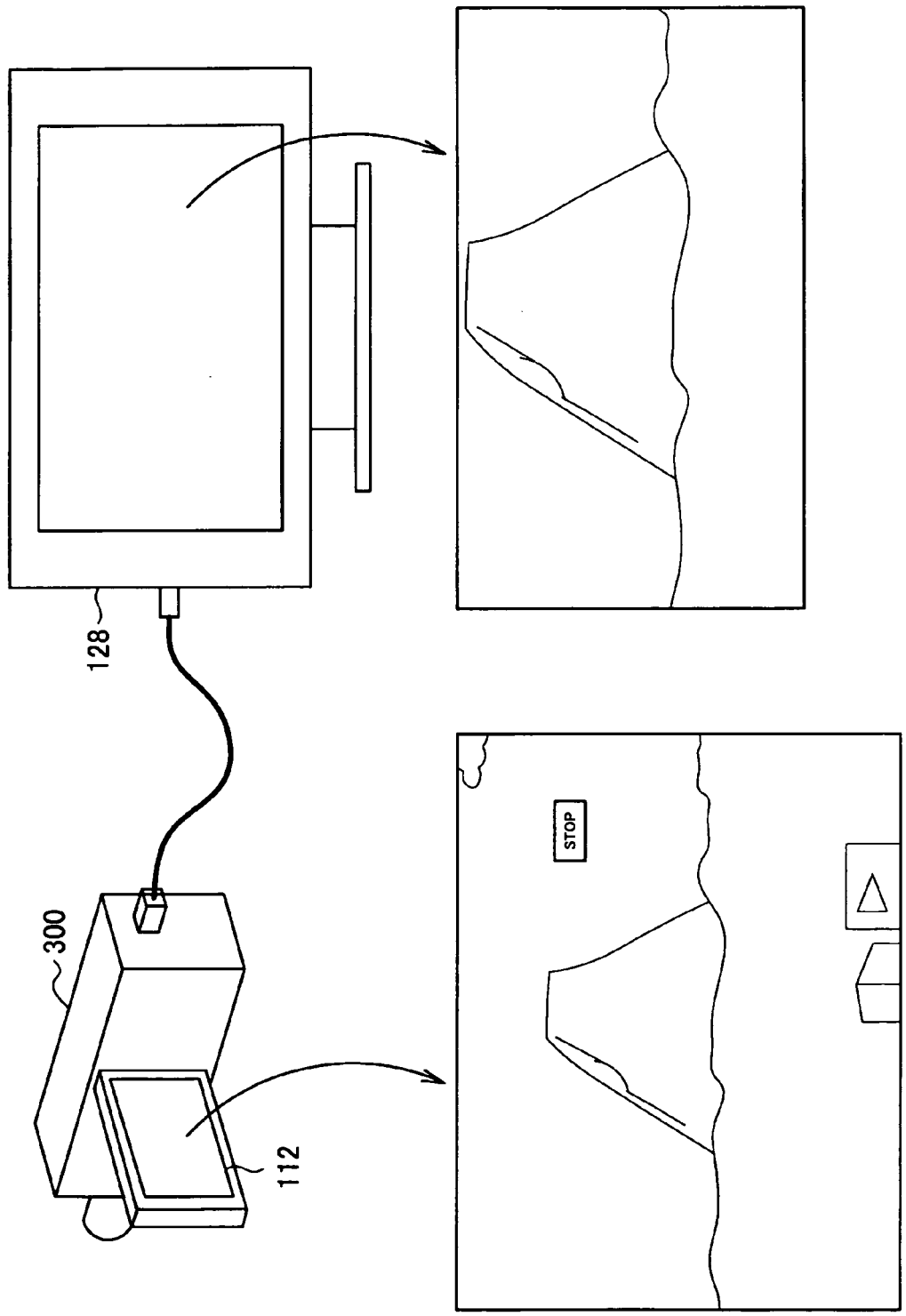
FIG. 12 is an explanatory view showing the concept of zooming control when simultaneously reproducing the image data on a plurality of displays having different aspect ratios in the imaging apparatus 300 according to the third embodiment.

An example in which the issue of the related art shown in FIG. 10 is resolved by the imaging apparatus 300 having the above function configuration will be described with reference to FIG. 12. FIG. 12 is an explanatory view showing the concept of zooming control when simultaneously reproducing the image data on a plurality of displays having different aspect ratios in the imaging apparatus 300 according to the third embodiment.

In the example shown in FIG. 12, the zoom restriction is set on the displayable region of the external display device 128 externally connected to the imaging apparatus 300. Therefore, the zoom function is limited at the time point Mt. Fuji reaches the limiting boundary of the reproduction displaying region of the external display device 128 even if the user zooms in the direction of magnifying Mt. Fuji while looking at the image displayed on the display unit 112. In this case, the zoom limiting icon 138 indicating that further zooming in the magnifying direction is not possible is displayed on the display unit 112. Thus, Mt. Fuji can be prevented from being image-defected from the displaying region of the external display device 128 even when the user performs the zoom process while looking at only the display screen of the display unit 112 of the imaging apparatus 100.

In the example shown in FIG. 12, the zoom state notification icon 134 is displayed only on the display unit 112 of the imaging apparatus 300, but may be displayed not only on the display unit 112 but also on the external display device 128. In the above example, only an example in which the zoom limiting icon 138 is displayed has been described, but this is not the sole case. In other words, similar to the first and second embodiments, the imaging apparatus 300 can display various zoom state notification icons 134 according to the zooming state to prevent occurrence of image-defect from the display having the aspect ratio set with the zoom restriction.

The imaging apparatus 300 may be used not only in reproducing and displaying the image data, but also when simultaneously photographing a plurality of image data having different aspect ratios, similar to the first and second embodiments. For instance, the imaging apparatus 300 can display a photographing region of a certain aspect ratio on the display unit 112 of the imaging apparatus 300, and display a photographing region of another aspect ratio on the external display device 128. The imaging apparatus 300 can execute the display function and the zoom function as described in each embodiment above by setting the zoom restriction to the photographing region of either one aspect ratio.

The imaging apparatus 300 according to the third embodiment can prevent the subject of interest from being image-defected from the reproduction displaying region of each display when simultaneously reproducing one moving image data on a plurality of displays having different aspect ratios. When simultaneously reproducing one moving image data on a plurality of displays having different aspect ratios, the imaging apparatus 300 can preferentially prevent the subject of interest from being image-defected from the reproduction displaying region of either display. Furthermore, the imaging apparatus 300 can prevent the subject of interest from being image-defected from each display similar to when displaying the photographing region of each aspect ratio on a plurality of different displays, when simultaneously photographing a plurality of image data having different aspect ratios.

<4. Fourth Embodiment>

[4-1. Outline of Imaging Apparatus 400 According to Fourth Embodiment]

An imaging apparatus 400 according to a fourth embodiment having the function of displaying the photographing region of one aspect ratio on the display screen of the display unit 112 to a maximum extent when simultaneously photographing the image data having a plurality of aspect ratios, and using the characteristics of each embodiment described above will be described below.

In the imaging apparatus of the related art, the photographing region of each aspect ratio is displayed in the displaying region of the display unit 112 when simultaneously photographing the image data having a plurality of aspect ratios.

Figure 13:
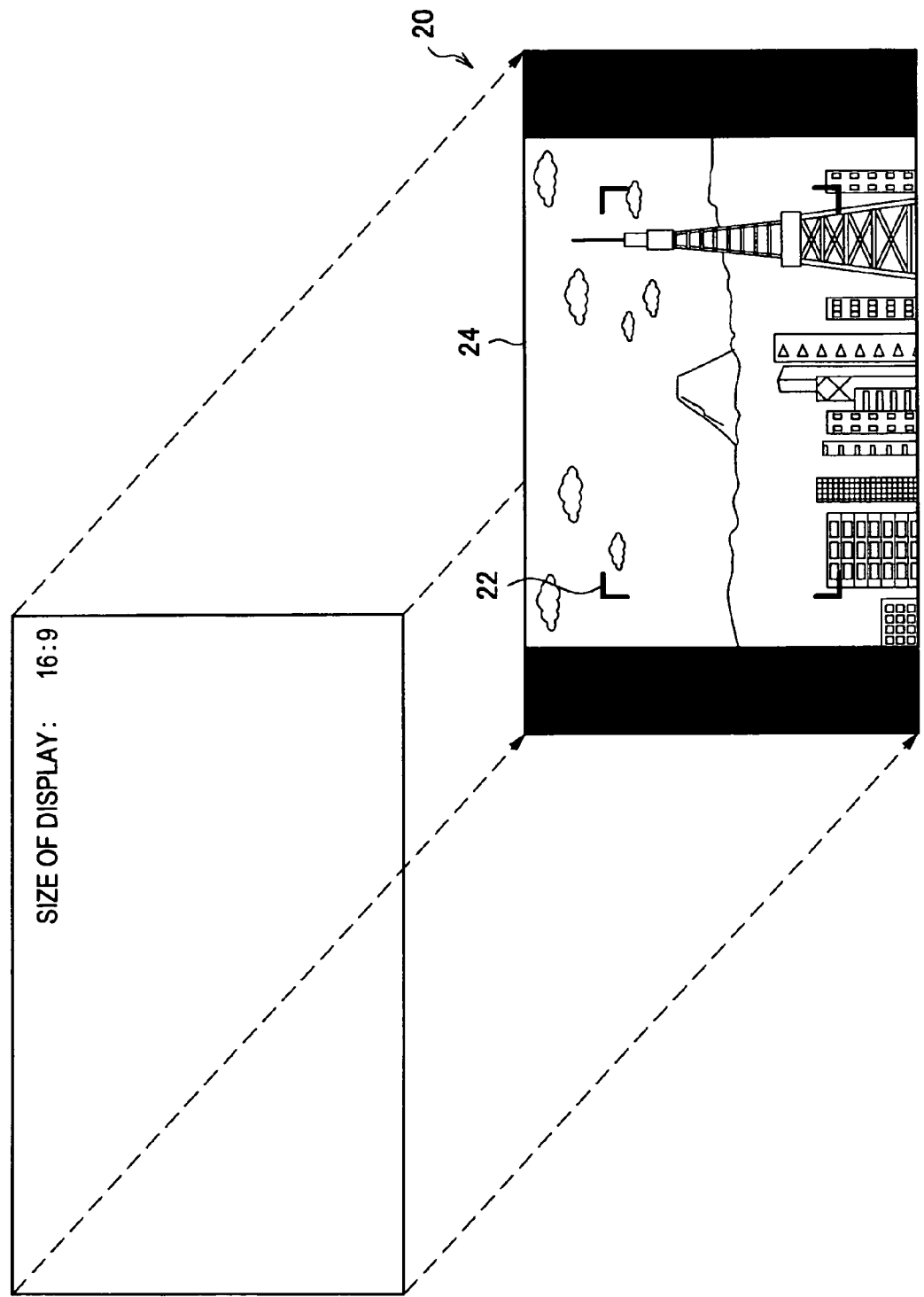
FIG. 13 is an explanatory view showing an example of displaying a photographing region corresponding to an image of aspect ratio 4:3 and 16:9 on the display 20 of 16:9 in the imaging apparatus of the related art.

For instance, in the example shown in FIG. 13, the photographing region 24 having an aspect ratio 4:3 is displayed on the display 20 having an aspect ratio 16:9 to a maximum extent. A photographing region 22 having an aspect ratio 16:9 smaller than the photographing region 24 having an aspect ratio 4:3 is displayed on the display 20. The display shown in FIG. 13 does not arise any issue if the user mainly photographs the image data of aspect ratio 4:3, and secondarily photographs the image data of aspect ratio 16:9. However, if the user mainly photographs the image data of aspect ratio 16:9, and secondarily photographs the image data of aspect ratio 4:3, the photographing region 22 of aspect ratio 16:9 that is mainly photographed is preferably displayed on the display 20 to a maximum extent.

Figure 14:
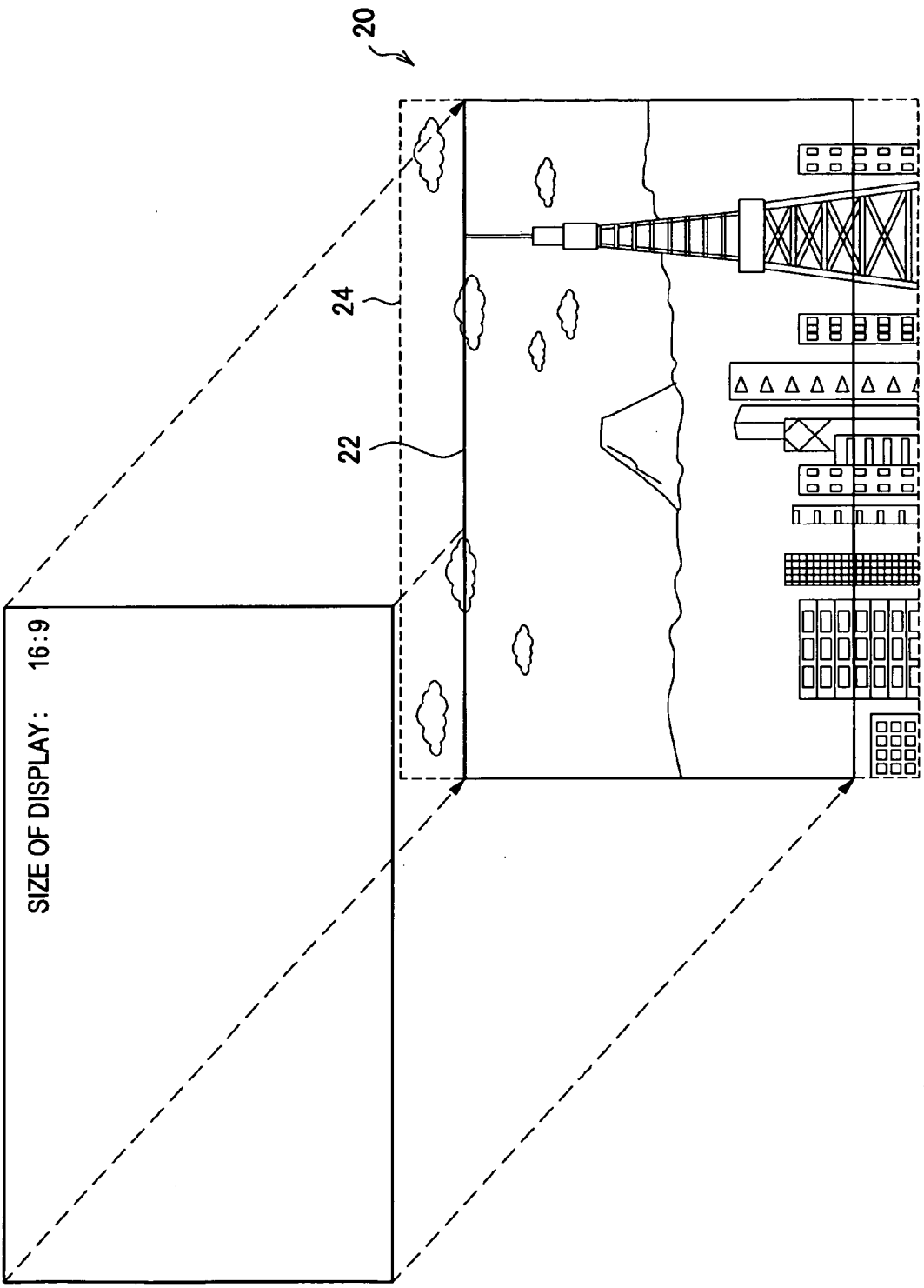
FIG. 14 is an explanatory view showing the concept of when the photographing region of smaller aspect ratio of the photographing regions of a plurality of aspect ratios is displayed on the display 20 to a maximum extent in the imaging apparatus of the related art.

FIG. 14 is an explanatory view showing the concept of when the photographing region of smaller aspect ratio of the photographing regions of a plurality of aspect ratios, that is, the photographing region 22 of aspect ratio 16:9 is displayed on the display 20 to a maximum extent. As shown in FIG. 14, the photographing region 22 of aspect ratio 16:9 is displayed to a maximum extent on the display 20, but the photographing region 24 of aspect ratio 4:3 desired to be secondarily photographed does not fit in the displayable region of the display 20. Therefore, the user may not recognize, at all, the photographing region of aspect ratio 4:3 etc. by looking at a through image displayed on the display 20, and thus excelling usability may not be obtained.

The imaging apparatus 400 according to the fourth embodiment of the present invention and resolves the above issue, and controls the display function and the zoom function by using the characteristics of each embodiment described above.

Specifically, when simultaneously photographing a plurality of image data having different aspect ratios, the imaging apparatus 400 displays the photographing region of one aspect ratio to a maximum extent on the display unit 112. If the photographing region of another aspect ratio does not fit in the displayable region of the display unit 112 in this case, the imaging apparatus 400 notifies the user that the photographing region of another aspect ratio exists outside the displayable region of the display unit 112.

Figure 15:
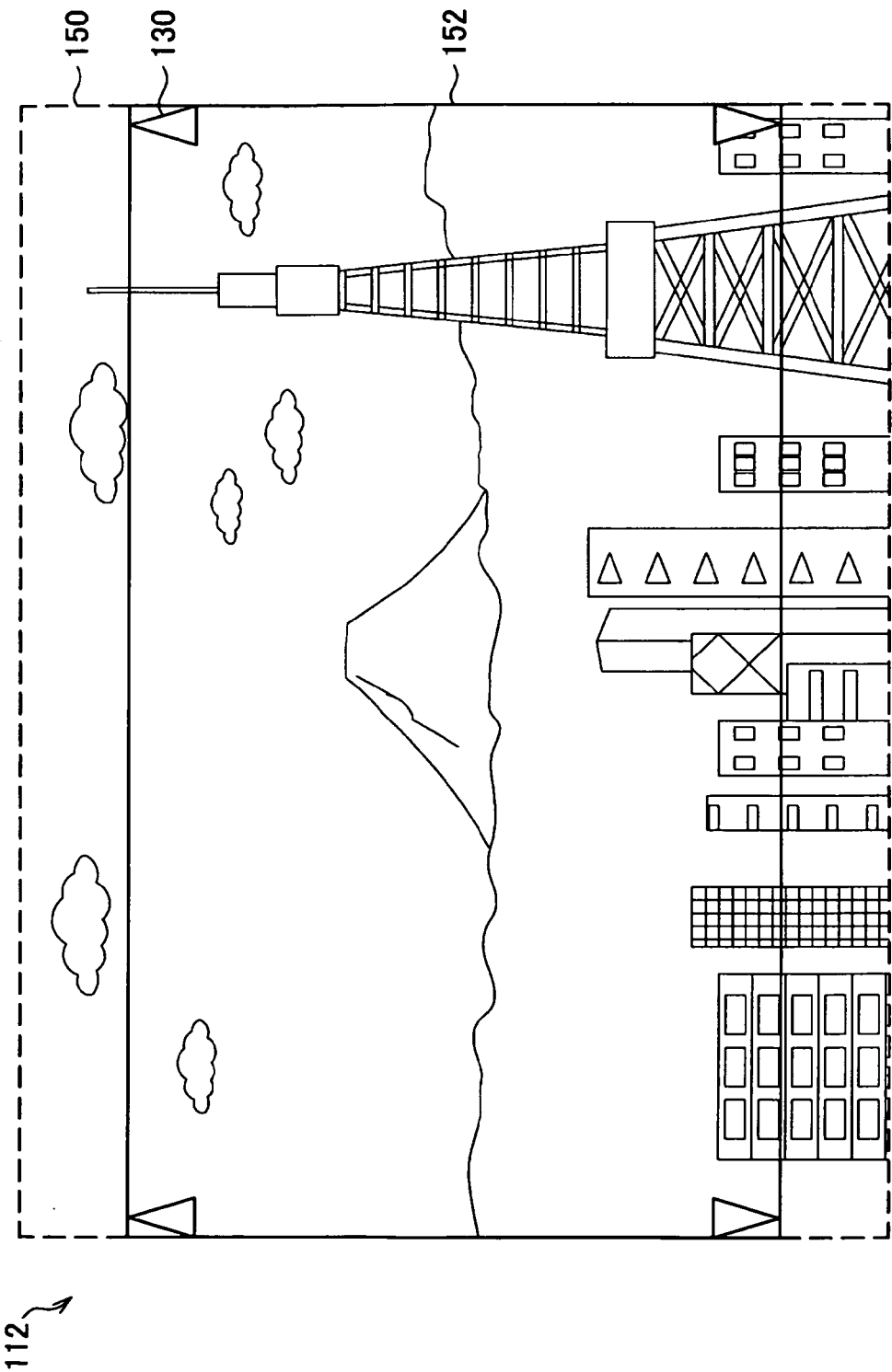
FIG. 15 is an explanatory view showing a display example of when the photographing region of one aspect ratio is displayed to a maximum extent on the display unit 112 when simultaneously photographing a plurality of image data having different aspect ratios in an imaging apparatus 400 according to a fourth embodiment of the present invention.

By way of example, comparison is made with the example shown in FIG. 14. FIG. 15 is an explanatory view showing a display example of when the photographing region of one aspect ratio is displayed to a maximum extent on the display unit 112 when simultaneously photographing a plurality of image data having different aspect ratios in the imaging apparatus 400. In the example shown in FIG. 15, the photographing region 152 of aspect ratio (16:9) of the image (hereinafter also referred to as main image) the user desires to mainly photograph is displayed to a maximum extent on the display unit 112 of aspect ratio 16:9. The photographing region 150 of aspect ratio (4:3) of the image (hereinafter also referred to as sub-image) the user desires to secondarily photograph exists outside the displayable region of the display unit 112 as it is larger than the photographing region of the main image. In such case, the imaging apparatus 400 displays on the display unit 112 a region notification icon 130 indicating that the photographing region 150 of the sub-image exists outside the displayable region of the display unit 112.

With reference to FIG. 15, the region notification icon 130 indicating that the photographing region 150 of the sub-image exists above and below the displayable region of the display unit 112 is displayed at four corners of the display unit 112. The user can recognize that the photographing region 150 of the sub-image exists above and below the displayable region of the display unit 112, and can easily recognize that the sub-image can be photographed at a range wider in the up and down direction than the through image of the display unit 112 by pushing the photograph start button and the like.

The region notification icon 130 is generated by the notification image generation unit 106. In other words, the notification image generation unit 106 generates the notification image including the region notification icon 130 when the photographing region 150 of the sub-image exists in the range wider than the displayable region of the display unit 112. The notification image generation unit 106 can generate the notification image including the region notification icon 130 according to the instruction from the control unit 126 based on the aspect ratio, the image size, the photographing mode, and the like set by the user. The notification image including the region notification icon 130 generated by the region notification icon 130 is thereafter synthesized with the image extracted by the image display range extraction unit 104 in the image synthesizing unit 108, and displayed on the display unit 112.

Figure 16:
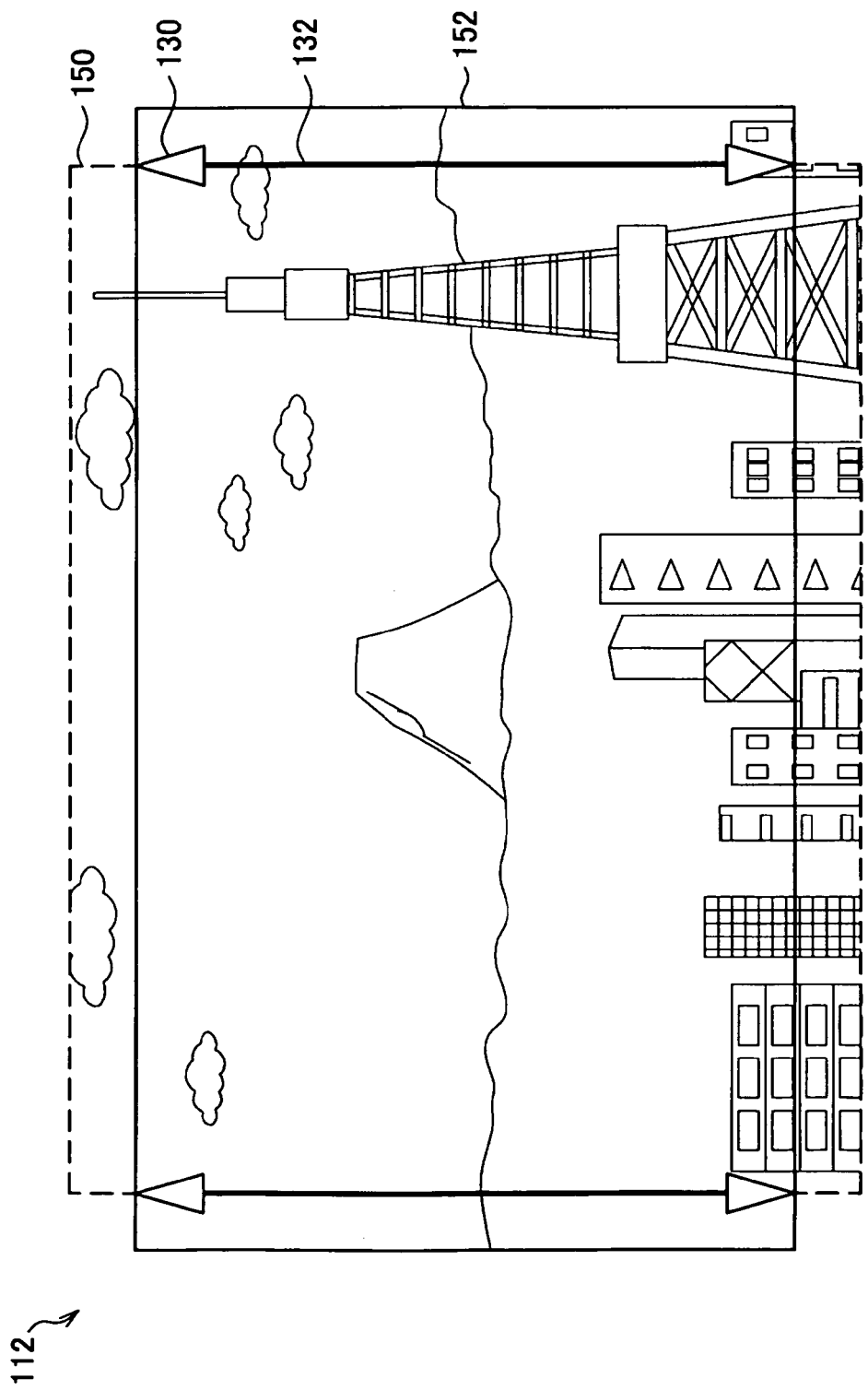
FIG. 16 is an explanatory view showing another display example of when displaying the photographing region of one aspect ratio on the display unit 112 to a maximum extent when simultaneously photographing a plurality of image data having different aspect ratios in the imaging apparatus 400 according to the fourth embodiment.

FIG. 16 is an explanatory view showing another display example of when displaying the photographing region of one aspect ratio on the display unit 112 to a maximum extent when simultaneously photographing a plurality of image data having different aspect ratios. In the example shown in FIG. 16, the photographing region 150 of the sub-image has the boundary of the photographing region in the horizontal direction existing in the displayable region of the display unit 112, and the boundary of the photographing region in the vertical direction existing outside the displayable region of the display unit 112. In such case, the imaging apparatus 400 displays the above-described region notification icon 130, and the guide frame 132 showing the photographing region 150 of the sub-image in the displayable region of the display unit 112 on the display unit 112. The guide frame 132 is generated by the notification image generation unit 106.

The imaging apparatus 400 can change the region notification icon 130 and the guide frame 132 according to the aspect ratio, the image size, the photographing mode, and the like of the main image and the sub-image. The region notification icon 130 and the guide frame 132 shown in FIGS. 15 and 16 are examples, and the shape, the color, the size, the position, and the like are not limited thereto.

Figure 17:
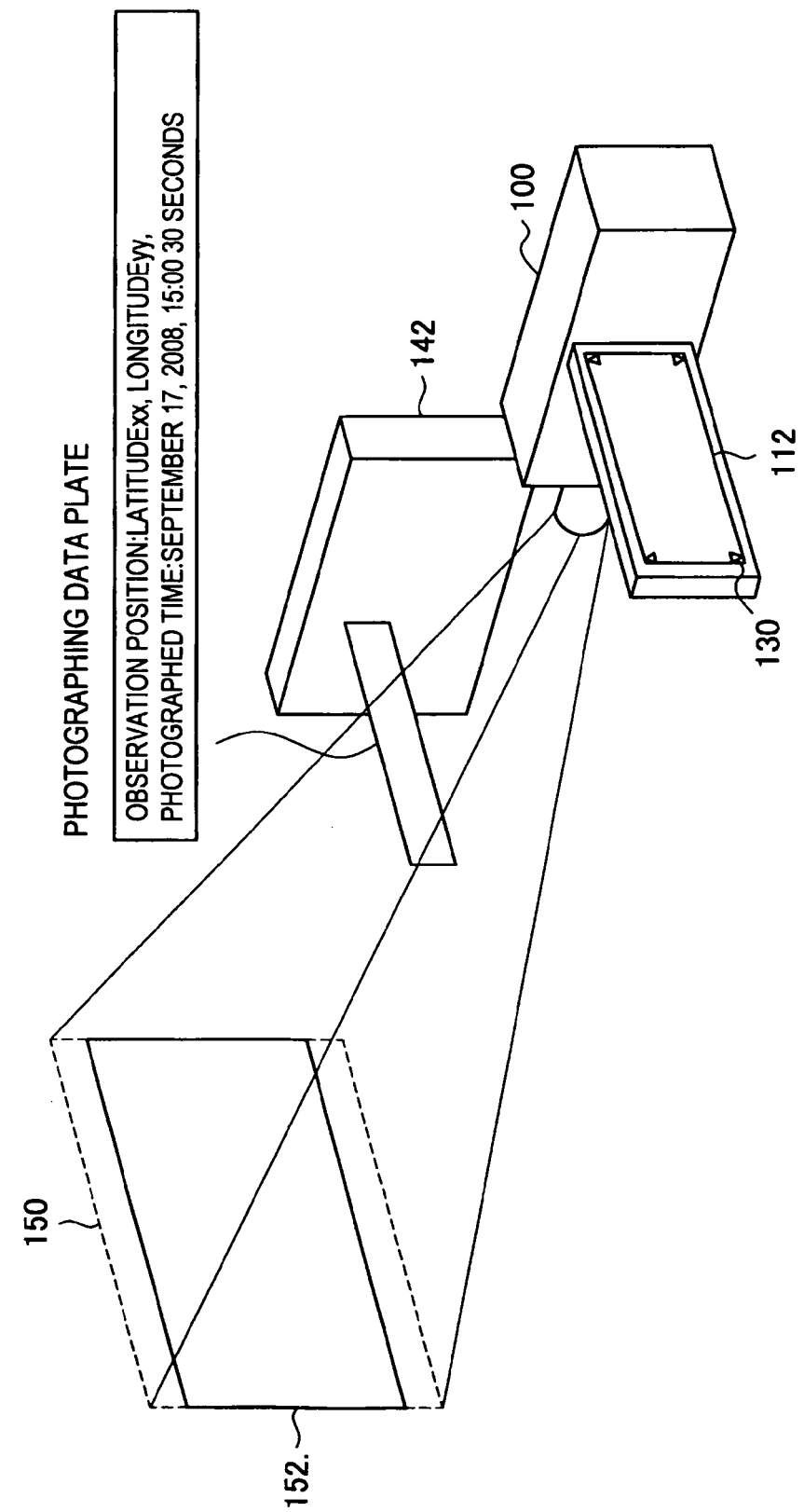

The user can use such characteristic of the imaging apparatus 400 in various photographing. One of the usage examples by the user will be described with reference to FIG. 17. FIG. 17 is an explanatory view showing a concept of when using the imaging apparatus 400 according to the present embodiment in a fixed point observation, experimental photographing, and the like. The example shown in FIG. 17 is a usage example of the imaging apparatus 400 of when the user photographs the sub-image of the moving image (or still image) of 4:3 as reference data at the same time as when photographing the moving image of 16:9 as the main image. Since the user photographs the moving image of 16:9 as the main image, the main image photographing region 152 of 16:9 is displayed, to a maximum extent, on the displayable region of the display unit 112, as described above. As a result, the user can perform adjustment and operation for photographing such as flaming and focusing of the main image mainly desired to be photographed while looking at the photographing region 152 of the main image displayed, to a maximum extent, in the displayable region of the display unit 112.

Furthermore, since the boundary of the photographing region 150 of the sub-image of 4:3 exists on the display unit 112 while running out in the up and down direction from the image displaying region, the region notification icon 130 is displayed on the display unit 112. Therefore, the user can visually recognize that the photographing region 150 of the sub-image exists outside the range of the image displayed in the displayable region of the display unit 112.

When performing fixed point observation, experimental photographing, and the like, the observation position, photographed time, and the like are often desired to be simultaneously recorded in the image file. In such case, the user can record the information described in a plate in a manner overlapping only the sub-image by fixing the photographing data plate described with the observation position, the photographed time and the like with a jig 142 and the like, as shown in FIG. 17. The user switches the display of the display unit 112 so that the photographing region 150 of the sub-image is temporarily displayed, and checks that the photographing data plate is contained in the sub-image photographing region of 4:3. Thereafter, the photographing can be executed with the photographing region 152 of the main image displayed on the display unit 112 to a maximum extent. As the region notification icon 130 is displayed on the display unit 112 even during photographing, the user can recognize that the photographing region 150 of the sub-image of 4:3 exists outside the displayable region of the display unit 112, and that photographing data plate is simultaneously recorded. In other words, the user may not check, at all times, the photographing region of the sub-image that is secondarily photographed, and can perform appropriate adjustment and operation such as flaming and focusing while checking the photographing region 152 of the main image desired to be mainly photographed.

The usage example of the imaging apparatus 400 shown in FIG. 17 is one of the usage examples of the imaging apparatus 400 according to the fourth embodiment, and the imaging apparatus 400 according to the fourth embodiment may obviously be used in various other photographing modes. In the example shown in FIG. 17 described above, the photographing data plate is fixed with the jig, but the imaging apparatus 400 itself may manage predetermined plate information related to the observation position, the photographed time, the photographer, and the like, and automatically record the same in a manner overlapping the sub-image. The imaging apparatus 400 may store the plate information to record in the sub-image in the storage unit such as the ROM, and record the plate information in a manner overlapping the sub-image photographing region that exists outside the displayable region of the display unit 112 when recording the sub-image. Thus, the user can record the desired plate information in a manner overlapping the sub-image by setting an arbitrary character, symbol and the like as the plate information through the operation input unit 120.

[4-2. Setting of Frame Mode]

As described above, in the imaging apparatus 400 according to the fourth embodiment the guide frame 132, the region notification icon 130, and the like are displayed on the display unit 112 when simultaneously photographing the image data of a plurality of aspect ratios. Therefore, the guide frame 132, the region notification icon 130, and the like to display on the display unit 112 differ depending on the aspect ratio, the image size, and the like of the image to simultaneously photograph. The imaging apparatus 400 according to the fourth embodiment can register beforehand the display mode (hereinafter referred to as frame mode) of the display unit 112 corresponding to the aspect ratio, the image size, and the like of the image to simultaneously photograph in the non-volatile storage region such as the ROM. The user can reference the menu screen etc. displayed on the display unit 112 to select an arbitrary frame mode through the operation input unit 120.

FIG. 18 is an explanatory view showing one example of a type of frame mode the user can arbitrarily select. The six frame modes shown in FIG. 18 are examples in describing the present embodiment, and the present invention is not limited thereto. In other words, the aspect ratio, the type of display unit 112, and the number of frame modes may be different from the example shown in FIG. 18. The example of the frame mode shown in FIG. 18 will be described below.

As shown in FIG. 18, the frame modes No. 1 to 3 are frame modes corresponding to the display unit 112 having a displayable region of aspect ratio 16:9. The frame modes No. 4 to 6 are frame modes corresponding to the display unit 112 having a displayable region of aspect ratio 4:3. Thus, the imaging apparatus 400 may have a frame mode corresponding to a plurality of display units 112 having different aspect ratios. When displaying the through image on the external display device 128 having an aspect ratio different from the aspect ratio of the display unit 112, the user can select an appropriate frame mode according to the aspect ratio of the displayable region of the display unit 112 and the external display device 128.

The frame modes No. 1 to 3 are frame modes of when recording the image of aspect ratio 16:9 as the main image, and recording the image of aspect ratio 4:3 as the sub-image. As shown in FIG. 18, in the frame modes No. 1 to 3, the photographing region of the main image of aspect ratio 16:9 is displayed to a maximum extent on the display unit 112 of aspect ratio 16:9.

The photographing region of the sub-image differs depending on the image size of aspect ratio 4:3. For instance, the frame mode No. 1 corresponds to when recording with the image size in the horizontal direction of the sub-image and the main image unified. In other words, the boundary in the horizontal direction of the photographing region of the sub-image is displayed to a maximum extent in the displayable region of the display unit 112, and the boundary in the vertical direction of the photographing region of the sub-image exists outside the displayable region of the display unit 112. The frame mode No. 2 corresponds to when the image size of the sub-image and the main image differs in both the horizontal direction and the vertical direction. In other words, the boundary in the vertical direction of the photographing region of the sub-image exists outside the displayable region of the display unit 112, and the boundary in the horizontal direction of the photographing region of the sub-image exists in the displayable region of the display unit 112. The frame mode No. 3 corresponds to when recording with the image size in the vertical direction of the sub-image and the main image unified. In other words, the boundary in the vertical direction of the photographing region of the sub-image is displayed to a maximum extent in the displayable region of the display unit 112, and the boundary in the horizontal direction of the photographing region of the sub-image exists in the displayable region of the display unit 112.

The frame modes No. 4 and 5 are frame modes of when recording the image of aspect ratio 4:3 as the main image, and recording the image of aspect ratio 16:9 as the sub-image. As shown in FIG. 18, in the frame modes No. 4 and 5, the photographing region of the main image of aspect ratio 4:3 is displayed to a maximum extent on the display unit 112 of aspect ratio 4:3.

The photographing region of the sub-image differs depending on the image size of aspect ratio 16:9. For instance, the frame mode No. 4 corresponds to when recording with the image size in the vertical direction of the sub-image and the main image unified. In other words, the boundary in the vertical direction of the photographing region of the sub-image is displayed to a maximum extent in the displayable region of the display unit 112, and the boundary in the horizontal direction of the photographing region of the sub-image exists outside the displayable region of the display unit 112. The frame mode No. 5 corresponds to when the image size of the sub-image and the main image differs in both the horizontal direction and the vertical direction. In other words, the boundary in the horizontal direction of the photographing region of the sub-image exists outside the displayable region of the display unit 112, and the boundary in the vertical direction of the photographing region of the sub-image exists in the displayable region of the display unit 112.

The frame mode No. 6 is a frame mode of when recording the image of aspect ratio 16:9 as the main image, and recording the image of aspect ratio 4:3 as the sub-image. As shown in FIG. 18, in the frame mode No. 6, the main image is an image of aspect ratio 16:9, and thus the photographing region of the main image of aspect ratio 16:9 is displayed to a maximum extent in the displayable region of the display unit 112 of aspect ratio 4:3.

Although the photographing region of the sub-image differs depending on the image size of aspect ratio 4:3, the relevant frame mode corresponds to when recording with the image size in the horizontal direction of the sub-image and the main image unified. In other words, the photographing region of the sub-image is displayed to a maximum extent in the displayable region of the display unit 112 as it matches the displayable region of the display unit 112.

When simultaneously photographing the images of a plurality of aspect ratios, the user can select an arbitrary frame mode from a plurality of frame modes set in advance through the operation input unit 120. The control unit 126 can instruct image extraction of an appropriate range to the image display range extraction unit 104 based on the frame mode selected by the user, and instruct the generation of the appropriate guide frame 132 and the region notification icon 130 to the notification image generation unit 106.

The above frame modes may not be selected through the operation by the user. For instance, the imaging apparatus 400 can automatically switch the frame mode in conjunction with the photographing mode. When photographing the moving image or the still image, the user can select various photographing mode functions such as HD mode, SD mode, panorama mode, and cinema mode of the imaging apparatus 400 and perform photographing. Therefore, the imaging apparatus 400 can automatically switch to the frame mode corresponding to the selected photographing mode when the user selects a predetermined photographing mode by registering the frame mode corresponding to each photographing mode in advance.

Describing the frame mode shown in FIG. 18 by way of example, a case of simultaneously recording the still image of 4:3 with the character string and the like included in the region deviated from the photographing region of 16:9 as the reference data while photographing the HD moving image of 16:9 is considered. Therefore, when the photographing mode of simultaneously photographing the still image of 4:3 while photographing the HD moving image of 16:9 is selected, the imaging apparatus 400 may automatically switch to the frame mode No. 1.

A case of simultaneously photographing the panorama still image of 16:9 as the reference image while photographing the SD image of 4:3 is also considered. Therefore, when the photographing mode of simultaneously photographing the panorama still image of 16:9 while photographing the SD image of 4:3 is selected, the imaging apparatus 400 may automatically switch the frame mode to the frame mode No. 4.

Therefore, the imaging apparatus 400 according to the fourth embodiment can automatically change the frame mode in conjunction with the photographing mode. The control unit 126 can appropriately instruct the change of the range of the image to be extracted by the image display range extraction unit 104 and the notification image to be generated by the notification image generation unit 106 based on the frame mode automatically changed in the above manner. As a result, an appropriate frame mode can be selected when the user selects the desired photographing mode, whereby the user may not perform a troublesome operation of specifying the frame mode every time after selecting the photographing mode.

The above-described photographing mode and the type of frame mode corresponding to the relevant photographing mode are examples in describing the present embodiment, and the present invention is not limited thereto. In other words, the imaging apparatus 400 can register, beforehand, a predetermined frame mode corresponding to a predetermined photographing mode, and the type of photographing mode, type of corresponding frame mode, combination, and the like can be arbitrarily changed.

[4-3. Processing Flow Related to Zoom Process of Imaging Apparatus 400]

An example of a flow of process when the imaging apparatus 400 capable of displaying the notification image uses the display function and the zoom function of each embodiment described above will be described below.

(Overall Process Flow in Simultaneous Photographing Mode)

Figure 19:
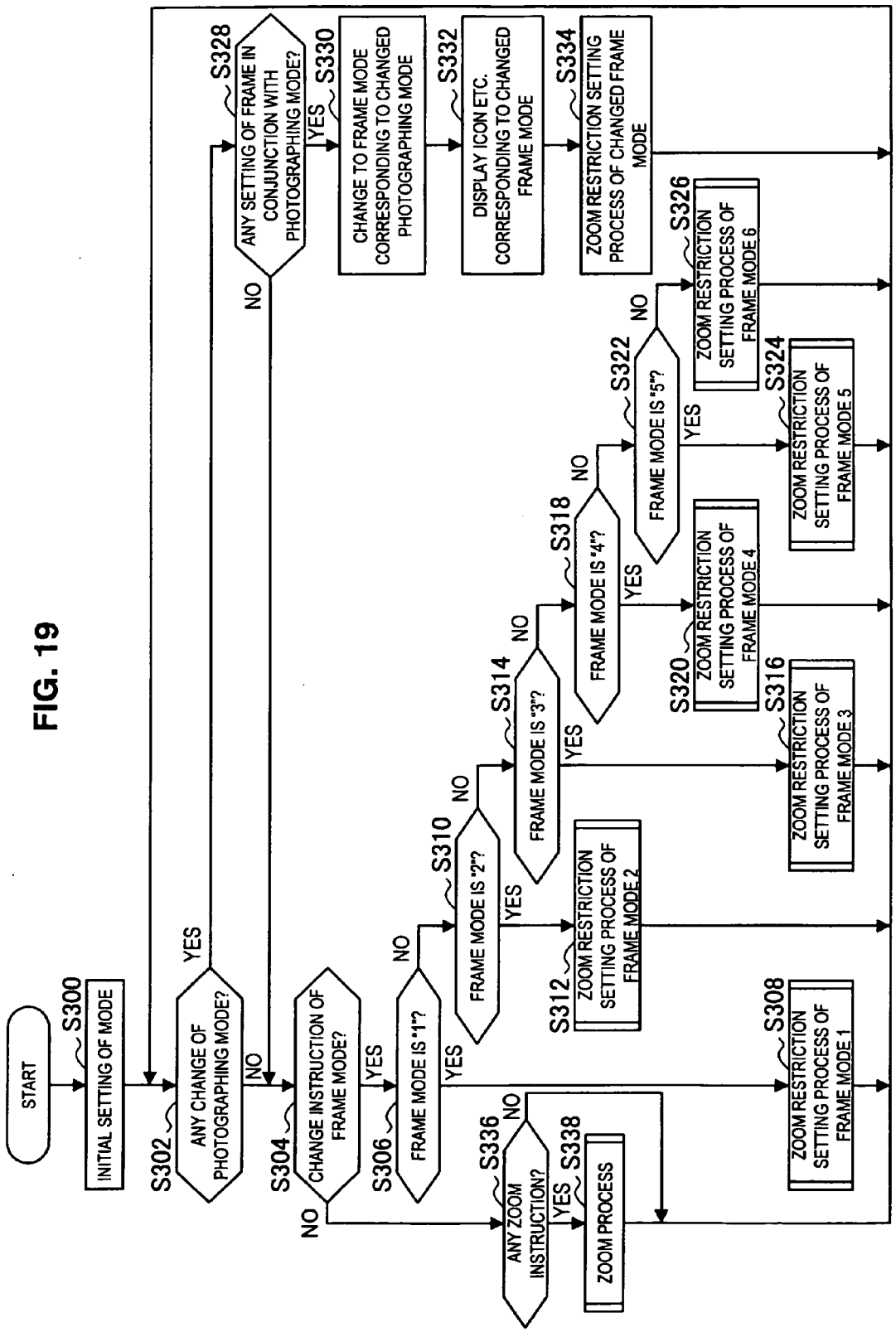
FIG. 19 is a flowchart showing one example of a series of flow related to the zoom process in the imaging apparatus 400 according to the fourth embodiment.

FIG. 19 is a flowchart showing one example of a series of flow related to the zoom process continuously performed when simultaneously photographing a plurality of image data having different aspect ratios in the imaging apparatus 400 according to the fourth embodiment. For instance, the process shown in FIG. 19 starts when the user select the mode of simultaneously photographing a plurality of image data having different aspect ratios. The frame modes 1 to 6 correspond to the example of the frame modes shown in FIG. 18 mentioned above.

First, in step 300, the imaging apparatus 400 performs an initialization setting of the mode. The initialization setting of the mode is a setting related to the frame mode and the aspect ratio etc. to set the zoom restriction. The user operates the operation button, and the like to select an arbitrary frame mode, or set the zoom restriction on the photographing region of any one or all aspect ratios. The zoom restriction setting unit 122 sets the zoom restriction on the aspect ratio instructed by the user according to the instruction from the control unit 126. The notification image generation unit 106 generates a notification image including the guide frame 132 and the region notification icon 130 so as to correspond to the frame mode instructed from the user according to the instruction from the control unit 126.

In step 302, the imaging apparatus 400 determines whether or not a change instruction of the photographing mode is made by the user. As described above, the imaging apparatus 400 can automatically switch the frame mode in conjunction with the change of the photographing mode if the frame mode corresponding to the changed photographing mode is registered. Therefore, the control unit 126 determines the presence of the change instruction of the photographing mode.

If determined that the change instruction of the photographing mode is not made in step 302, the control unit 126 determines whether or not a change instruction of the frame mode is made by the user in step 304. As described above, the user can select an arbitrary frame mode from a plurality of frame modes registered in the imaging apparatus 400 in advance. Therefore, the control unit 126 determines the presence of the change instruction of the frame mode, and if the change instruction of the frame mode is made, instructs each function configuration unit to perform a display corresponding to the selected frame mode.

If determined that the change instruction of the frame mode is made in step 304, the imaging apparatus 400 displays the guide frame 132 and the like corresponding to each frame mode on the display unit 112, and sets the zoom restriction with respect to the photographing region of any or all of the aspect ratios. First, the control unit 126 determines whether or not the changed frame mode is frame mode No. 1 in step 306.

If determined as changed to the frame mode No. 1 in step 306, the image display range extraction unit 104 extracts the image corresponding to the display unit 112 of 16:9 from the image input to the imaged data input unit 102 in a range the imaging region of the main image is displayed to a maximum extent. As shown in FIG. 18, the boundary in the vertical direction of the photographing region of the sub-image corresponding to the frame mode No. 1 exists outside the displayable region of the display unit 112. Therefore, the notification image generation unit 106 generates a notification image including the region notification icon 130 for notifying the user that the photographing region 150 of the sub-image of 4:3 exists outside the displayable region of the display unit 112 in response to the instruction from the control unit 126. The image synthesizing unit 108 generates an image in which the image extracted by the image display range extraction 104 and the notification image including the region notification icon 130 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 1 in step 308. The imaging apparatus 400 sets the zoom restriction on the photographing region of the image data of the aspect ratio that prevents image-defect set by the user or automatically. As described in each embodiment above, the imaging apparatus 400 thus can control the display function and the zoom function so that the predetermined subject of interest is not image-defected from the image data of the aspect ratio set with the zoom restriction. The details of the setting process of the zoom restriction in the frame mode 1 in step 308 will be hereinafter described with reference to FIG. 22.

If determined as not changed to the frame mode No. 1 in step 306, the control unit 126 determines whether or not the changed frame mode is the frame mode No. 2 in step 310.

If determined as changed to the frame mode No. 2 in step 310, the image display range extraction unit 104 extracts the image corresponding to the display unit 112 of 16:9 from the image input to the imaged data input unit 102 in a range the imaging region of the main image is displayed to a maximum extent. As shown in FIG. 18, the boundary in the vertical direction of the photographing region of the sub-image corresponding to the frame mode No. 2 exists outside the displayable region of the display unit 112, and the boundary in the horizontal direction of the photographing region of the sub-image exists in the displayable region of the display unit 112. Therefore, the notification image generation unit 106 generates the region notification icon 130 for notifying that the photographing region 150 of the sub-image of 4:3 exists running out in the up and down direction of the displayable region of the display unit 112. The notification image generation unit 106 also generates the guide frame 132 for notifying the boundary in the horizontal direction of the photographing region 150 of the sub-image in the displayable region of the display unit 112. The image synthesizing unit 108 generates an image in which the image extracted by the image display range extraction 104 and the notification image including the region notification icon 130 and the guide frame 132 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 2 in step 312. The details of the setting process of the zoom restriction in the frame mode 2 in step 312 will be hereinafter described with reference to FIG. 23.

If determined as not changed to the frame mode No. 2 in step 310, the control unit 126 determines whether or not the changed frame mode is the frame mode No. 3 in step 314.

If determined as changed to the frame mode No. 3 in step 314, the image display range extraction unit 104 extracts the image corresponding to the display unit 112 of 16:9 from the image input to the imaged data input unit 102 in a range the imaging region of the main image is displayed to a maximum extent. As shown in FIG. 18, the boundary in the horizontal direction of the photographing region of the sub-image corresponding to the frame mode No. 3 exists in the displayable region of the display unit 112. Therefore, the notification image generation unit 106 generates a notification image including the guide frame 132 notifying the boundary in the horizontal direction of the photographing region 150 of the sub-image in the displayable region of the display unit 112. The image synthesizing unit 108 generates an image in which the image extracted by the image display range extraction 104 and the notification image including the guide frame 132 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 3 in step 316. The details of the setting process of the zoom restriction in the frame mode 3 in step 316 will be hereinafter described with reference to FIG. 24.

If determined as not changed to the frame mode No. 3 in step 314, the control unit 126 determines whether or not the changed frame mode is the frame mode No. 4 in step 318.

If determined as changed to the frame mode No. 4 in step 318, the image display range extraction unit 104 extracts the image corresponding to the display unit 112 of 4:3 from the image input to the imaged data input unit 102 in a range the photographing region of the main image is displayed to a maximum extent. As shown in FIG. 18, the boundary in the horizontal direction of the photographing region of the sub-image corresponding to the frame mode No. 4 exists outside the displayable region of the display unit 112. Therefore, the notification image generation unit 106 generates a notification image including the region notification icon 130 notifying that the photographing region of the sub-image of 16:9 exists outside the displayable region of the display unit 112. The image synthesizing unit 108 generates an image in which the image extracted by the image display range extraction 104 and the notification image including the region notification icon 130 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 4 in step 320. The details of the setting process of the zoom restriction in the frame mode 4 in step 320 will be hereinafter described with reference to FIG. 25.

If determined as not changed to the frame mode No. 4 in step 310, the control unit 126 determines whether or not the changed frame mode is the frame mode No. 5 in step 322.

If determined as changed to the frame mode No. 5 in step 322, the image display range extraction unit 104 extracts the image corresponding to the display unit 112 of 4:3 from the image input to the imaged data input unit 102 in a range the imaging region of the main image is displayed to a maximum extent. As shown in FIG. 18, the boundary in the horizontal direction of the photographing region of the sub-image corresponding to the frame mode No. 5 exists outside the displayable region of the display unit 112, and the boundary in the vertical direction of the photographing region of the sub-image exists in the displayable region of the display unit 112. Therefore, the notification image generation unit 106 generates the region notification icon 130 for notifying that the photographing region 152 of the sub-image of 16:9 exists running out in the left and right direction of the displayable region of the display unit 112. The notification image generation unit 106 also generates the guide frame 132 for notifying the boundary in the vertical direction of the photographing region 152 of 16:9 of the sub-image in the displayable region of the display unit 112. The image synthesizing unit 108 generates an image in which the image extracted by the image display range extraction 104 and the notification image including the region notification icon 130 and the guide frame 132 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 5 in step 324. The details of the setting process of the zoom restriction in the frame mode 5 in step 324 will be hereinafter described with reference to FIG. 26.

If determined as not changed to the frame mode No. 5 in step 322, the control unit 126 determines whether or not the changed frame mode is the frame mode No. 6. Therefore, the control unit 126 instructs the execution of the display process of the photographing region corresponding to the frame mode No. 6 to each function configuration unit. Specifically, the image display range extraction unit 104 extracts the image corresponding to the display unit 112 of 4:3 from the image input to the imaged data input unit 102 in a range the photographing region of the main image is displayed to a maximum extent. As shown in FIG. 18, the photographing region of the sub-image corresponding to the frame mode No. 6 matches the displayable region of the display unit 112. Therefore, the region notification icon 130 and the guide frame 132 are not generated with respect to the photographing region of the sub-image. With respect to the photographing region of the main image, the boundary in the up and down direction of the photographing region of the main image exists in the displayable region of the display unit 112 when the image of 16:9 is displayed to a maximum extent on the display unit 112 of 4:3. Therefore, the notification image generation unit 106 generates the guide frame 132 for notifying the boundary in the vertical direction of the photographing region 152 of the main image in the displayable region of the display unit 112. The image synthesizing unit 108 generates an image in which the image extracted by the image display range extraction 104 and the notification image including the guide frame 132 generated by the notification image generation unit 106 are synthesized. Thereafter, the display control unit 110 causes the display unit 112 to display the image generated by the image synthesizing unit 108 in response to the instruction from the control unit 126.

The imaging apparatus 400 executes a setting process of the zoom restriction mode in the frame mode No. 6 in step 326. The details of the setting process of the zoom restriction in the frame mode 6 in step 326 will be hereinafter described with reference to FIG. 27.

Through each step described above, when simultaneously photographing a plurality of image data having different aspect ratios, the photographing region of the main image is displayed on the display unit 112 to a maximum extent and the photographing region of the sub-image can be displayed on the display unit 112 according to the set frame mode.

If determined that the photographing mode is changed in step 302, the control unit 126 determines whether or not the frame mode corresponding to the changed photographing mode is registered in step 328. If determined that the corresponding frame mode is not registered in step 328, the control unit 126 instructs the execution of the display process corresponding to the currently set frame mode to each function configuration unit through each step described above.

If determined that the corresponding frame mode is registered in step 328, the control unit 126 changes from the current frame mode to the frame mode registered with respect to the changed photographing mode. The imaging apparatus 400 causes the display unit 112 to display the region notification icon 130, the guide frame 132, and the like corresponding to the changed frame mode in step 332. Furthermore, the imaging apparatus 400 performs the setting process (process similar to steps 308, 312, 316, 320, 324, or 326) of the zoom restriction in the changed frame mode in step 334. Therefore, when the frame mode is registered in conjunction with the photographing mode, the user may not perform a troublesome operation of changing the setting of the frame mode when switching the photographing mode.

Through the process flow described above, the imaging apparatus 400 can perform the display process and the zoom restriction setting process corresponding to the frame mode selected by the user, the frame mode automatically set in conjunction with the photographing mode, and the like.

If determined that the change instruction of the frame mode is not made in step 304 after the frame mode and the zoom restriction are set, the imaging apparatus 400 determines whether or not the zoom instruction is made from the user in step 336.

If determined that the zoom instruction is made from the user in step 336, the imaging apparatus 400 executes the zoom process in step 338. In other words, the imaging apparatus 400 performs the process shown in FIG. 2 or FIG. 6, described above, according to the setting state of the zoom restriction. The imaging apparatus 400 thus can control the display function and the zoom function so that the subject of interest is not image-defected from the image data of the aspect ratio set with the zoom restriction based on the zoom restriction set according to the currently set frame mode.

Figure 20:
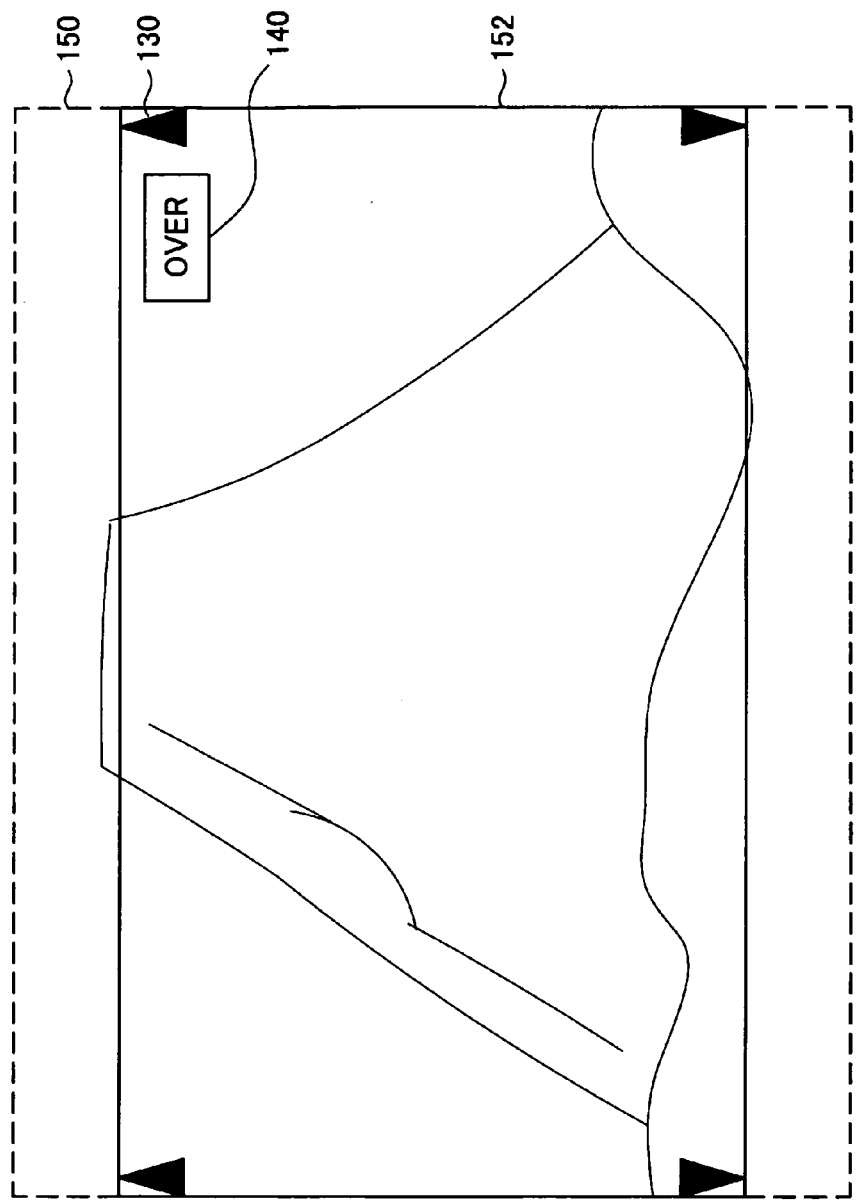
FIG. 20 is an explanatory view showing a display example of the display unit 112 according to the zoom process in the imaging apparatus 400 according to the fourth embodiment.
Figure 21:
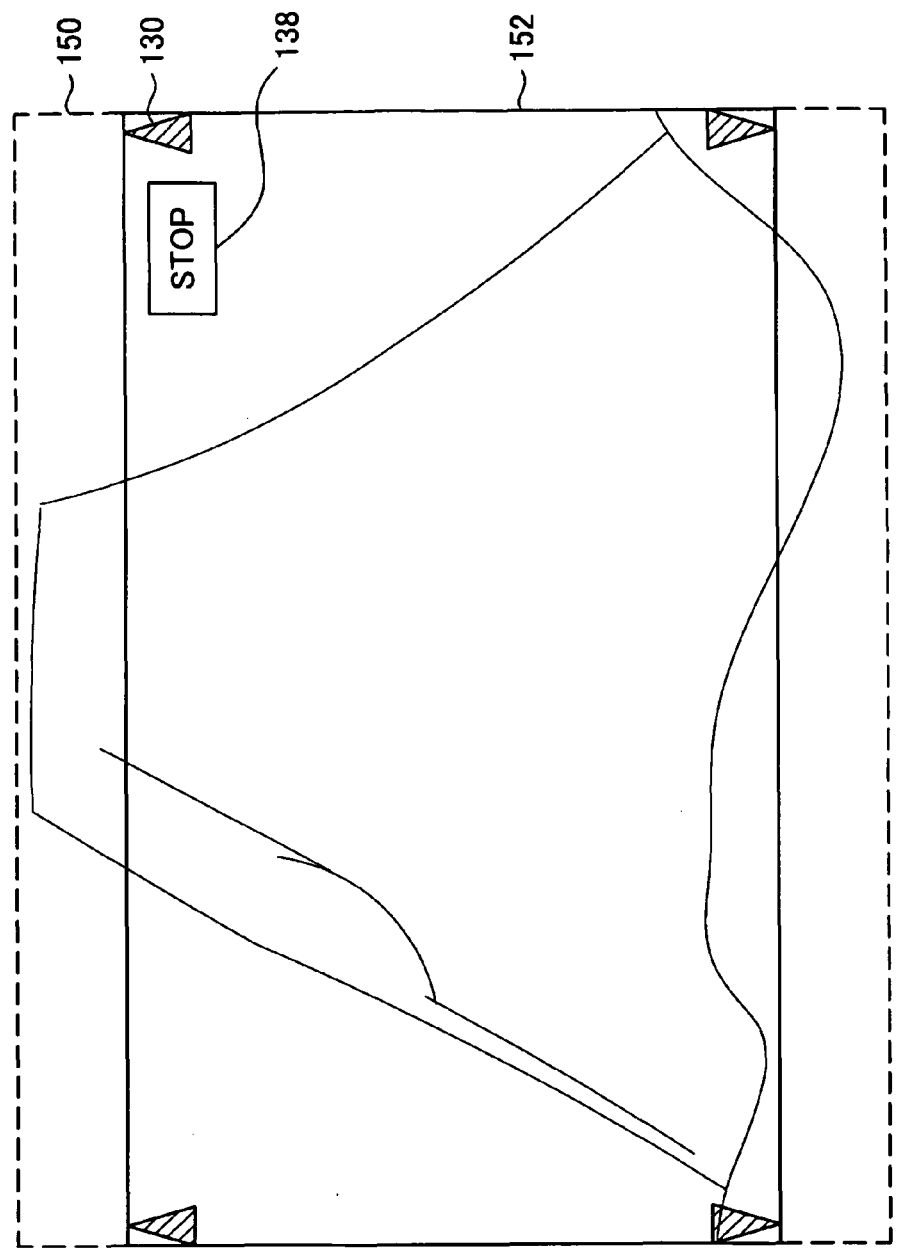
FIG. 21 is an explanatory view showing another display example of the display unit 112 according to the zoom process in the imaging apparatus 400 according to the fourth embodiment.

A display example of the display unit 112 when the zoom restriction is set on the photographing region of aspect ratio 4:3 in the frame mode No. 1 will be described by way of example. FIG. 20 and FIG. 21 are explanatory views showing a display example of the display unit 112 in the frame mode No. 1. In the examples shown in FIG. 20 and FIG. 21, the photographing region 152 of aspect ratio 16:9 is displayed to a maximum extent on the display unit 112 of aspect ratio 16:9, and the photographing region 150 of aspect ratio 4:3 exists outside the displayable region of the display unit 112. Therefore, the region notification icon 130 notifying that the photographing region 150 of aspect ratio 4:3 exists outside the displayable region of the display unit 112 is displayed on the display unit 112. In the example shown in FIG. 20, the zoom restriction is set with respect to the photographing region 150 of aspect ratio 4:3.

As shown in FIG. 20, when Mt. Fuji, which is the subject of interest, is magnified until exceeding the boundary of the photographing region 152 of aspect ratio 16:9, the imaging apparatus displays the image-defect notification icon 140, in a cautioning manner, similar to the example described in the second embodiment. As shown in FIG. 20, the imaging apparatus 400 may change the color, shape, and the like of the region notification icon 130 in accordance with the display of the image-defect notification icon 140. Thus, although Mt. Fuji, which is the subject of interest, exists within the photographing region 150 of aspect ratio 4:3 set with the zoom restriction, the user can recognize that image-defect occurred from the photographing region 152 of aspect ratio 16:9 not set with the zoom restriction.

When Mt. Fuji reaches the limiting boundary of the photographing region 150 of aspect ratio 4:3 set with the zoom restriction thereafter, the imaging apparatus 400 disables the zoom function by displaying the zoom limiting icon 138, similar to the example described in the second embodiment, as shown in FIG. 21. As shown in FIG. 21, the imaging apparatus 400 may change the color, shape, and the like of the region notification icon 130 in accordance with the display of the zoom limiting icon 138. Thus, the user can recognize that Mt. Fuji, which is the subject of interest, has reached the limiting boundary of the photographing region 150 of aspect ratio 4:3 existing outside the displayable region of the display unit 112 and that zooming may not be performed any further in the magnifying direction.

Such example can be used when the user secondarily photographs the still image of aspect ratio 4:3 on a constant basis while mainly photographing the HD moving image of aspect ratio 16:9. For instance, it is particularly effective when the entire Mt. Fuji may not be accommodated in the photographing region in the HD moving image of 16:9, but Mt. Fuji is to be prevented from being image-defected from the secondarily photographed still image data.

The flow of details of the setting process of the zoom restriction in each frame mode of the process flow shown in FIG. 19 will be described below.
(Setting Process of Zoom Restriction Mode in Frame Mode No. 1)

Figure 22:
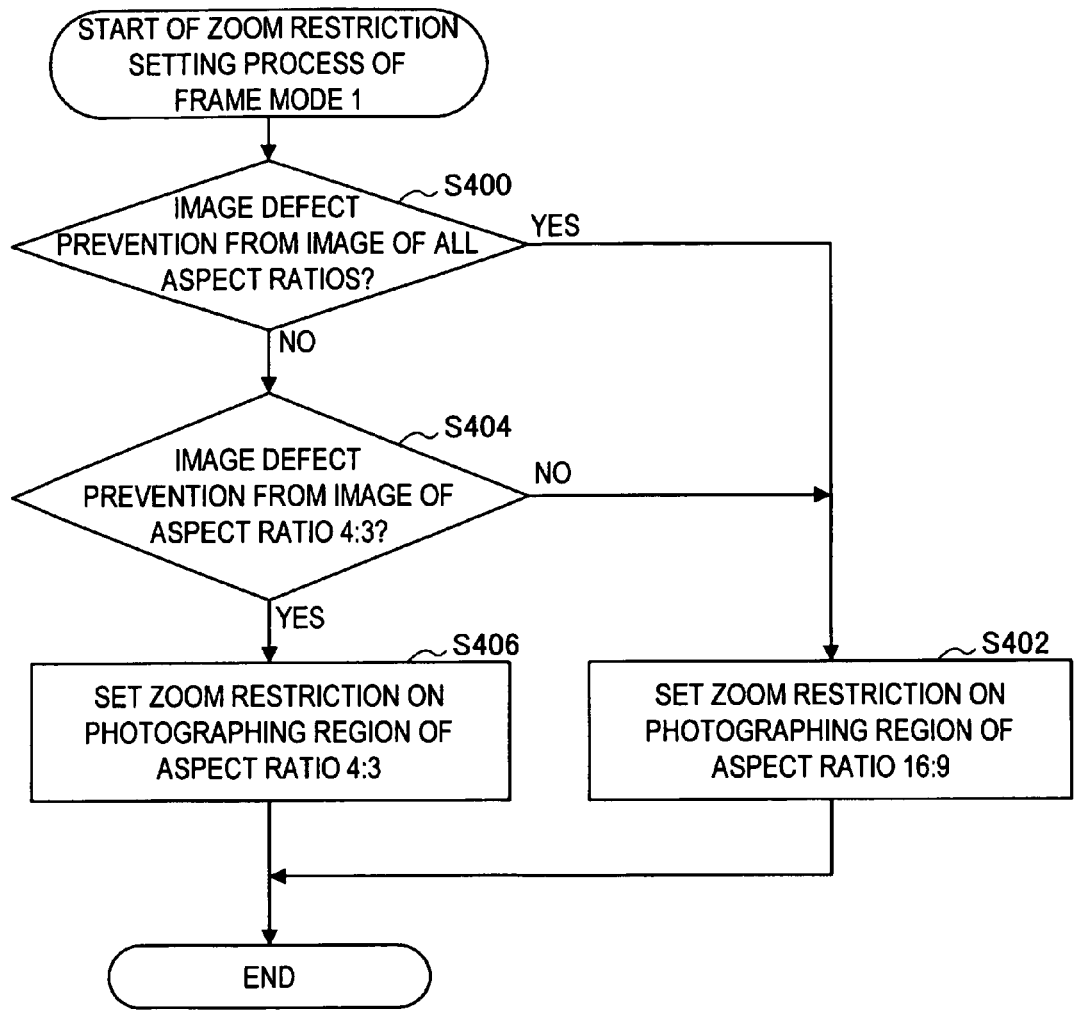
FIG. 22 is a flowchart showing one example of the flow of the setting process of the zoom restriction mode in the frame mode No. 1 in the imaging apparatus 400 according to the fourth embodiment.

FIG. 22 is a flowchart showing one example of the flow of the setting process of the zoom restriction mode in the frame mode No. 1. As shown in FIG. 22, the control unit 126 of the imaging apparatus 400 determines the setting where the predetermined subject of interest is not image-defected from the image data of either aspect ratios of a plurality of image data having different aspect ratios. The user operates the operation button and the like to arbitrarily select the image data to prevent image-defect of the subject of interest in the setting mode and the like. The imaging apparatus 400 may automatically set the image data to prevent image-defect of the subject of interest according to the photographing mode and the like. For instance, the imaging apparatus 400 may automatically determine to which photographing region of what aspect ratio to set the zoom restriction according to the frame mode described above. In other words, the imaging apparatus 400 may automatically set the zoom restriction on the photographing region of one or both aspect ratios based on the combination of the photographing region of the aspect ratio of the main image and the photographing region of the aspect ratio of the sub-image.

The imaging apparatus 400 first determines whether or not image-defect prevention is set on the image data of all aspect ratios, that is, the image data of aspect ratio 16:9 and the image data of aspect ratio 4:3 in step 400.

If determined that the image-defect prevention is set on the image data of all aspect ratios in step 400, the imaging apparatus 400 performs the process of step 402. In other words, the zoom restriction setting unit 122 sets the zoom restriction on the photographing region 152 of aspect ratio 16:9, which is the photographing region of smaller aspect ratio (correspond to the first embodiment).

If determined that the image-defect prevention is not set on the image data of all aspect ratios in step 400, the imaging apparatus 400 determines whether or not the image-defect prevention is set on the image data of aspect ratio 4:3 in step 404.

If determined that the image-defect prevention is set on the image data of aspect ratio 4:3 in step 404, the imaging apparatus 400 performs the process of step 406. In other words, the zoom restriction setting unit 122 sets the zoom restriction on the photographing region 150 of aspect ratio 4:3, which is the photographing region of larger aspect ratio (correspond to the second embodiment).

If determined that the image-defect prevention is not set on the image data of aspect ratio 4:3 in step 404, this means that the image-defect prevention is set on the image data of aspect ratio 16:9. In the frame mode No. 1, the photographing region 152 of aspect ratio 16:9 is included in the photographing region 150 of aspect ratio 4:3. Therefore, when the image-defect prevention is set on the image data of aspect ratio 16:9, the process same as when the image-defect prevention is set on the image data of all aspect ratios is inevitably performed. Therefore, the zoom restriction setting unit 122 sets the zoom restriction on the photographing region 152 of aspect ratio 16:9, which is the photographing region of smaller aspect ratio, in step 402 (correspond to the first embodiment).

The imaging apparatus 400 can control the display function and the zoom function according to the zoom instruction from the user based on the zoom restriction in the frame mode No. 1 set through the above processes.
(Setting Process of Zoom Restriction Mode in Frame Mode No. 2)

Figure 23:
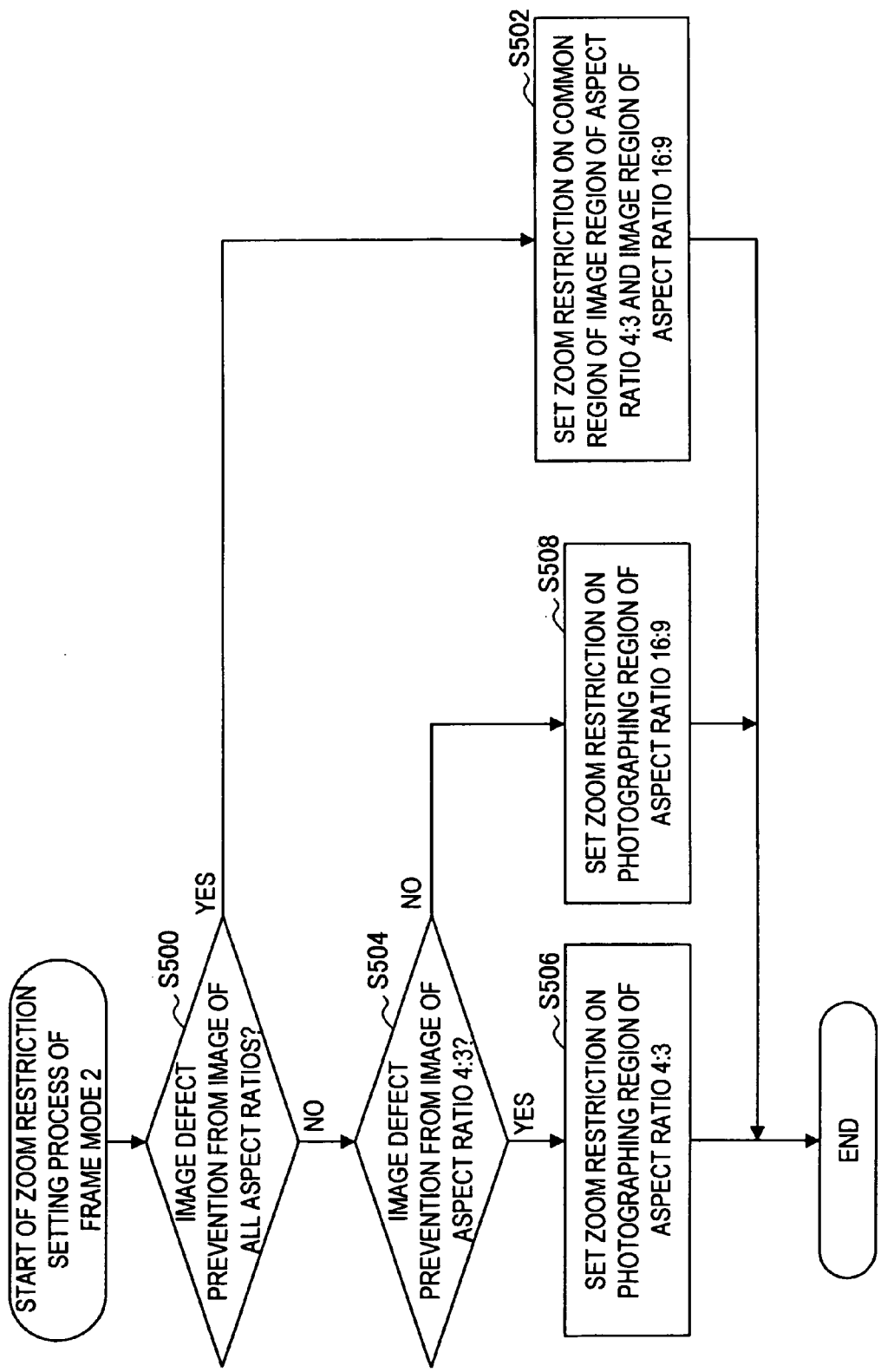
FIG. 23 is a flowchart showing one example of the flow of the setting process of the zoom restriction mode in the frame mode No. 2 in the imaging apparatus 400 according to the fourth embodiment.

FIG. 23 is a flowchart showing one example of the flow of the setting process of the zoom restriction mode in the frame mode No. 2. As shown in FIG. 23, the imaging apparatus 400 first determines whether or not image-defect prevention is set on the image data of all aspect ratios in step 500. In the frame mode No. 2, the boundary in the vertical direction of the photographing region 150 of aspect ratio 4:3 exists in the displayable region of the display unit 112 of aspect ratio 16:9 but the boundary in the horizontal direction exists outside the displayable region, as shown in FIG. 18. Therefore, when the zoom restriction is set on the photographing region of either aspect ratio, the subject of interest may be image-defected from the photographing region of the other aspect ratio.

If determined that the image-defect prevention is set on the image data of all aspect ratios in step 500, the imaging apparatus 400 performs the process of step 502. In other words, the zoom restriction setting unit 122 sets the zoom restriction on a common region of the photographing region 150 of aspect ratio 4:3 and the photographing region 152 of aspect ratio 16:9. The imaging apparatus 400 thereby controls the display function and the zoom function so that the subject of interest is not image-defected from the photographing regions of either aspect ratio.

If determined that the image-defect prevention is not set on the image data of all aspect ratios in step 500, the imaging apparatus 400 determines whether or not the image-defect prevention is set on the image data of aspect ratio 4:3 in step 504.

If determined that the image-defect prevention is set on the image data of aspect ratio 4:3 in step 504, the zoom restriction setting unit 122 sets the zoom restriction on the photographing region 150 of aspect ratio 4:3 in step 506.

If determined that the image-defect prevention is not set on the image data of aspect ratio 4:3 in step 504, this means that the image-defect prevention is set on the image data of aspect ratio 16:9. Therefore, the zoom restriction setting unit 122 sets the zoom restriction on the photographing region 152 of aspect ratio 16:9.

The imaging apparatus 400 can control the display function and the zoom function according to the zoom instruction from the user based on the zoom restriction in the frame mode No. 2 set through the above processes.

(Setting Process of Zoom Restriction Mode in Frame Mode No. 3)

Figure 24:
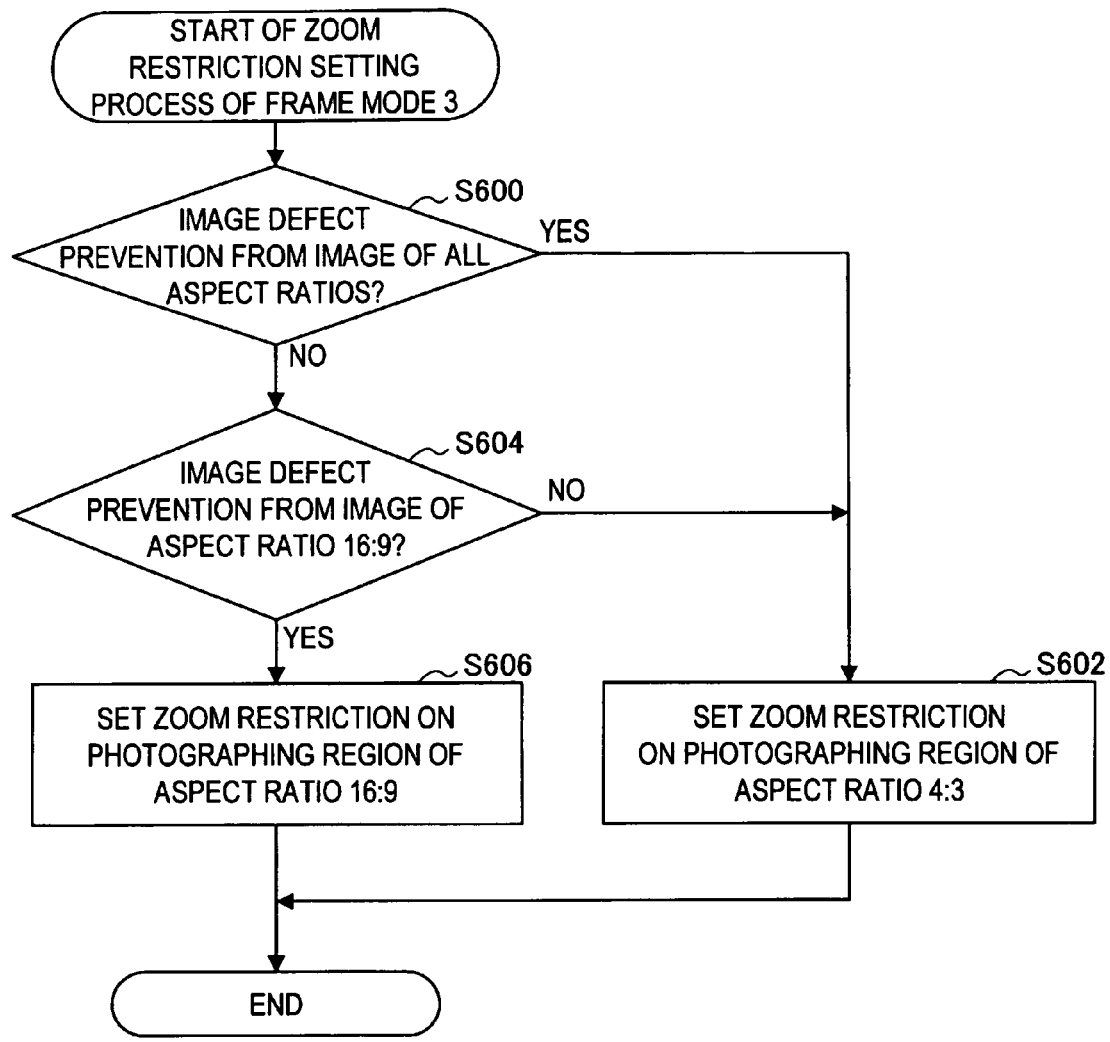
FIG. 24 is a flowchart showing one example of the flow of the setting process of the zoom restriction mode in the frame mode No. 3 in the imaging apparatus 400 according to the fourth embodiment.

FIG. 24 is a flowchart showing one example of the flow of the setting process of the zoom restriction mode in the frame mode No. 3. As shown in FIG. 24, the imaging apparatus 400 first determines whether or not image-defect prevention is set on the image data of all aspect ratios in step 600.

If determined that the image-defect prevention is set on the image data of all aspect ratios in step 600, the imaging apparatus 400 performs the process of step 602. In other words, the zoom restriction setting unit 122 sets the zoom restriction on the photographing region 150 of aspect ratio 4:3, which is the photographing region of smaller aspect ratio (correspond to the first embodiment).

If determined that the image-defect prevention is not set on the image data of all aspect ratios in step 600, the imaging apparatus 400 determines whether or not the image-defect prevention is set on the image data of aspect ratio 16:9 in step 604.

If determined that the image-defect prevention is set on the image data of aspect ratio 16:9 in step 604, imaging apparatus 400 performs the process of step 606. In other words, the zoom restriction setting unit 122 sets the zoom restriction on the photographing region 152 of aspect ratio 16:9, which is the photographing region of larger aspect ratio (correspond to the second embodiment).

If determined that the image-defect prevention is not set on the image data of aspect ratio 16:9 in step 604, this means that the image-defect prevention is set on the image data of aspect ratio 4:3. In the frame mode No. 3, the photographing region 150 of aspect ratio 4:3 is included in the photographing region 152 of aspect ratio 16:9. Therefore, when the image-defect prevention is set on the image data of aspect ratio 4:3, the process same as when the image-defect prevention is set on the image data of all aspect ratios is inevitably performed. Therefore, the zoom restriction setting unit 122 sets the zoom restriction on the photographing region 150 of aspect ratio 4:3, which is the photographing region of smaller aspect ratio, in step 602 (correspond to the first embodiment).

The imaging apparatus 400 can control the display function and the zoom function according to the zoom instruction from the user based on the zoom restriction in the frame mode No. 3 set through the above processes.

(Setting Process of Zoom Restriction Mode in Frame Mode No. 4)

Figure 25:
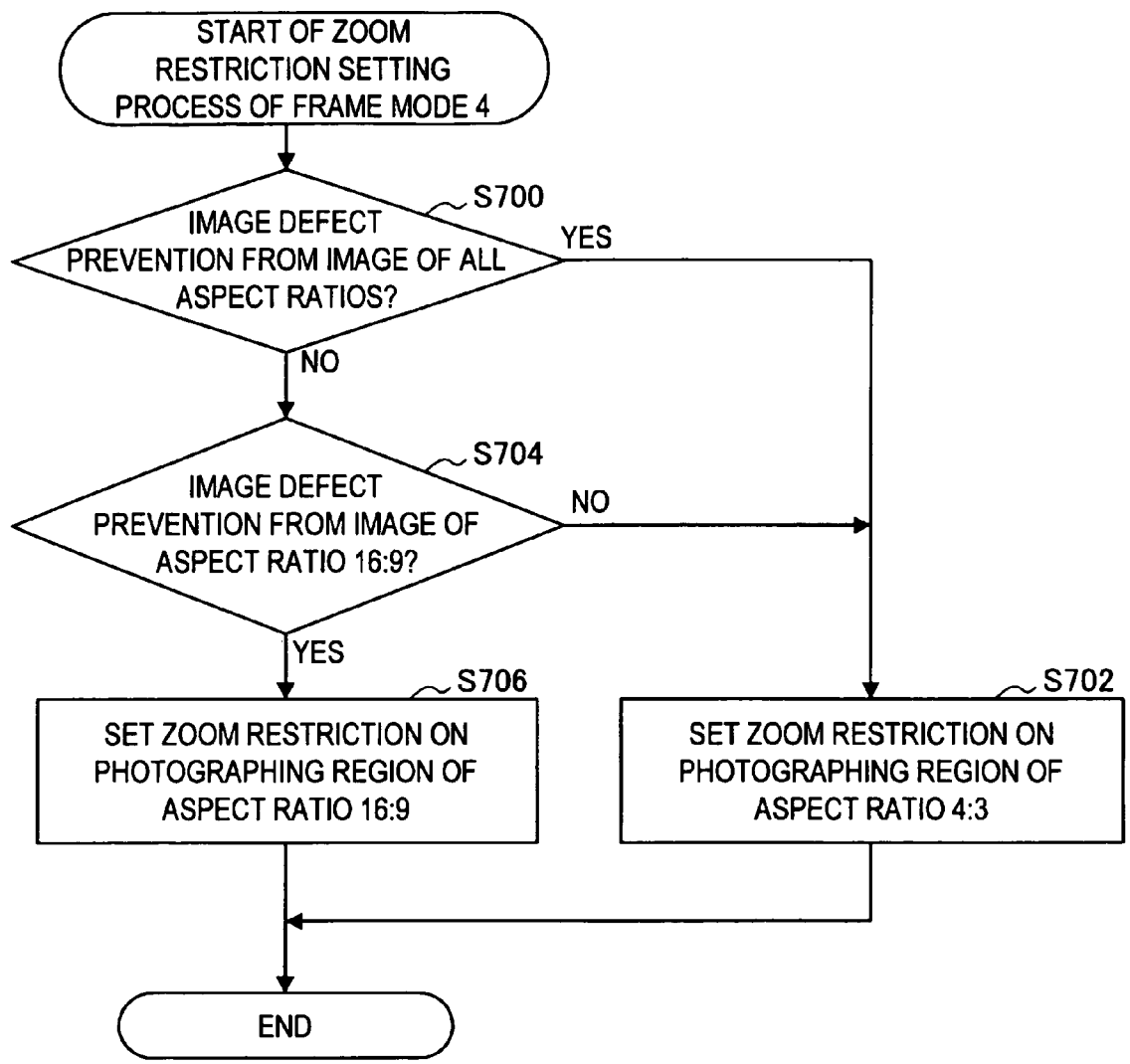
FIG. 25 is a flowchart showing one example of the flow of the setting process of the zoom restriction mode in the frame mode No. 4 in the imaging apparatus 400 according to the fourth embodiment.

FIG. 25 is a flowchart showing one example of the flow of the setting process of the zoom restriction mode in the frame mode No. 4. As shown in FIG. 25, the imaging apparatus 400 first determines whether or not image-defect prevention is set on the image data of all aspect ratios in step 700.

If determined that the image-defect prevention is set on the image data of all aspect ratios in step 700, the imaging apparatus 400 performs the process of step 702. In other words, the zoom restriction setting unit 122 sets the zoom restriction on the photographing region 150 of aspect ratio 4:3, which is the photographing region of smaller aspect ratio (correspond to the first embodiment).

If determined that the image-defect prevention is not set on the image data of all aspect ratios in step 700, the imaging apparatus 400 determines whether or not the image-defect prevention is set on the image data of aspect ratio 16:9 in step 704.

If determined that the image-defect prevention is set on the image data of aspect ratio 16:9 in step 704, the imaging apparatus 400 performs the process of step 706. In other words, the zoom restriction setting unit 122 sets the zoom restriction on the photographing region 152 of aspect ratio 16:9, which is the photographing region of larger aspect ratio (correspond to the second embodiment).

If determined that the image-defect prevention is not set on the image data of aspect ratio 16:9 in step 704, this means that the image-defect prevention is set on the image data of aspect ratio 4:3. In the frame mode No. 4, the photographing region 150 of aspect ratio 4:3 is included in the photographing region 152 of aspect ratio 16:9. Therefore, when the image-defect prevention is set on the image data of aspect ratio 4:3, the process same as when the image-defect prevention is set on the image data of all aspect ratios is inevitably performed. Therefore, the zoom restriction setting unit 122 sets the zoom restriction on the photographing region 150 of aspect ratio 4:3, which is the photographing region of smaller aspect ratio, in step 702 (correspond to the first embodiment).

The imaging apparatus 400 can control the display function and the zoom function according to the zoom instruction from the user based on the zoom restriction in the frame mode No. 4 set through the above processes.

(Setting Process of Zoom Restriction Mode in Frame Mode No. 5)

Figure 26:
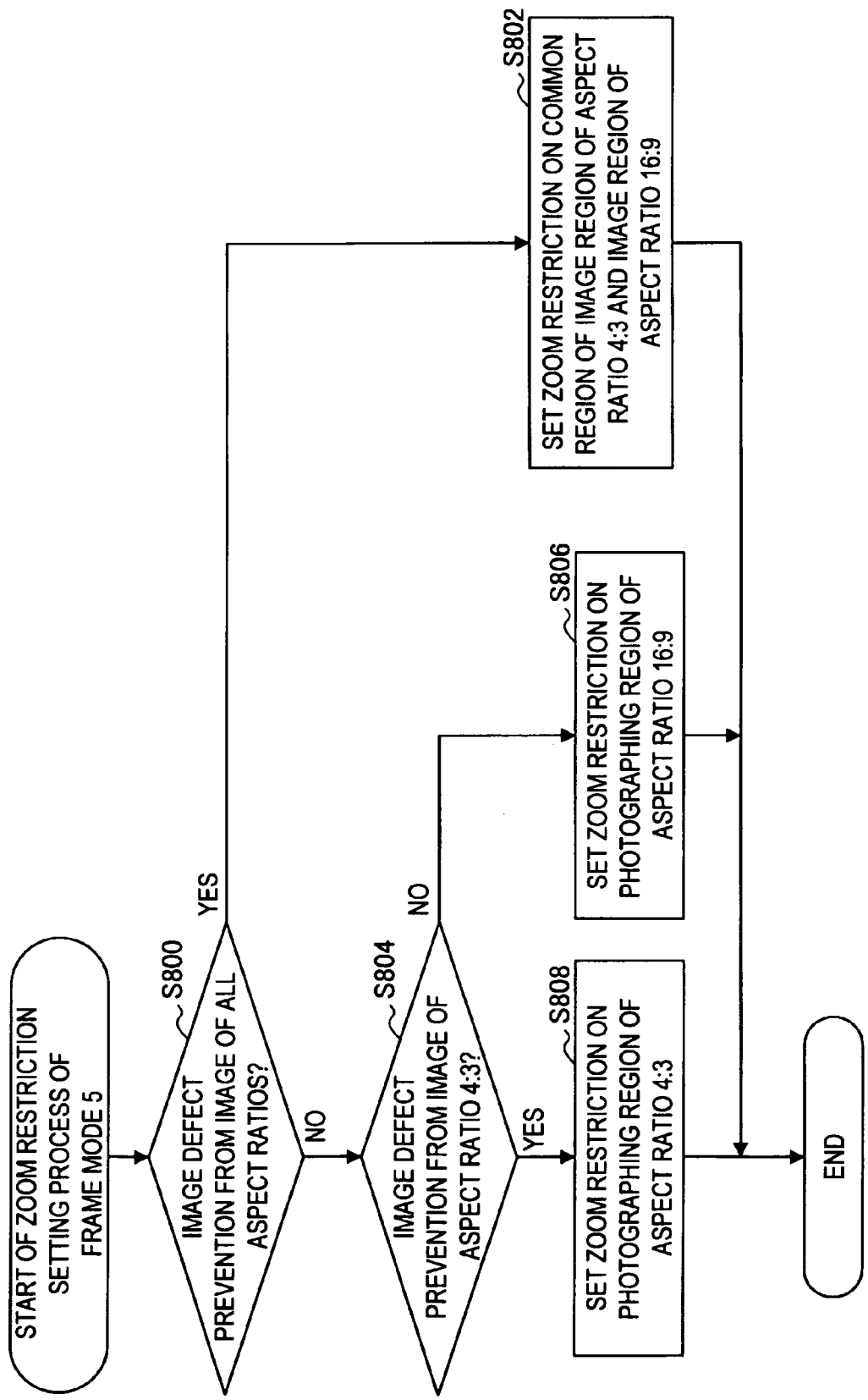
FIG. 26 is a flowchart showing one example of the flow of the setting process of the zoom restriction mode in the frame mode No. 5 in the imaging apparatus 400 according to the fourth embodiment.

FIG. 26 is a flowchart showing one example of the flow of the setting process of the zoom restriction mode in the frame mode No. 5. As shown in FIG. 26, the imaging apparatus 400 first determines whether or not image-defect prevention is set on the image data of all aspect ratios in step 800. In the frame mode No. 5, the boundary in the horizontal direction of the photographing region 152 of aspect ratio 16:9 exists in the displayable region of the display unit 112 of aspect ratio 4:3 but the boundary in the vertical direction exists outside the displayable region, as shown in FIG. 18. Therefore, when the zoom restriction is set on the photographing region of either aspect ratio, the subject of interest may be image-defected from the photographing region of the other aspect ratio.

If determined that the image-defect prevention is set on the image data of all aspect ratios in step 800, the imaging apparatus 400 performs the process of step 802. In other words, the zoom restriction setting unit 122 sets the zoom restriction on a common region of the photographing region 150 of aspect ratio 4:3 and the photographing region 152 of aspect ratio 16:9. The imaging apparatus 400 thereby controls the display function and the zoom function so that the subject of interest is not image-defected from the photographing regions of either aspect ratio.

If determined that the image-defect prevention is not set on the image data of all aspect ratios in step 800, the imaging apparatus 400 determines whether or not the image-defect prevention is set on the image data of aspect ratio 4:3 in step 804.

If determined that the image-defect prevention is set on the image data of aspect ratio 4:3 in step 804, the zoom restriction setting unit 122 sets the zoom restriction on the photographing region 150 of aspect ratio 4:3 in step 806.

If determined that the image-defect prevention is not set on the image data of aspect ratio 4:3 in step 804, this means that the image-defect prevention is set on the image data of aspect ratio 16:9. Therefore, the zoom restriction setting unit 122 sets the zoom restriction on the photographing region 152 of aspect ratio 16:9 in step 806.

The imaging apparatus 400 can control the display function and the zoom function according to the zoom instruction from the user based on the zoom restriction in the frame mode No. 5 set through the above processes.

(Setting Process of Zoom Restriction Mode in Frame Mode No. 6)

Figure 27:
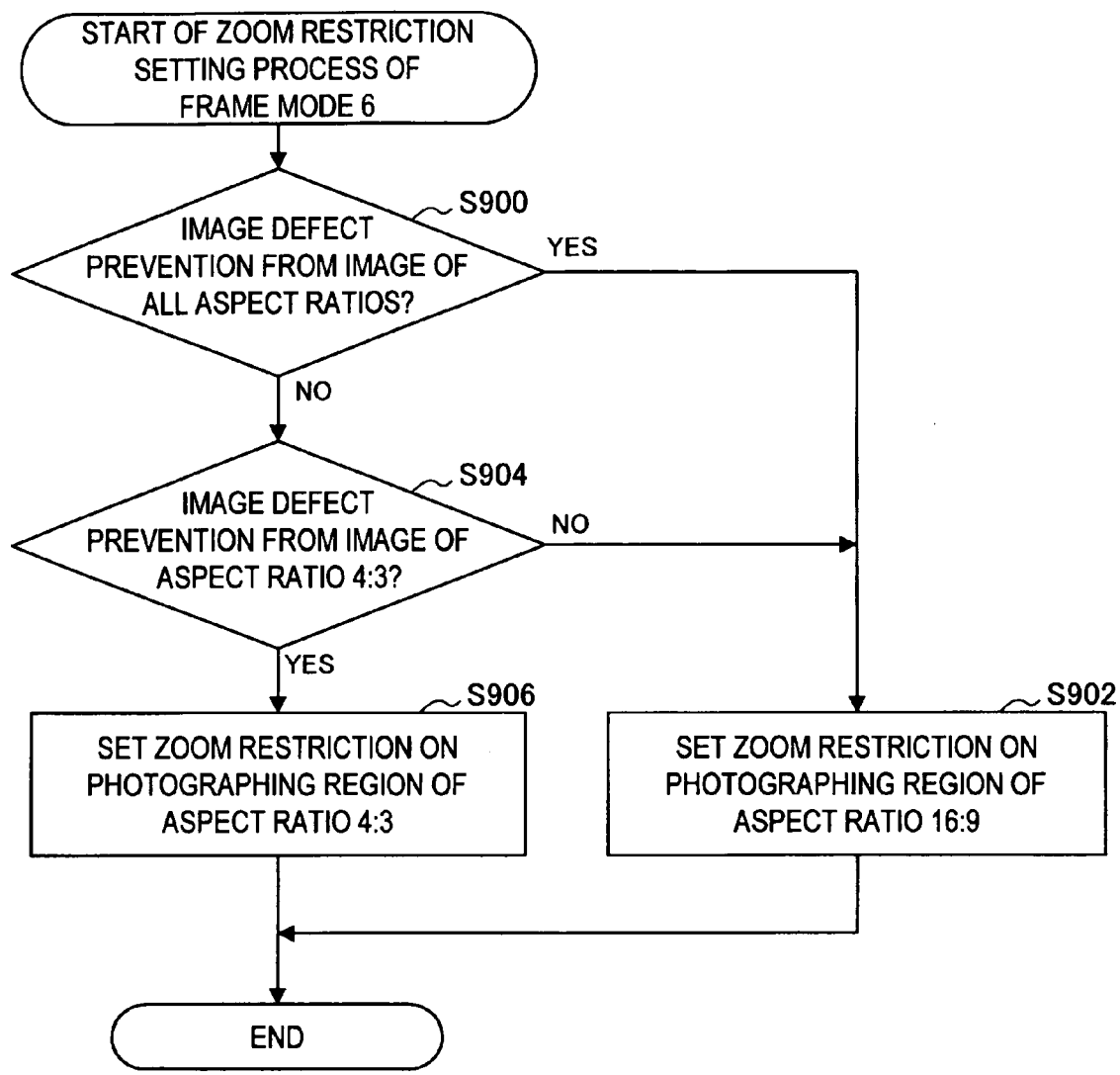
FIG. 27 is a flowchart showing one example of the flow of the setting process of the zoom restriction mode in the frame mode No. 6 in the imaging apparatus 400 according to the fourth embodiment.

FIG. 27 is a flowchart showing one example of the flow of the setting process of the zoom restriction mode in the frame mode No. 6. As shown in FIG. 27, the imaging apparatus 400 first determines whether or not image-defect prevention is set on the image data of all aspect ratios in step 900.

If determined that the image-defect prevention is set on the image data of all aspect ratios in step 900, the imaging apparatus 400 performs the process of step 902. In other words, the zoom restriction setting unit 122 sets the zoom restriction on the photographing region 152 of aspect ratio 16:9, which is the photographing region of smaller aspect (correspond to the first embodiment).

If determined that the image-defect prevention is not set on the image data of all aspect ratios in step 900, the imaging apparatus 400 determines whether or not the image-defect prevention is set on the image data of aspect ratio 4:3 in step 904.

If determined that the image-defect prevention is set on the image data of aspect ratio 4:3 in step 904, imaging apparatus 400 performs the process of step 906. In other words, the zoom restriction setting unit 122 sets the zoom restriction on the photographing region 150 of aspect ratio 4:3, which is the photographing region of larger aspect ratio (correspond to the second embodiment).

If determined that the image-defect prevention is not set on the image data of aspect ratio 4:3 in step 904, this means that the image-defect prevention is set on the image data of aspect ratio 16:9. In the frame mode No. 6, the photographing region 152 of aspect ratio 16:9 is included in the photographing region 150 of aspect ratio 4:3. Therefore, when the image-defect prevention is set on the image data of aspect ratio 16:9, the process same as when the image-defect prevention is set on the image data of all aspect ratios is inevitably performed. Therefore, the zoom restriction setting unit 122 sets the zoom restriction on the photographing region 152 of aspect ratio 16:9, which is the photographing region of smaller aspect ratio, in step 902 (correspond to the first embodiment).

The imaging apparatus 400 can control the display function and the zoom function according to the zoom instruction from the user based on the zoom restriction in the frame mode No. 6 set through the above processes.

The imaging apparatus 400 according to the fourth embodiment can display the photographing region of the aspect ratio of the main image that is mainly photographed on the display unit 112 to a maximum extent when simultaneously photographing a plurality of image data having different aspect ratios. The imaging apparatus 400 can display the region notification icon 130 and the like for notifying that the photographing region of the sub-image exists outside the displayable region when the photographing region of the aspect ratio of the sub-image that is secondarily photographed exists outside the displayable region of the display unit 112. Similar to the first embodiment and the second embodiment, the imaging apparatus 400 can set the zoom restriction on the photographing region of either or all aspect ratio. The imaging apparatus 400 thus can control the display function and the zoom function so that the subject of interest also is not image-defected from the photographing region that exists outside the displayable region of the display unit 112. In other words, when simultaneously photographing a plurality of image data having different aspect ratios, the imaging apparatus 400 can control the zoom function and the display function so that a predetermined subject is not image-defected from the image data, and realize the display of the photographing region excelling in usability.

The type and combination of frame modes illustrated in the above description are examples in describing one of the characteristics of the imaging apparatus 400 according to the fourth embodiment, and the present invention is not limited thereto. For instance, the imaging apparatus 400 can also photograph the image of aspect ratio other than the above example, and can also include the display unit 112 of aspect ratio other than the above example. The number of frame modes registered in the imaging apparatus 400 is also not limited to the above example, and the imaging apparatus 400 can manage an arbitrarily number of frame modes according to the type, number, performance and the like of the photographing mode.

The region notification icon 130 and the guide frame 132 shown in FIGS. 15, 16, 21, and 22 are examples in describing one of the characteristics of the imaging apparatus 400 according to the fourth embodiment, and the present invention is not limited thereto. The region notification icon 130 and the guide frame 132 may have shape, color, size, and position different from the examples shown in FIGS. 15, 16, 21, and 22.

<5. Fifth Embodiment>

An outline of an imaging apparatus 500 according to a fifth embodiment having the characteristics of the fourth embodiment will be described, one of the characteristics being that the display method of the photographing region can be switched according to the setting state of the zoom restriction and the zoom state of the subject of interest.

When simultaneously photographing the image data of a plurality of aspect ratios, the imaging apparatus 400 according to the fourth embodiment displays the photographing region of one aspect ratio to a maximum extent on the display unit 112, and thus the photographing region of another aspect ratio sometimes exists outside the displayable region of the display unit 112. In such case, the imaging apparatus 400 displays the region notification icon 130, as in the example shown in FIG. 15, to thereby notify the user that the photographing region also exists outside the displayable region of the display unit 112. When the zoom restriction is set on the photographing region outside the displayable region as well, the imaging apparatus 400 displays the zoom limiting icon 138 and the like according to the state of the zoom process to notify the user that the zoom function is disabled, as in the example shown in FIG. 21.

In such case, however, the photographing region existing outside the displayable region of the display unit 112 set with the zoom restriction may be important to the user than the photographing region displayed to a maximum extent on the display unit 112. For instance, a case of temporarily magnifying Mt. Fuji, which is the subject of interest, when photographing the still image data of aspect ratio 4:3 as the secondary sub-image while photographing the HD moving image of aspect ratio 16:9 as the main image is assumed in the example shown in FIG. 20. In such case, it may be preferable, at times, to temporarily display the photographing region of aspect ratio 4:3 all on the display unit 112 depending on the zoom state of the subject when photographing the still image data. The imaging apparatus 500 according to the fifth embodiment changes the display method of the photographing region of each aspect ratio when the subject of interest is magnified beyond the displayable region when the zoom restriction is set on the sub-image existing outside the displayable region of the display unit 112.

Figure 28:
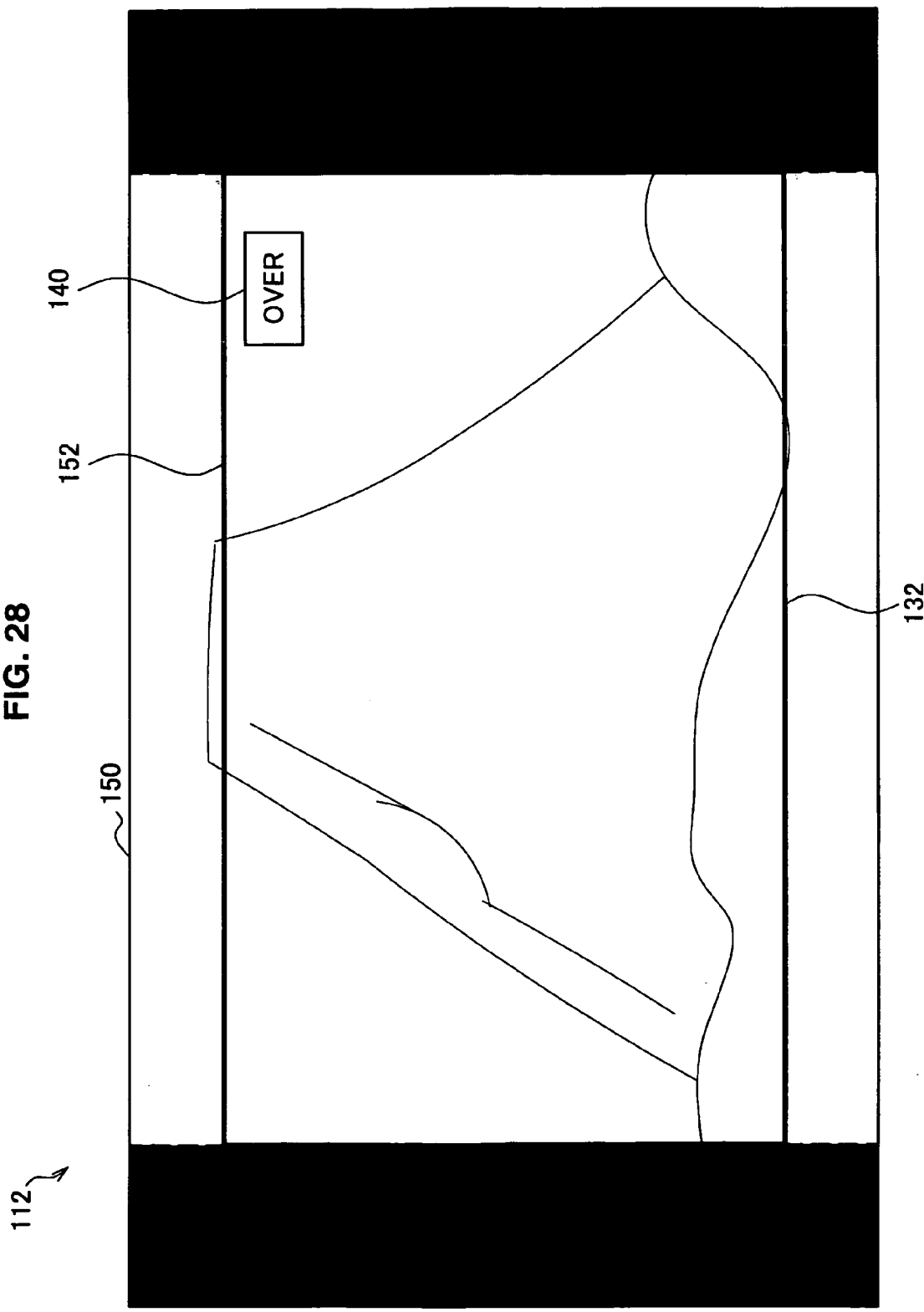
FIG. 28 is an explanatory view showing a display example of the display unit 112 corresponding to the zoom process in an imaging apparatus 500 according to a fifth embodiment of the present invention.

Specifically, the imaging apparatus 500 can display all the subject of interest on the display unit 112 by temporarily displaying the photographing region of the sub-image to a maximum extent on the display unit 112. FIG. 28 is an explanatory view showing a display example of the display unit 112 in the imaging apparatus 500 according to the fifth embodiment corresponding to the display example of FIG. 20 in the imaging apparatus 400 according to the fourth embodiment. With reference to FIG. 28, when Mt. Fuji, which is the subject of interest, is magnified beyond the display unit 112, the display screen is switched so that the photographing region 150 of aspect ratio 4:3 is displayed to a maximum extent on the display unit 112. The user then can perform a secondary still image photographing with the entire Mt. Fuji, which is the subject of interest, displayed on the display unit 112.

The imaging apparatus 500 may again display the photographing region 152 of aspect ratio 16:9 to a maximum extent on the display unit 112 if the subject of interest is again zoomed in the reducing direction and fits within the photographing region 152 of aspect ratio 16:9 or the main image.

Therefore, the imaging apparatus 500 according to the fifth embodiment can automatically change the photographing region to display to a maximum extent on the display unit 112 according to the zoom state of the subject of interest. In other words, the imaging apparatus 500 can control the zoom function and the display function so that a predetermined subject is not image-defected from the image data when simultaneously photographing a plurality of image data having different aspect ratios, and can realize the display of the photographing region excelling in usability.

<6. Hardware Configuration of Imaging Apparatus According to Each Embodiment>

Figure 29:
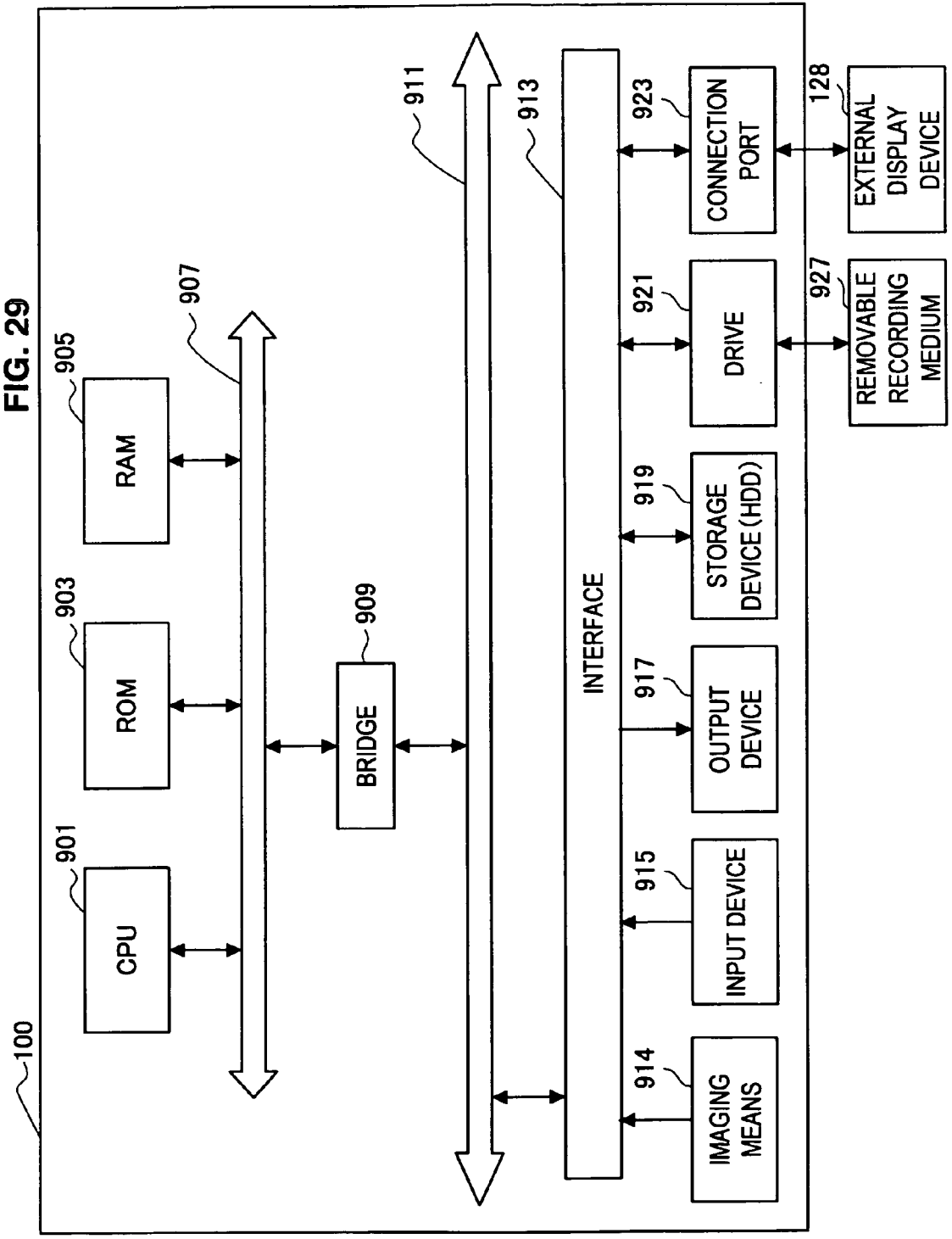
FIG. 29 is a block diagram showing a hardware configuration of the imaging apparatus according to each embodiment.

One example of a hardware configuration of the imaging apparatus according to each embodiment described above will be described below with reference to FIG. 29. FIG. 29 is a block diagram showing one example of a hardware configuration of the imaging apparatus 100, 200, 300, 400, 500 according to one of the embodiments of the present invention. In the following description, the imaging apparatus 100 according to the first embodiment will be described by way of example, but the imaging apparatuses of other embodiments are assumed to have similar hardware configuration.

The imaging apparatus 100 is configured to mainly include a CPU 901, a ROM 903, a RAM 905, a bridge 909, an interface 913, an imaging means 914, an input device 915, an output device 917, a storage device 919, a drive 921, and a connection port 923.

The CPU 901 functions as a calculation processing device and a control device, and controls all or some of the operations of the imaging apparatus 100 according various types of programs recorded in the ROM 903, the RAM 905, the storage device 919, or a removable recording medium 927. The ROM 903 stores programs, calculation parameters, and the like used by the CPU 901. The RAM 905 primary stores programs used in the execution of the CPU 901, parameters that appropriately change in the relevant execution, and the like. These components are mutually connected by a host bus 907 configured by an internal bus such as a CPU bus.

The imaging means 914 is configured to include an optical system, an imaging element, an A/D (Analog to Digital) converter, a signal processing unit and the like, and images a subject and generates image data.

The input device 915 is an operation means operated by the user such as a touch panel, a button, a switch, and a lever. The input device 915 may be, for example, a remote control means (so-called remote controller) using infrared light or other electric waves.

The output device 917 is configured by a device capable of visually or perceptually notifying various types of information to the user such as a display device including liquid crystal display device, plasma display device, and EL display device, and audio output device including a speaker and a headphone. The output device 917 functions as a display configuring the display unit 112, described above.

The storage device 919 is a device for data storage configured as one example of a storage unit of the imaging apparatus 100, and is configured by a magnetic storage device such as an HDD, a semiconductor storage device, an optical storage device, or a magneto-optical storage device. The storage device 919 stores programs executed by the CPU 901, various types of data, moving image data, and still image data.

The drive 921 is a recording medium reader/writer, and is incorporated in or externally attached to the imaging apparatus 100. The drive 921 reads out information recorded on the removable recording medium 927 such as a magnetic disc, optical disc, magneto-optical disc, or semiconductor memory that is attached, and outputs the same to the RAM 905.

The connection port 923 is a port for directly connecting to the external display device 128 such as USB port, optical audio terminal, and HDMI port. The imaging apparatus 100 can reproduce and display the moving image data and the still image data on the external display device 128 by connecting the external display device 128 to the connection port 923.

One example of a hardware configuration capable of realizing the functions of the imaging apparatus 100, 200, 300, 400, 500 according to each embodiment of the present invention has been described above. Each configuring element may be configured using a general-purpose member, or may be configured by hardware specialized for the function of each configuring element. Therefore, the hardware configuration to use can be appropriately changed according to the technical level at the time of implementing the present embodiment.

<7. Summary>

As described above, the imaging apparatus according to each embodiment of the present invention can control the display function and the zoom function according to the zoom state of the subject of interest when simultaneously photographing a plurality of image data having different aspect ratios. In other words, the image processing apparatus can set the zoom restriction on the photographing region of either or all aspect ratio, and control the display function and the zoom function so that the subject of interest is not image-defected from the image data of the aspect ratio set with the zoom restriction. The image processing apparatus can notify the user of the relationship between the photographing region of the aspect ratio set with the zoom restriction and the subject of interest by displaying the zoom state notification icon 134. The image processing apparatus can automatically disable the zoom function when the subject of interest reaches the boundary of the photographing region of the aspect ratio set with the zoom restriction.

The image processing apparatus can control the display function and the zoom function according to the zoom state of the subject of interest even when simultaneously reproducing the photographed image data on a plurality of displays having different aspect ratios. The image processing apparatus can enhance the usability in time of simultaneous photographing by displaying the photographing region of any aspect ratio to a maximum extent on the display unit 112, and then control the display function and the zoom function according to the zoom state of the subject of interest.

The image processing apparatus according to each embodiment of the present invention can control the display function and the zoom function so that a predetermined subject is not image-defected from the photographing range of the set aspect ratio when simultaneously photographing a plurality of image data having different aspect ratios. The image processing apparatus can also control the display function and the zoom function so that a predetermined subject is not image-defected from the reproduction displaying region of the set aspect ratio when simultaneously reproducing the same image data on a plurality of displays having different aspect ratios.

It should be understood by those skilled in the art that various modifications, combinations, sub-combinations and alterations may occur depending on design requirements and other factors insofar as they are within the scope of the appended claims or the equivalents thereof.

For instance, the imaging apparatus described in the above embodiments are assumed to be a digital still camera, a digital video camera, a cam coder (registered trademark), a portable telephone, a PDA, a portable game, and the like, but the present invention is not limited thereto. As described in the third embodiment, the imaging function may not be provided when simultaneously reproducing the photographed image on a plurality of displays. In other words, the present invention may not be applied solely to the apparatus having imaging function, and may be applied to an image reproducing device for reproducing image data, as described in the third embodiment. The image device of the present invention may be a reproducing device including a HDD recorder, a DVD recorder, or a Blu-ray Disc (registered trademark) recorder, a game machine, a personal computer or the like, but the present invention is not limited thereto.

In the present specification, the steps described in the flowchart or the sequence chart include not only processes performed in time-series along the described order but also processes executed in parallel or individually that may not be processed in time-series. The order of steps processed in time-series may be appropriately changed on a case-by-case basis.

What is claimed is:

1. An imaging apparatus, comprising:
   an image recording range extraction unit for extracting, from a video of a subject to be imaged, an image corresponding to a first imaging region configured by a predetermined first aspect ratio and an image corresponding to a second imaging region configured by a predetermined second aspect ratio different from the first aspect ratio;
   a zoom control unit for magnifying or reducing the video of the subject to be imaged; and
   a zoom restriction setting unit for setting a zoom restriction on either one of or both of the first imaging region and the second imaging region to prevent a predetermined subject from being image-defected from an imaging region by a zoom process of the zoom control unit,
   wherein
   a predetermined process for preventing the predetermined subject from being image-defected from an imaging region set with the zoom restriction is executed according to a relationship of the predetermined subject magnified or reduced by the zoom process and the imaging region set with the zoom restriction,
   further comprising:
   an image display range extraction unit for extracting a display image to display on a display from the video of the subject to be imaged;
   a notification image generation unit for generating a notification image including a zoom state notification icon showing a relationship of the predetermined subject and the imaging region set with the zoom restriction according to the zoom process;
   an image synthesizing unit for synthesizing the notification image generated by the notification image generation unit to the display image extracted by the image display range extraction unit to generate a synthesized image; and
   a display control unit for displaying the synthesized image generated by the image synthesizing unit on the display.

2. The imaging apparatus according to claim 1, wherein the notification image generation unit generates a zoom warning icon indicating that the predetermined subject may be image-defected from the imaging region set with the zoom restriction as the zoom state notification icon when the predetermined subject is magnified by the zoom process and reaches a warning boundary set at a predetermined position in the imaging region set with the zoom restriction.

3. The imaging apparatus according to claim 2, wherein the notification image generation unit generates a zoom limiting icon indicating that the predetermined subject may not be further magnified by the zoom process to prevent the predetermined subject from being image-defected from the imaging region set with the zoom restriction as the zoom state notification icon when the predetermined subject is further magnified by the zoom process and reaches a boundary of the imaging region set with the zoom restriction.

4. The imaging apparatus according to claim 3, wherein
   if the imaging region not set with the zoom restriction is smaller than the imaging region set with the zoom restriction,
   the notification image generation unit generates the zoom warning icon indicating, in a cautioning manner, that the predetermined subject may be image-defected from the imaging region not set with the zoom restriction as the zoom state notification icon when the predetermined subject is magnified by the zoom process and reaches a warning boundary set at a predetermined position in the imaging region not set with the zoom restriction.

5. The imaging apparatus according to claim 4, wherein
   if the imaging region not set with the zoom restriction is smaller than the imaging region set with the zoom restriction,
   the notification image generation unit generates an image-defect notification icon indicating, in a cautioning manner, that the predetermined subject is image-defected from the imaging region not set with the zoom restriction as the zoom state notification icon when the predetermined subject is magnified by the zoom process and goes beyond the boundary of the imaging region not set with the zoom restriction.

6. The imaging apparatus according to claim 5, wherein
the image display range extraction unit extracts, from the video of the subject to be imaged, a display image configured by an aspect ratio of a displayable region of the display in a range the first imaging region is displayed to a maximum extent, and
the notification image generation unit generates the notification image including a region notification icon indicating that the second imaging region exists outside the displayable region of the display when the second imaging region exists outside the displayable region of the display.

7. The imaging apparatus according to claim 6, wherein the notification image generation unit generates the notification image including a guide frame indicating a boundary of the second imaging region when one part of the boundary of the second imaging region exists in the displayable region of the display.

8. The imaging apparatus according to claim 7, wherein the zoom restriction setting unit automatically sets the zoom restriction on either one of or both of the first imaging region and the second imaging region according to a combination of the first imaging region configured by the first aspect ratio and the second imaging region configure by the second aspect ratio.

9. The imaging apparatus according to claim 8, wherein the zoom restriction setting unit prevents the predetermined subject from being image-defected from the first imaging region and the second imaging region by setting the zoom restriction on a common region of the first imaging region and the second imaging region.

10. The imaging apparatus according to claim 9, wherein
if the second imaging region exists outside the displayable region of the display and the zoom restriction is set only on the second imaging region,
when the predetermined subject is magnified by the zoom process and goes beyond a boundary of the first imaging region not set with the zoom restriction,
the image display range extraction unit extracts, from the video of the subject to be imaged, the display image configured by an aspect ratio of the displayable region of the display in a range the second imaging region is displayed to a maximum extent.

11. An imaging apparatus, comprising:
an image recording range extraction unit for extracting, from a video of a subject to be imaged, an image corresponding to a first imaging region configured by a predetermined first aspect ratio and an image corresponding to a second imaging region configured by a predetermined second aspect ratio different from the first aspect ratio;
a zoom control unit for magnifying or reducing the video of the subject to be imaged; and
a zoom restriction setting unit for setting a zoom restriction on either one of or both of the first imaging region and the second imaging region to prevent a predetermined subject from being image-defected from an imaging region by a zoom process of the zoom control unit,
wherein
a predetermined process for preventing the predetermined subject from being image-defected from an imaging region set with the zoom restriction is executed according to a relationship of the predetermined subject magnified or reduced by the zoom process and the imaging region set with the zoom restriction,
further comprising:
a data storage unit for storing the image data extracted by the image recording range extraction unit as reproducing image data,
wherein
when simultaneously reproducing and displaying one reproducing image data recorded in the data storage unit on a first display configured by a predetermined aspect ratio and a second display configured by a predetermined aspect ratio different from the aspect ratio of the first display,
the image display range extraction unit extracts, from the reproducing image data, a first reproduction display image corresponding to a predetermined first reproduction display region to reproduce and display on the first display, and a second reproduction display image corresponding to a predetermined second reproduction display region to reproduce and display on the second display,
the zoom control unit magnifies or reduces the reproducing image data by the zoom process,
the zoom restriction setting unit sets the zoom restriction on either one of or both of the first reproduction display region and the second reproduction display region to prevent the predetermined subject contained in the reproducing image data from being image-defected from a reproduction displaying region by the zoom process of the zoom control unit,
the notification image generation unit generates the notification image including a zoom state notification icon indicating a relationship of the predetermined subject and the reproduction displaying region set with the zoom restriction according to the zoom process,
the image synthesizing unit synthesizes the notification image generated by the notification image generation unit to each reproduction display image extracted by the image display range extraction unit to generate a first synthesized image and a second synthesized image, and
the display control unit causes the first display to display the first synthesized image generated by the image synthesizing unit, and causes the second display to display the second synthesized image generated by the image synthesizing unit.

12. The imaging apparatus according to claim 11, wherein the zoom control unit disables a zoom function in a direction of magnifying the predetermined subject when the predetermined subject is further magnified by the zoom process and reaches a boundary of the reproduction displaying region set with the zoom restriction.

* * * * *